US009483649B2

(12) United States Patent
Takaoka

(10) Patent No.: US 9,483,649 B2
(45) Date of Patent: Nov. 1, 2016

(54) IMAGE PROCESSING DEVICE, IMAGE PROCESSING SYSTEM, IMAGE PROCESSING METHOD, AND PROGRAM

(71) Applicant: Sony Corporation, Minato-ku (JP)

(72) Inventor: Tomohisa Takaoka, Kanagawa (JP)

(73) Assignee: Sony Corporation, Minato-ku (JP)

( * ) Notice: Subject to any disclaimer, the term of this patent is extended or adjusted under 35 U.S.C. 154(b) by 146 days.

(21) Appl. No.: 14/031,378

(22) Filed: Sep. 19, 2013

(65) Prior Publication Data

US 2014/0109231 A1  Apr. 17, 2014

(30) Foreign Application Priority Data

Oct. 12, 2012  (JP) .................................. 2012-226789

(51) Int. Cl.
| G06F 21/60 | (2013.01) |
| H04W 12/02 | (2009.01) |
| H04W 4/02 | (2009.01) |
| G06F 3/00 | (2006.01) |
| H04M 1/725 | (2006.01) |

(52) U.S. Cl.
CPC .................. *G06F 21/60* (2013.01); *G06F 3/00* (2013.01); *H04W 4/02* (2013.01); *H04W 12/02* (2013.01); *H04M 1/72569* (2013.01); *H04M 2250/52* (2013.01)

(58) Field of Classification Search
CPC .......... G06F 21/60; G06F 3/00; H04W 4/02; H04W 12/02; H04M 1/72569; H04M 2250/52
See application file for complete search history.

(56) References Cited

U.S. PATENT DOCUMENTS

| 2003/0227555 A1* | 12/2003 | Kobayashi et al. ....... 348/231.6 |
| 2004/0247310 A1* | 12/2004 | Kim et al. .................... 396/374 |
| 2006/0064384 A1* | 3/2006 | Mehrotra et al. ............... 705/57 |
| 2007/0201694 A1* | 8/2007 | Bolle et al. .................... 380/205 |
| 2008/0024632 A1* | 1/2008 | Otsuka .......................... 348/294 |
| 2009/0128632 A1* | 5/2009 | Goto et al. ..................... 348/169 |
| 2009/0136221 A1* | 5/2009 | Nakamura ........................ 396/1 |
| 2009/0262987 A1* | 10/2009 | Ioffe et al. ..................... 382/118 |
| 2009/0282336 A1* | 11/2009 | Lindley et al. ............... 715/716 |
| 2010/0125603 A1* | 5/2010 | Lehikoinen et al. ......... 707/783 |
| 2010/0199356 A1* | 8/2010 | Krishnamurthy et al. ..... 726/26 |
| 2010/0277611 A1* | 11/2010 | Holt .................. G06F 17/30265 348/231.2 |
| 2010/0296705 A1* | 11/2010 | Miksa et al. ................... 382/106 |
| 2011/0103696 A1* | 5/2011 | Mizuno ......................... 382/190 |
| 2011/0292231 A1* | 12/2011 | Winters .................... 348/222.1 |
| 2011/0310259 A1* | 12/2011 | Mikawa ................. H04N 5/232 348/207.1 |

(Continued)

FOREIGN PATENT DOCUMENTS

JP  2003087632 A  *  3/2003  ............. H04N 5/225
JP  2009-33738  2/2009

*Primary Examiner* — Michael Pyzocha
(74) *Attorney, Agent, or Firm* — Chip Law Group

(57) ABSTRACT

There is provided an image processing device including a photographic subject position acquisition unit that acquires position information of a photographic subject corresponding to a person image included in a photographic image, a transmission unit that transmits the position information of the photographic subject to an information processing device that compares the position information of the photographic subject with position information of a communication terminal transmitted from the communication terminal, and a determination unit that determines whether a process of protecting the person image is performed based on information according to a result of the comparison received from the information processing device.

20 Claims, 57 Drawing Sheets

(56) References Cited

U.S. PATENT DOCUMENTS

| | | | |
|---|---|---|---|
| 2012/0151601 A1* | 6/2012 | Inami et al. | 726/26 |
| 2013/0108105 A1* | 5/2013 | Yoo et al. | 382/103 |
| 2013/0136316 A1* | 5/2013 | Grassel et al. | 382/115 |
| 2013/0162817 A1* | 6/2013 | Bernal | G06K 9/00228 348/143 |
| 2013/0247117 A1* | 9/2013 | Yamada | G08C 17/02 725/93 |
| 2014/0038577 A1* | 2/2014 | Kushtagi et al. | 455/418 |

* cited by examiner

POSITION AND ENVIRONMENT STATE STORAGE UNIT

| ACCOUNT | POSITION INFORMATION | ENVIRONMENT STATE (MOVEMENT STATE) | ... |
|---|---|---|---|
| Yamada | (x,y) | DRIVING CAR | ... |
| Hanako | (a,b) | STOPPED | ... |
| ... | ... | ... | ... |

PHOTOGRAPHING APPROVAL CONDITION STORAGE UNIT

| ACCOUNT | PHOTOGRAPHING APPROVAL CONDITION | ... |
|---|---|---|
| Yamada | DISAPPROVED WHEN MOVING | ... |
| Hanako | APPROVED ANYTIME | ... |
| ... | ... | ... |

2060 / 2062

$$R \doteqdot \frac{D}{\theta_6}$$

POSITION AND PHOTOGRAPHING APPROVAL STORAGE UNIT

| POSITION INFORMATION | PHOTOGRAPHING APPROVAL | MASK METHOD DESTINATION | ... |
|---|---|---|---|
| (x,y) | DISAPPROVAL | — | ... |
| (a,b) | APPROVAL | SUBSTITUTION WITH ICON A | ... |
| ... | ... | ... | ... |

SCHEDULE MANAGEMENT SERVER 40

| ACCOUNT 4000 | TIME 4002 | PHOTOGRAPHING APPROVAL 4004 | ... |
|---|---|---|---|
| Yamada | 2012/8/12 0:00~13:00 | DISAPPROVAL | ... |
| Hanako | 2012/8/12 13:00~16:00 | APPROVAL | ... |
| ... | ... | ... | ... |

FIG.37

POSITION SHARING SERVER 60

| ACCOUNT (6000) | POSITION INFORMATION (6002) | ACQUAINTANCE ACCOUNT (6004) | ... |
|---|---|---|---|
| Yamada | (x,y) | Hanako, Bob, Satoshi | ... |
| Hanako | (a,b) | Ai, Yamada, Smith, Mitchell | ... |
| ... | ... | ... | ... |

FIG.42

QUERY ID STORAGE UNIT 212

| QUERY ID 2120 | ACCOUNT 2122 | PHOTOGRAPHING APPROVAL CONDITION 2124 | VIEW APPROVAL CONDITION 2126 | ... |
|---|---|---|---|---|
| 3124 | Yamada | DISAPPROVED WHEN MOVING | CONSTANT DISAPPROVAL | ... |
| 6580 | Hanako | APPROVED ANYTIME | APPROVED DURING SEPTEMBER 1, 2012 2012 THROUGH SEPTEMBER 30, 2012 | ... |
| ... | ... | ... | ... | ... |

FIG.48

*202 POSITION AND ENVIRONMENT STATE STORAGE UNIT*

| ACCOUNT | POSITION INFORMATION | ENVIRONMENT STATE (MOVEMENT STATE) | ENVIRONMENT STATE (ACCOUNT OF ACQUAINTANCE WHO IS ALSO PRESENT) |
|---|---|---|---|
| Yamada | (x,y) | DRIVING CAR | — |
| Hanako | (a,b) | STOPPED | Ai |
| ⋮ | ⋮ | ⋮ | ⋮ |

212
QUERY ID STORAGE UNIT

| 2130 QUERY ID | 2131 ACCOUNT | 2132 TIME | 2133 POSITION INFORMATION | 2134 ENVIRONMENT STATE (MOVEMENT STATE) | 2135 ENVIRONMENT STATE (ACCOUNT OF ACQUAINTANCE WHO IS ALSO PRESENT) | 2136 PHOTOGRAPHING DEVICE ID | 2137 DISTANCE | 2138 IMAGE SIZE | ... |
|---|---|---|---|---|---|---|---|---|---|
| 3124 | Yamada | 2012/9/15 | (x,y) | DRIVING CAR | — | A0532 | 3m | (100, 200) | ... |
| 6580 | Hanako | 2012/12/31 | (a,b) | STOPPED | Ai | E3867 | 1.5m | (160, 300) | ... |
| ... | | | | | | ... | ... | ... | ... |

IMAGE PROCESSING DEVICE, IMAGE PROCESSING SYSTEM, IMAGE PROCESSING METHOD, AND PROGRAM

BACKGROUND

The present disclosure relates to an image processing device, an image processing system, an image processing method, and a program.

In the past, a variety of digital still cameras or digital video cameras for general consumers have been developed, to enable still images or moving images photographed by individuals to be viewed together with family or acquaintances. Further, a variety of information sharing services such as social networking services (SNSs) or blogs have been constructed, and thus chances for still images or moving images photographed by individuals to be shown to unspecified people have increased. From this background, there is presently a demand for privacy protection of photographic images.

For example, Japanese Unexamined Patent Application Publication No. 2009-033738 discloses a technology for generating a processed image by applying processing on a face region of a photographic image. Japanese Unexamined Patent Application Publication No. 2009-033738 also discloses a technology for storing a processed image, restoration information used to specify the content of the processing, and authority management information used to manage authority to restore the processed image in association therewith in an image file.

SUMMARY

In the technology of the related art, however, a request for privacy protection from a photographic subject may not be reflected in a photographic image. For example, even when a photographic subject hates being photographed, the photographing itself may not be restricted and the photographic subject may not be controlled such that the photographic subject is recorded in an unidentifiable form.

It is desirable to provide a novel and improved image processing device, a novel and improved image processing system, a novel and improved processing method, and a novel and improved program capable of reflecting a request for privacy protection of a photographic subject in a photographic image.

According to an embodiment of the present disclosure, there is provided an image processing device including a photographic subject position acquisition unit that acquires position information of a photographic subject corresponding to a person image included in a photographic image, a transmission unit that transmits the position information of the photographic subject to an information processing device that compares the position information of the photographic subject with position information of a communication terminal transmitted from the communication terminal, and a determination unit that determines whether a process of protecting the person image is performed based on information according to a result of the comparison received from the information processing device.

Further, according to an embodiment of the present disclosure, there is provided an information processing device including a storage unit that stores position information of a communication terminal received from the communication terminal, a reception unit that receives position information of a photographic subject corresponding to a person image included in a photographic image from an image processing device, a comparison unit that compares the position information of the communication terminal stored in the storage unit with the position information of the photographic subject, and a transmission unit that transmits, to the image processing device, information prescribing whether to perform a process of protecting the person image according to a result of the comparison performed by the comparison unit.

Further, according to an embodiment of the present disclosure, there is provided an image processing system including a communication terminal, an information processing device, and an image processing device. The communication terminal includes a position information acquisition unit that acquires position information, and a transmission unit that transmits the position information acquired by the position information acquisition unit to the information processing device. The information processing device includes a storage unit that stores the position information of the communication terminal received from the communication terminal, a reception unit that receives position information of a photographic subject corresponding to a person image included in a photographic image from the image processing device, a comparison unit that compares the position information of the communication terminal stored in the storage unit with the position information of the photographic subject, and a transmission unit that transmits, to the image processing device, information prescribing whether to perform a process of protecting the person image according to a result of the comparison performed by the comparison unit. The image processing device includes a photographic subject position acquisition unit that acquires the position information of the photographic subject, a transmission unit that transmits the position information of the photographic subject to the information processing device, and a determination unit that determines whether the process of protecting the person image is performed based on the information according to the result of the comparison received from the information processing device.

Further, according to an embodiment of the present disclosure, there is provided an image processing method including acquiring position information of a photographic subject corresponding to a person image included in a photographic image, transmitting the position information of the photographic subject to an information processing device that compares the position information of the photographic subject with position information of a communication terminal transmitted from the communication terminal, and determining whether a process of protecting the person image is performed based on information according to a result of the comparison received from the information processing device.

Further, according to an embodiment of the present disclosure, there is provided an information processing method including storing position information of a communication terminal received from the communication terminal, receiving position information of a photographic subject corresponding to a person image included in a photographic image from an image processing device, including the stored position information of the communication terminal with the position information of the photographic subject, and transmitting, to the image processing device, information prescribing whether to perform a process of protecting the person image according to a result of the comparison.

Further, according to an embodiment of the present disclosure, there is provided a program causing a computer to function as a photographic subject position acquisition unit that acquires position information of a photographic subject corresponding to a person image included in a photographic image, a transmission unit that transmits the position information of the photographic subject to an information processing device that compares the position information of the photographic subject with position information of a communication terminal transmitted from the communication terminal, and a determination unit that determines whether a process of protecting the person image is performed based on information according to a result of the comparison received from the information processing device.

Further, according to an embodiment of the present disclosure, there is provided a program causing a computer to function as a storage unit that stores position information of a communication terminal received from the communication terminal, a reception unit that receives position information of a photographic subject corresponding to a person image included in a photographic image from an image processing device, a comparison unit that compares the position information of the communication terminal stored in the storage unit with the position information of the photographic subject, and a transmission unit that transmits, to the image processing device, information prescribing whether to perform a process of protecting the person image according to a result of the comparison performed by the comparison unit.

According to embodiments of the present disclosure described above, it is possible to reflect a request for privacy protection from a photographic subject in a photographic image.

BRIEF DESCRIPTION OF THE DRAWINGS

FIG. 5 is a diagram illustrating an example of the configuration of a position and environment state storage unit according to the first embodiment;

FIG. 6 is a diagram illustrating an example of the configuration of a photographing approval condition storage unit according to the first embodiment;

FIG. 18 is a diagram illustrating an example of the configuration of a position and photographing approval storage unit according to the second embodiment;

FIG. 29 is a diagram illustrating an example of the configuration of a schedule management server according to the sixth embodiment;

FIG. 37 is a diagram illustrating an example of the configuration of a position sharing server according to the eighth embodiment;

FIG. 42 is a diagram illustrating an example of the configuration of an image ID storage unit according to the tenth embodiment;

FIG. 48 is a diagram illustrating an example of the configuration of a position and environment state storage unit according to an eleventh embodiment of the present disclosure;

FIG. 49 is a diagram illustrating an example of the configuration of an image ID storage unit according to the eleventh embodiment;

DETAILED DESCRIPTION OF THE EMBODIMENTS

Figure 1:
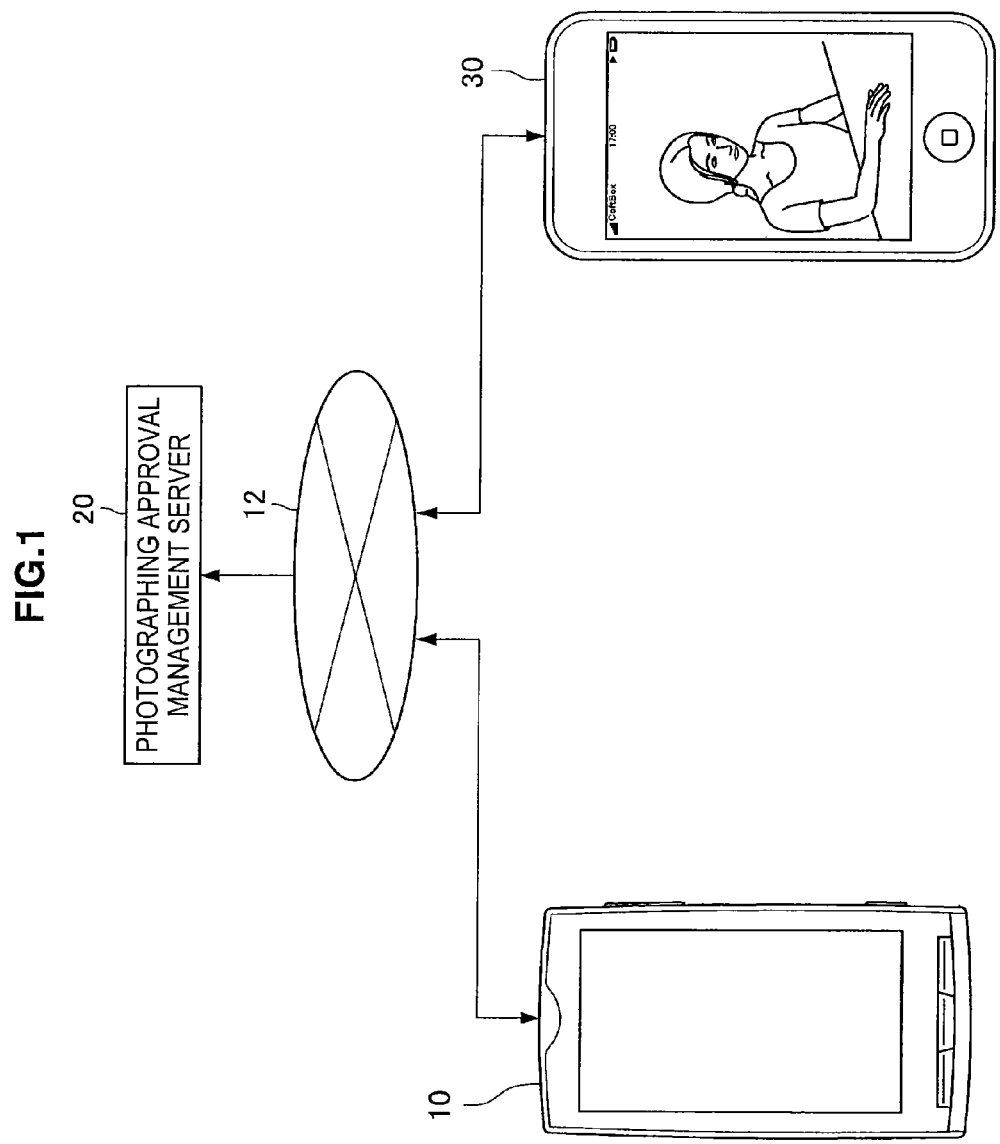
FIG. 1 is a diagram illustrating the configuration of an image processing system according to each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, a plurality of constituent elements having substantially the same function and configuration are distinguished from each other by suffixing different letters after the same reference numeral in some cases. For example, a plurality of constituent elements having substantially the same function and configuration are distinguished from each other, as in communication terminals 10a and 10b, as necessary. However, when it is not necessary to distinguish the plurality of constituent elements having substantially the same function and configuration from each other, only the same reference numeral is given. For example, when it is not necessary to particularly distinguish the communication terminals 10a and 10b from each other, the communication terminals 10a and 10b are simply referred to as the communication terminals 10.

"Embodiments of the present disclosure" will be described in the order of the following items.

1. Basic configuration of image processing system
    2. Overview of embodiments of the present disclosure
    3. Detailed description of each embodiment
    3-1. First embodiment
    3-2. Second embodiment
    3-3. Third embodiment
    3-4. Fourth embodiment
    3-5. Fifth embodiment
    3-6. Sixth embodiment
    3-7. Seventh embodiment
    3-8. Eighth embodiment
    3-9. Ninth embodiment
    3-10. Tenth embodiment
    3-11. Eleventh embodiment
    4. Summarization
    5. Modification examples
    5-1. First modification example
    5-2. Second modification example

1. Basic Configuration of Image Processing System

Embodiments of the present disclosure can be realized in various ways and "3-1. First embodiment" to "3-11. Eleventh embodiment" will be described in detail as examples. A photographing terminal 30 according to each embodiment of the present disclosure includes:

A. a photographic subject position acquisition unit 304 that acquires position information of a photographic subject corresponding to a person image included in a photographic image;

B. a communication unit 310 (transmission unit) that transmits the position information of the photographic subject to a photographing approval management server 20 (information processing device) that compares position information of a communication terminal 10 transmitted from the communication terminal 10 with the position information of the photographic subject; and C. a determination unit 312 that determines whether a process of protecting the person image is performed based on information according to the result of the comparison received from the photographing approval management server 20.

The photographing approval management server 20 according to each embodiment of the present disclosure includes:

D. a position and environment state storage unit 202 (storage unit) that stores the position information of the communication terminal 10 received from the communication terminal 10;

E. a communication unit 200 (reception unit) that receives the position information of the photographic subject corresponding to the person image included in the photographic image from the photographing terminal 30 (image processing device);

F. a comparison unit 204 that compares the position information of the communication terminal 10 stored in the position and environment state storage unit 202 with the position information of the photographic subject; and G. a communication unit 200 (transmission unit) that transmits, to the photographing terminal 30 (image processing device), information prescribing whether to perform the process of protecting the person image according to the result of the comparison performed by the comparison unit 204.

First, a basic configuration of an image processing system common to such embodiments will be described below with reference to FIG. 1. As illustrated in FIG. 1, the image processing system according to each embodiment of the present disclosure includes the communication terminal 10, a communication network 12, the photographing approval management server 20, and the photographing terminal 30.

(Communication Terminal 10)

The communication terminal 10 is a communication terminal that is held by a person (hereinafter referred to as a photographic subject) to be photographed by the photographing terminal 30. The communication terminal 10 has a positioning function, a communication function, a screen display function, a watch function, and the like and includes an acceleration sensor, a gyroscope, a pressure sensor, and a geomagnetic sensor. Here, the positioning function may be, for example, a function of receiving positioning signals from positioning satellites of the Global Positioning System (GPS), the Global Navigation Satellite System (GLONASS), or the like and positioning a current position. The positioning function may be a function of receiving WiFi radio waves from a plurality of base stations and positioning a current position based on the reception strengths of the received WiFi radio waves and the positions of the respective base stations. The positioning function may be a function of positioning a current position based on communication between Bluetooth access points installed in a communicable range.

The communication terminal 10 may be, for example, a mobile phone such as a smartphone, a tablet terminal, a personal digital assistant (PDA), a laptop type personal computer (PC), a digital still camera, a digital video camera, a wristwatch, a glasses-type terminal, or a game device.

(Communication Network 12)

The communication network 12 is a wireless or wired transmission path of information transmitted from a device connected to the communication network 12. For example, the communication network 12 may include the Internet, a telephone circuit network, a public circuit network such as a satellite communication network, various local area networks (LANs) including Ethernet (registered trademark), and a wide area network (WAN). The communication network 12 may also include a dedicated circuit network such as an internet protocol-virtual private network (IP-VPN).

(Photographing Terminal 30)

The photographing terminal 30 is a photographing terminal that photographs a still image or a moving image. The photographing terminal 30 has a photographing function, a positioning function, a communication function, a screen display function, and the like. The positioning function may be the same as the positioning function which the communication terminal 10 has. The photographing terminal 30 may be, for example, a digital still camera, a digital video camera, a mobile phone such as a smartphone, a tablet terminal, a glasses-type terminal, or a game device.

(Photographing Approval Management Server 20)

The photographing approval management server 20 is a computer connected to the communication network 12, and transmits and receives various kinds of data to and from the communication terminal 10 or the photographing terminal 30.

Figure 2:
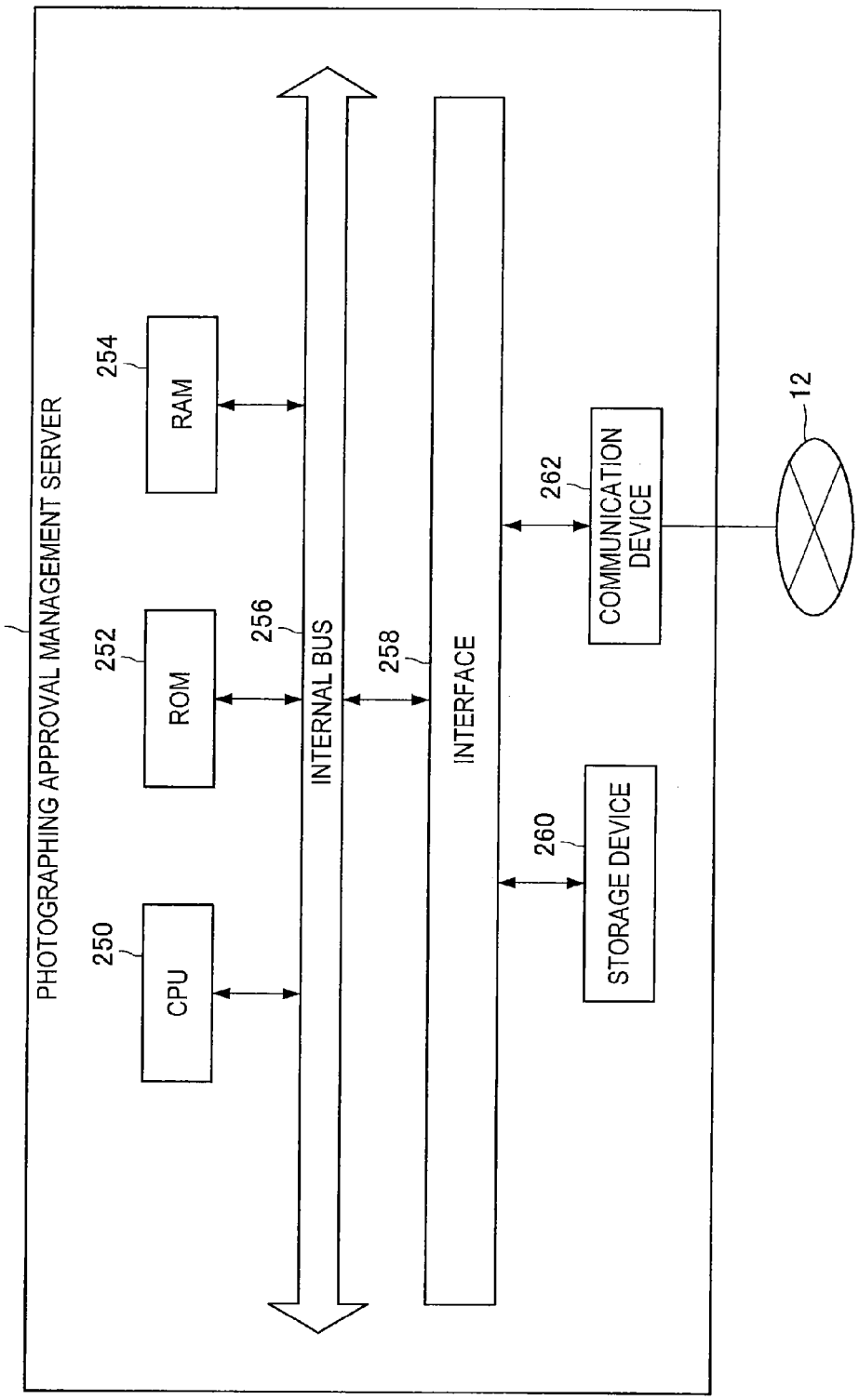
FIG. 2 is a diagram illustrating a hardware configuration of a photographing approval management server according to each embodiment of the present disclosure.

The photographing approval management server 20 has, for example, a hardware configuration illustrated in FIG. 2. As illustrated in FIG. 2, the photographing approval management server 20 includes a central processing unit (CPU) 250, a read-only memory (ROM) 252, a random access memory (RAM) 254, an internal bus 256, an interface 258, a storage device 260, and a communication device 262.

For example, the CPU 250 is configured as an example of the comparison unit 204 and a condition determination unit 208 of the photographing approval management server 20 according to each embodiment of the present disclosure to be described below. The CPU 250 functions as an arithmetic processing unit and a control unit and controls a general process in the photographing approval management server 20 according to various programs. The CPU 250 may be a microprocessor.

The ROM 252 stores a program, an arithmetic parameter, and the like used by the CPU 250. The RAM 254 temporarily stores a program to be executed by the CPU 250, a parameter appropriately changed in the execution, and the like. The CPU 250, the ROM 252, and the RAM 254 are connected to each other by the internal bus 256 configured from a CPU bus or the like.

The interface 258 connects the storage device 260 and the communication device 262 to the internal bus 256. For example, the storage device 260 exchanges data with the RAM 254 or the like via the interface 258 and the internal bus 256.

The storage device 260 is, for example, a data storage device that is configured as an example of the position and environment state storage unit 202 and a photographing approval condition storage unit 206 of the photographing approval management server 20 according to each embodiment of the present disclosure to be described below. The storage device 260 may include a storage medium, a recording device that records data on the storage medium, a reading device that reads data from the storage medium, and a deletion device that deletes the data recorded on the storage medium. The storage device 260 stores a program executed by the CPU 250 or various kinds of data.

The communication device 262 is, for example, a communication interface that is configured as a communication device or the like connected to the communication network 12 and is configured as an example of a communication unit 110 of the photographing approval management server 20 according to each embodiment of the present disclosure. The communication device 262 may be a communication device corresponding to a wireless LAN, a communication device corresponding to Long Term Evolution (LTE), or a wired communication device that performs communication using a wired line.

The communication terminal 10 and the photographing terminal 30 may have the same hardware configuration as the above-described photographing approval management server 20.

2. Overview of Embodiments of the Present Disclosure

The basic configuration of the image processing system according to each embodiment of the present disclosure has been described above. Next, an overview of the above-described image processing system according to each embodiment of the present disclosure will be described.

Figure 3:
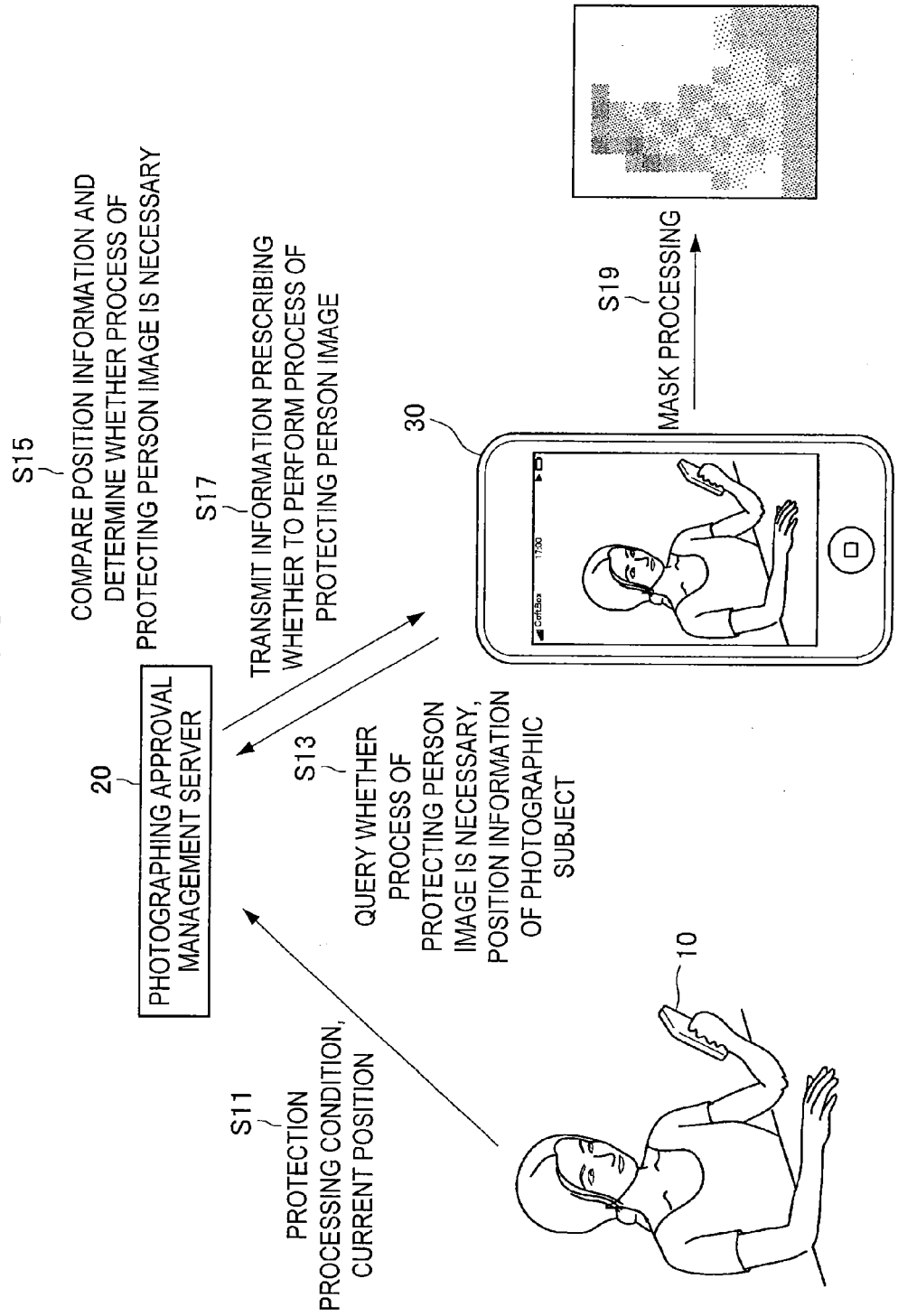
FIG. 3 is a diagram illustrating an overall process according to each embodiment of the present disclosure.

FIG. 3 is a diagram illustrating an overall process according to each embodiment of the present disclosure. As illustrated in FIG. 3, the communication terminal 10 first acquires the position information of the communication terminal 10 and allows a possessor of the communication terminal 10 to set a protection processing condition such as a photographing approval condition regarding the possessor. Then, the communication terminal 10 transmits the acquired position information and the set protection processing condition to the photographing approval management server 20 (S11). The photographing approval management server 20 stores the received position information and the received protection processing condition in association therewith.

Subsequently, when a photographic image including a person image is photographed, the photographing terminal 30 calculates the position information of a photographic subject corresponding to the person image based on the position information of the photographing terminal 30. Then, the photographing terminal 30 queries whether a process of protecting the person image is necessary to the photographing approval management server 20 and transmits the position information of the photographic subject (S13).

Subsequently, the photographing approval management server 20 compares the position information transmitted from the communication terminal 10 with the position information of the photographic subject transmitted from the photographing terminal 30. Then, the photographing approval management server 20 determines whether the process of protecting the person image is necessary based on the result of the comparison (S15).

Subsequently, the photographing approval management server 20 transmits information prescribing whether to perform the process of protecting the person image to the photographing terminal 30 (S17). Then, for example, when the photographing terminal 30 receives the information prescribing whether to perform the process of protecting the person image from the photographing approval management server 20, the photographing terminal 30 performs a protection process such as mask processing on the person image (S19).

Since the above-described process is realized in an embodiment of the present disclosure, the possessor of the communication terminal 10 can reflect a request for privacy protection in the photographic image by setting the protection processing condition according to the intention of the processor himself or herself.

3. Detailed Description of Each Embodiment

The overview of the embodiments of the present disclosure has been described above. Next, the embodiments of the present disclosure will be described sequentially in detail.

3-1. First Embodiment

3-1-1. Configuration of First Embodiment

3-1-1-1. Communication Terminal 10

Figure 4:
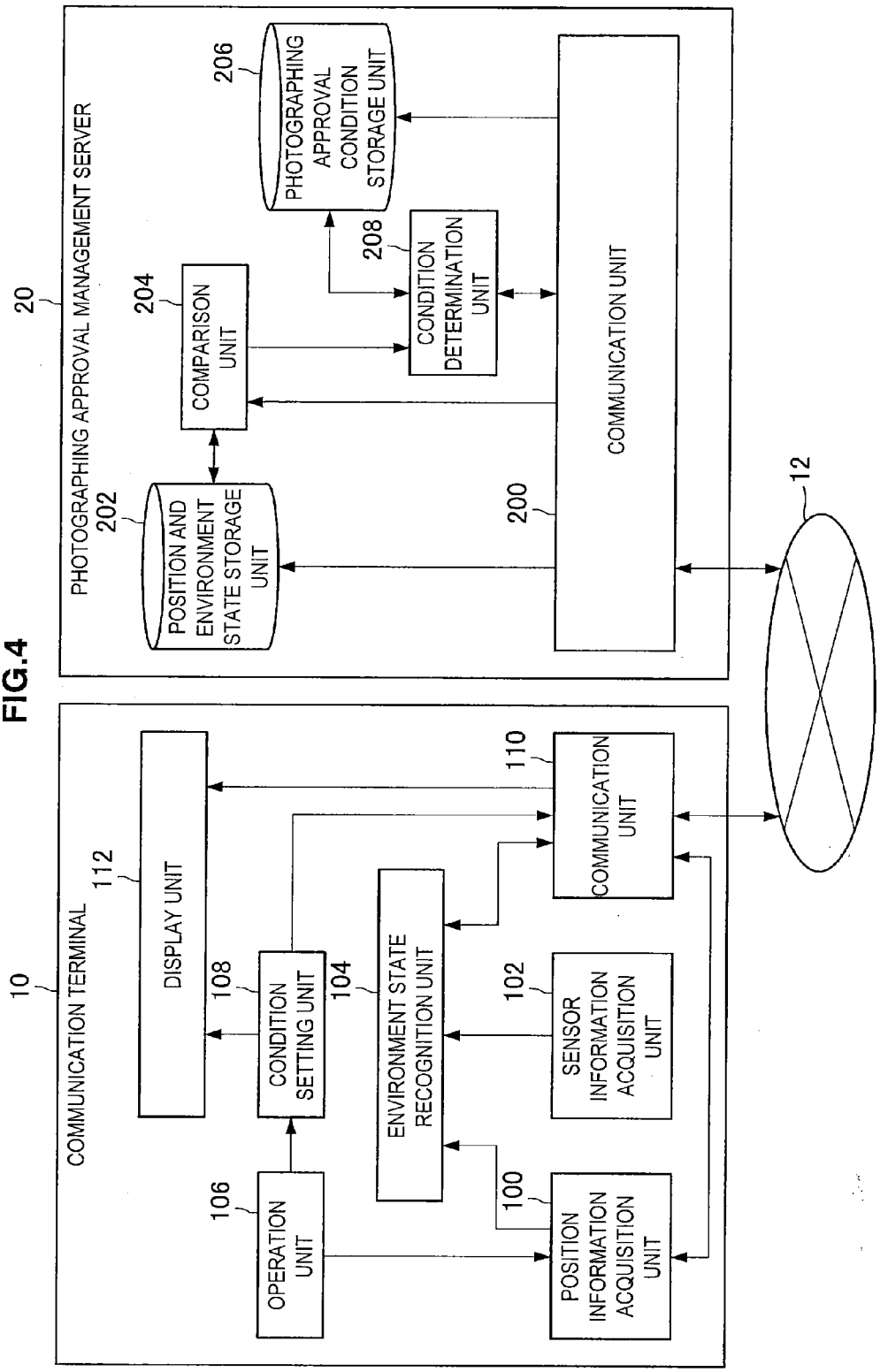
FIG. 4 is a functional block diagram illustrating the configurations of a communication terminal and a photographing approval management server according to a first embodiment of the present disclosure.

FIG. 4 is a functional block diagram illustrating the configurations of a communication terminal 10 and a photographing approval management server 20 according to a first embodiment of the present disclosure. As illustrated in FIG. 4, the communication terminal 10 according to the first embodiment of the present disclosure includes a position information acquisition unit 100, a sensor information acquisition unit 102, an environment state recognition unit 104, an operation unit 106, a condition setting unit 108, a communication unit 110, and a display unit 112.

The position information acquisition unit 100 has a function of acquiring current position information of the communication terminal 10. For example, the position information acquisition unit 100 may be realized by a GPS antenna that receives GPS signals from a plurality of GPS satellites and a GPS processing unit that calculates position information indicating the current position of the communication terminal 10 based on the received GPS signals. The position information acquisition unit 100 may acquire the current position information of the communication terminal 10 using a positioning satellite other than the GPS. Here, the position information acquisition unit 100 may use a positioning signal from one kind of satellite or may combine and use positioning signals from a plurality of kinds of satellites. A configuration used to acquire the position information can be changed appropriately according to technology levels at execution times. Further, the position information acquisition unit 100 may be realized by a receiver that receives Wireless Fidelity (WiFi) radio waves from a plurality of base stations and a current position calculation unit that estimates a distance between the communication terminal and each base station using the reception strength of the received WiFi radio waves and calculates the current position using the distance between the communication terminal and each base station and the position of each base station based on the triangulation principle. Alternatively, the position information acquisition unit 100 has not only an absolute positioning function but also an autonomous navigation function of calculating the current position using a traveling direction and a velocity acquirable from a gyro sensor and an acceleration sensor.

The position information acquisition unit 100 automatically acquires the position information of the communication terminal 10 at each predetermined time interval. Alternatively, the position information acquisition unit 100 may acquire the position information of the communication terminal 10 whenever the sensor information acquisition unit 102 to be described below detects movement of the communication terminal 10.

The sensor information acquisition unit 102 acquires various kinds of information via various sensors and various devices of the communication terminal 10. For example, the sensor information acquisition unit 102 acquires an acceleration of the communication terminal 10, an angle of the communication terminal 10, an atmospheric pressure, geomagnetism, a time, and the like.

The environment state recognition unit 104 determines a current environment state of the communication terminal 10 based on the position information acquired by the position information acquisition unit 100 and the sensor information acquired by the sensor information acquisition unit 102. The environment state recognition unit 104 may determine an environment state of the communication terminal 10 based on the position information acquired by the position information acquisition unit 100 and information received by the communication unit 110 and indicating the environment state. Here, the environment state refers to a state relevant to the communication terminal 10 or the possessor of the communication terminal 10. For example, the environment state may include a movement state of the processor of the communication terminal 10, a person located around the possessor of the communication terminal 10, registration content regarding a relationship between the possessor of the communication terminal 10 and other participants in a predetermined SNS, a schedule of the possessor of the communication terminal 10, or a time.

For example, the environment state recognition unit 104 may determine the movement state as "riding a vehicle," "walking," "jogging," "stopped," or the like based on frequency components of the acceleration of the communication terminal 10 acquired by the sensor information acquisition unit 102. The environment state recognition unit 104 may receive position information of an acquaintance of the possessor of the communication terminal 10 from a device managing position information, such as a position sharing server 60 to be described below in an eighth embodiment, and may determine whether the acquaintance is located within a joint photographic range.

The operation unit 106 receives various operations performed by the possessor of the communication terminal 10. The operation unit 106 may receive, for example, an operation of setting a photographing approval condition set by the condition setting unit 108 or an operation of specifically designating a mask processing method performed by the photographing terminal 30, as will be described below.

The condition setting unit 108 sets various conditions such as a photographing approval condition through an operation performed on the operation unit 106 by the possessor of the communication terminal 10. The condition setting unit 108 may set necessary or auxiliary information set to use the image processing system, such as an account set to use the image processing system according to each embodiment of the present disclosure or an SNS account set to use a predetermined SNS.

The communication unit 110 transmits and receives various kinds of information to and from the photographing approval management server 20 via the communication network 12. For example, the communication unit 110 transmits the position information acquired by the position information acquisition unit 100 to the photographing approval management server 20 or receives a photographing permission request made by the photographing terminal 30 from the photographing approval management server 20.

The display unit 112 displays various display screens such as a screen used for the possessor of the communication terminal 10 to input various conditions to the condition setting unit 108.

The configuration of the communication terminal 10 according to the first embodiment has been described above, but an embodiment of the present disclosure is not limited to the above-described configuration. For example, the environment state recognition unit 104 may not be included. At least one of the sensor information acquisition unit 102, the environment state recognition unit 104, the operation unit 106, the condition setting unit 108, and the display unit 112 may be included in another device.

3-1-1-2. Photographing Approval Management Server 20

As illustrated in FIG. 4, the photographing approval management server 20 according to the first embodiment of the present disclosure includes a communication unit 200, a position and environment state storage unit 202, a comparison unit 204, a photographing approval condition storage unit 206, and a condition determination unit 208.

The communication unit 200 transmits and receives various kinds of information to and from the communication terminal 10 or the photographing terminal 30 via the communication network 12. For example, the communication unit 200 receives position information of a photographic subject corresponding to a person image included in a photographic image from the photographing terminal 30 or receives a protection processing condition from the communication terminal 10, and transmits information prescribing whether to perform a process of protecting the person image according to a result of the comparison performed by the comparison unit 204 to the photographing terminal 30.

Here, the protection processing condition may be a condition regarding the process of protecting the person image included in a photographic image before photographing performed by the photographing terminal 30. For example, the protection processing condition may be a photographing approval condition which is a condition set to designate photographing approval or disapproval of a photographic image before the photographing performed by the photographing terminal 30. Further, the process of protecting the person image may be mask processing which is performed on a person image included in a photographic image after the photographing performed by the photographing terminal 30. The process of protecting the person image may be a process for which the photographing terminal 30 is not permitted to perform photographing on a photographic subject corresponding to the person image before the photographing performed by the photographing terminal 30. In this specification, hereinafter, a photographic image is assumed to include an image before the photographing, that is, an image formed by a lens of the photographing terminal 30 and displayed on a finder of the photographing terminal 30 or an image after the photographing, that is, an image captured by an imaging unit 300 of the photographing terminal 30 to be described below, and then stored in a storage unit 316.

The position and environment state storage unit 202 stores the account, the position information, and the environment state received from the communication terminal 10 in association therewith. Here, the account may be an account set to use the image processing system according to the first embodiment.

FIG. 5 is a diagram illustrating an example of the configuration of the position and environment state storage unit 202 according to the first embodiment of the present disclosure. As illustrated in FIG. 5, the position and environment state storage unit 202 may store an account column 2020, a position information column 2022, and an environment state column 2024 in association therewith. For example, data shown in the second row of FIG. 5 indicates that "(x, y)" is received as position information and "driving car" is received as an environment state from the communication terminal 10 used by a possessor of which an account is "Yamada." In FIG. 5, for example, 2-dimensional data including information regarding latitude and longitude is stated as the position information, but embodiments of the present disclosure are not limited to this example. For example, 3-dimensional data including information regarding latitude, longitude, and altitude may be used.

The comparison unit 204 compares the position information of the communication terminal 10 stored in the position and environment state storage unit 202 with the position information of the photographic subject received from the photographing terminal 30. The comparison unit 204 transmits the position information and the account to the condition determination unit 208, when the comparison unit 204 determines that the position information is identical or a difference of the position information is less than a predetermined threshold value by the above-described comparison.

The photographing approval condition storage unit 206 stores the account received from the communication terminal 10 and, for example, the protection processing condition such as a photographing approval condition in association therewith.

FIG. 6 is a diagram illustrating an example of the configuration of the photographing approval condition storage unit 206 according to the first embodiment. As illustrated in FIG. 6, the photographing approval condition storage unit 206 may store an account column 2060 and a photographing approval condition column 2062 in association therewith. For example, data shown in the second row of FIG. 6 indicates that "disapproval when moving" is received as the photographing approval condition from the communication terminal 10 used by the possessor of which the account is "Yamada."

The condition determination unit 208 determines whether the environment state of the communication terminal 10 satisfies the protection processing condition which is a condition regarding the process of protecting the person image. The condition determination unit 208 determines whether the process of protecting the person image is performed according to the result of the comparison performed by the comparison unit 204 and the result of the above-described determination performed by the condition determination unit 208. More specifically, the condition determination unit 208 determines whether the environment state stored in the position and environment state storage unit 202 satisfies the protection processing condition stored in the photographing approval condition storage unit 206 with regard to the account for which the comparison unit 204 determines that the position information is identical or the difference is less than the predetermined threshold value.

For example, when a range of distance information from the photographing terminal 30 to a photographic subject is set as the protection processing condition, the condition determination unit 208 may determine whether the distance information up to the photographic subject received from the photographing terminal 30 satisfies the protection processing condition. In the examples illustrated in FIGS. 5 and 6, with regard to the account of "Yamada," a value of the environment state column 2024 in the position and environment state storage unit 202 is "driving car" and a value of the photographing approval condition column 2062 in the photographing approval condition storage unit 206 is "disapproval when moving." Therefore, the condition determination unit 208 may determine the account of "Yamada" as an account of "photographing disapproval."

According to each embodiment of the present disclosure, hardware such as the CPU 250, the ROM 252, and the RAM 254 included in the photographing approval management server 20 can be provided also as a computer program configured to execute the same function as each constituent element of the above-described photographing approval management server 20. A storage medium that stores the computer program is also provided.

3-1-1-3. Photographing Terminal 30

Figure 7:
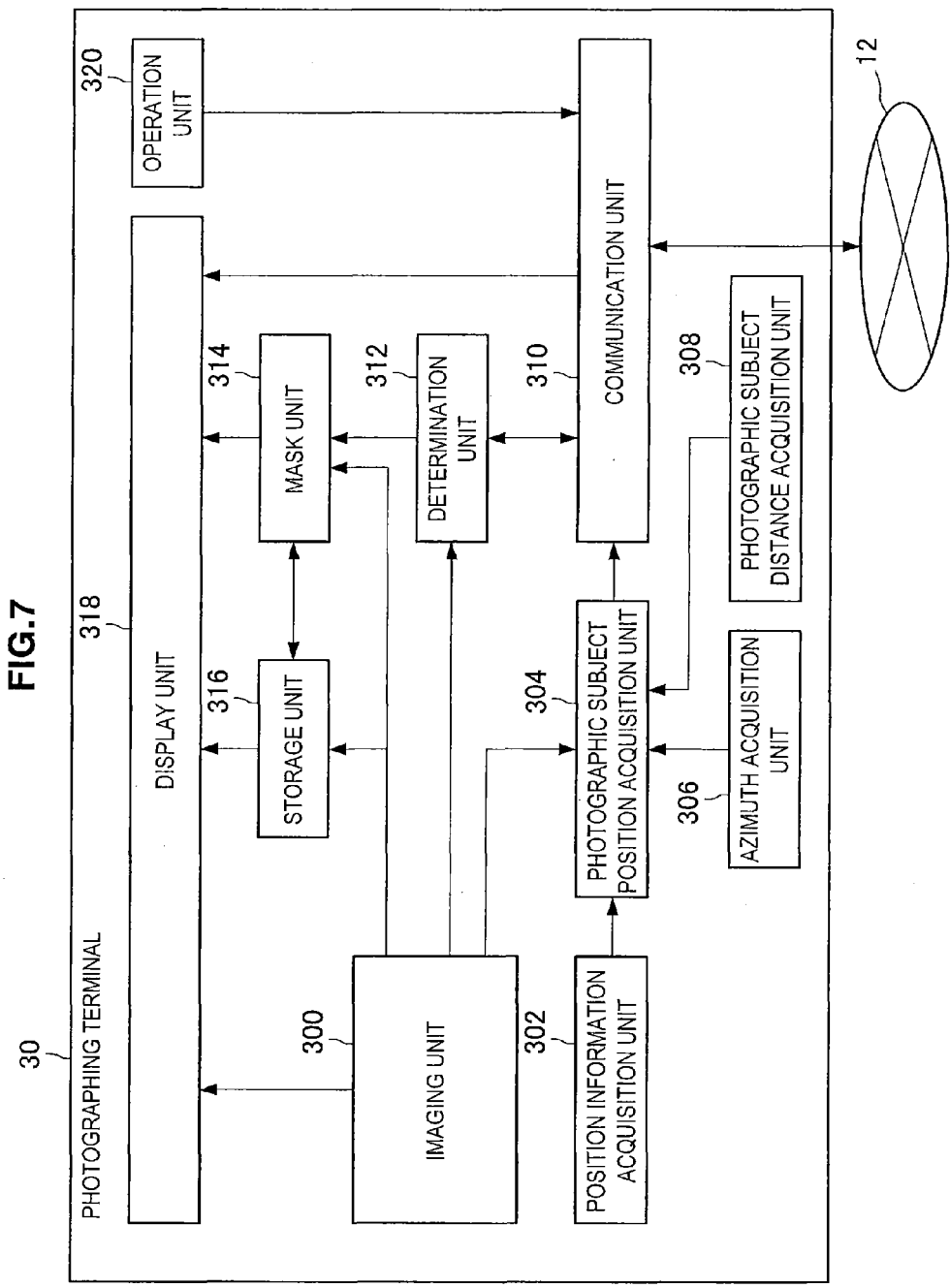
FIG. 7 is a functional block diagram illustrating the configuration of a photographing terminal according to the first embodiment.

As illustrated in FIG. 7, the photographing terminal 30 according to the first embodiment of the present disclosure includes an imaging unit 300, a position information acquisition unit 302, a photographic subject position acquisition unit 304, an azimuth acquisition unit 306, a photographic subject distance acquisition unit 308, a communication unit 310, a determination unit 312, a mask unit 314, a storage unit 316, a display unit 318, and an operation unit 320.

The imaging unit 300 has a function of forming an external image on an image sensor such as a charge coupled device (CCD) imaging plate through a lens of the photographing terminal 30 and photographing a still image or a moving image.

The position information acquisition unit 302 has a function of acquiring current position information of the photographing terminal 30. The position information acquisition unit 302 may acquire the position information of the photographing terminal 30 according to the same method as that of the position information acquisition unit 100 of the communication terminal 10. The position information acquisition unit 302 may automatically acquire the position information of the photographing terminal 30 at each predetermined time interval or may acquire the position information of the photographing terminal 30 when a photographer operates the operation unit 320.

Figure 8:
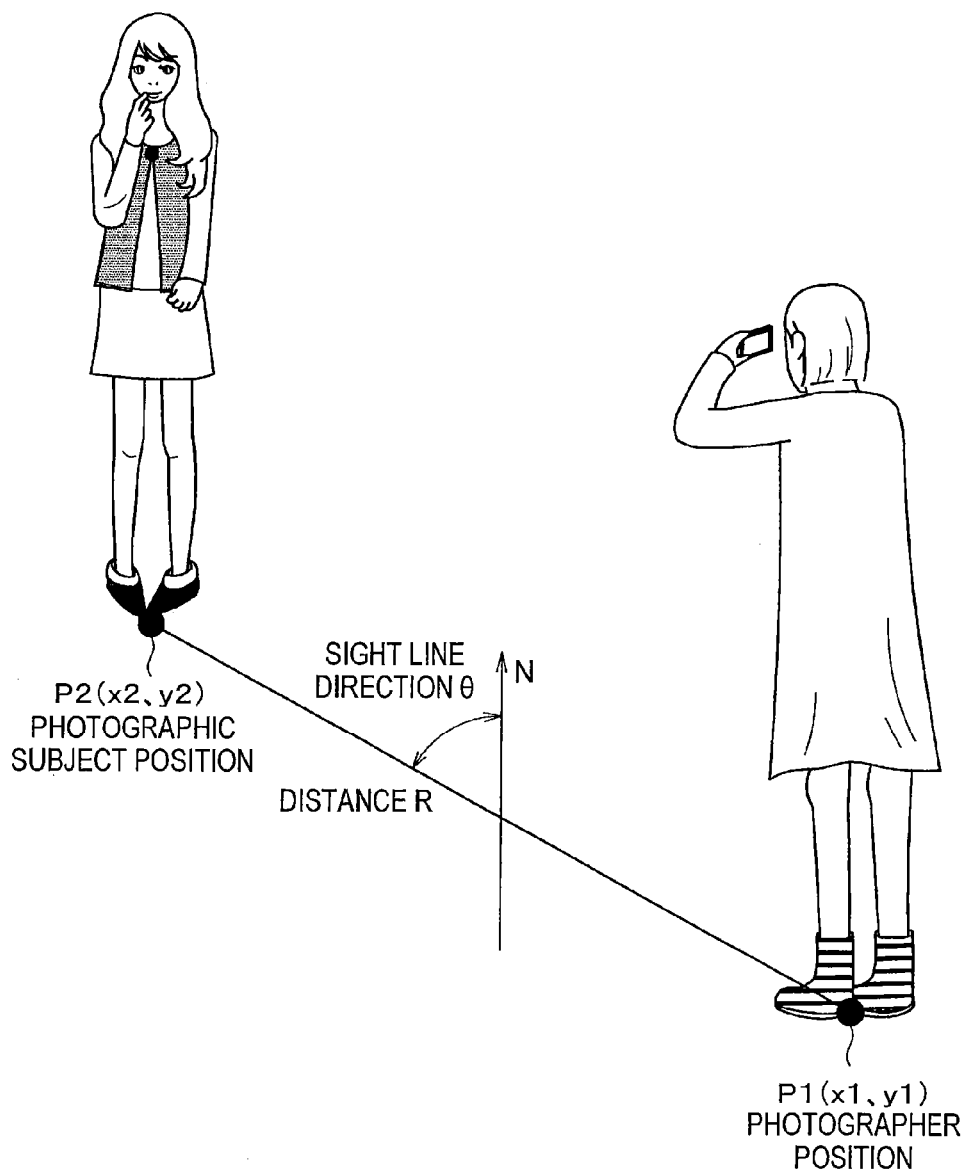
FIG. 8 is a diagram illustrating a method of estimating the position of a photographic subject according to the first embodiment.

The photographic subject position acquisition unit 304 acquires position information of a photographic subject corresponding to a person image included in a photographic image based on the position information of the photographing terminal 30. More specifically, for example, as illustrated in FIG. 8, the photographic subject position acquisition unit 304 calculates a position P2 (x2, y2) of a photographic subject based on a distance R from a position P1 (x1, y1) of the photographer to a photographic subject and a sight line direction $\theta_1$. Here, the position P1 of the photographer is acquired by the position information acquisition unit 302, as described above. The distance R up to the photographic subject is acquired by the photographic subject distance acquisition unit 308, as will be described below. The sight line direction $\theta_1$ is calculated by the photographic subject position acquisition unit 304, as will be described below.

Figure 9:
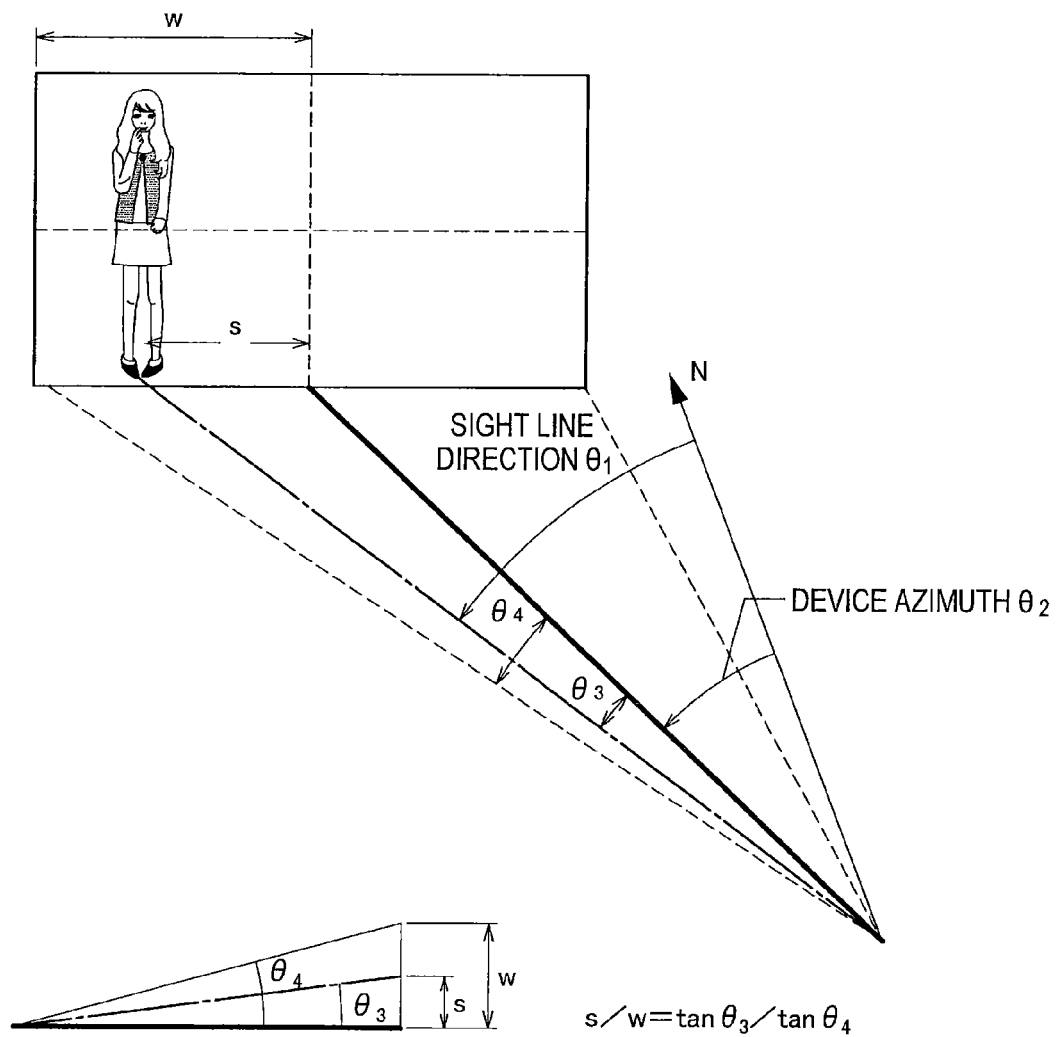
FIG. 9 is a diagram illustrating a method of specifying a sight line direction according to the first embodiment.

The photographic subject position acquisition unit 304 can calculate the sight line direction $\theta_1$ oriented toward the photographic subject based on the value of a device azimuth $\theta_2$ acquired from the azimuth acquisition unit 306 to be described below. For example, when the photographic subject is positioned near the middle of a display screen, the photographic subject position acquisition unit 304 can set the device azimuth $\theta_2$ as the sight line direction $\theta_1$. Alternatively, when the photographic subject is designated at a position deviated from the center of the display screen, the photographic subject position acquisition unit 304 can calculate the sight line direction $\theta_1$ by calculating an azimuth difference $\theta_3$ of the sight line direction $\theta_1$ from the device azimuth $\theta_2$ from the position of the photographic subject with respect to an angle of view. For example, as illustrated in FIG. 9, a relation of the following Equation (1) is established among an angle $\theta_3$ formed between the center of a screen and a photographic subject, an angle $\theta_4$ of half of an angle of view, the number of pixels s, and the number of pixels w.

$$s/w = \tan\theta_3/\tan\theta_4 \quad \text{Equation (1)}$$

Here, the number of pixels w is the number of pixels of half of a horizontal width of a display screen and the number of pixels s is the number of pixels indicating a distance from the center of the display screen to the position of a photographic subject. The photographic subject position acquisition unit 304 can calculate a value of the angle $\theta_3$ using Equation (1). Here, the device azimuth is acquired by the azimuth acquisition unit 306. The photographic subject position acquisition unit 304 can calculate the sight line direction $\theta_1$ by adding the angle $\theta_3$ between the center of the screen and the photographic subject to the device azimuth $\theta_2$ ($\theta_1 = \theta_2 + \theta_3$).

The azimuth acquisition unit 306 has a function of acquiring the device azimuth $\theta_2$ of the photographing terminal 30. The azimuth acquisition unit 306 can be realized using, for example, a triaxial acceleration sensor and a triaxial geomagnetic sensor. For example, the azimuth acquisition unit 306 can generate azimuth data indicating the device azimuth $\theta_2$ of the photographing terminal 30 based on posture angle data, which is generated by performing a predetermined posture angle detection process based on triaxial-direction acceleration data acquired by the triaxial acceleration sensor, and triaxial-direction geomagnetic data detected by the triaxial geomagnetic sensor.

Figure 10:
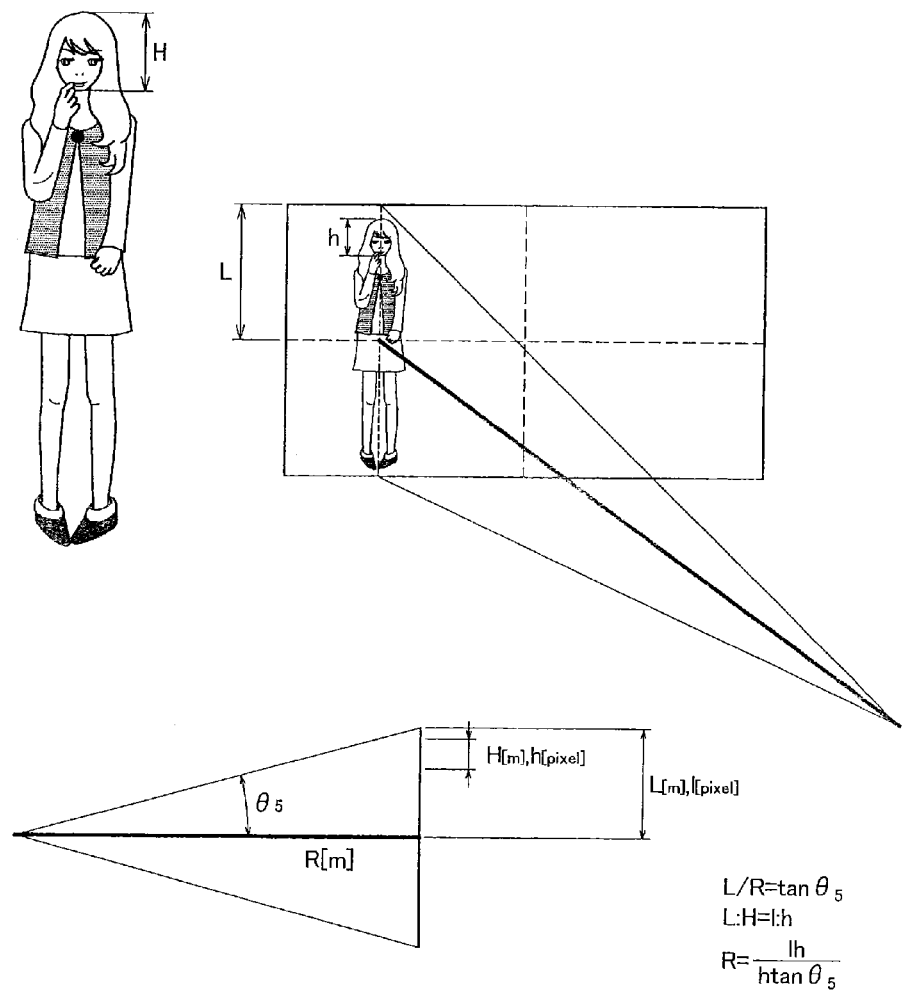
FIG. 10 is a diagram illustrating a first example of a method of estimating a distance from a photographer to the position of the photographic subject according to the first embodiment.

The photographic subject distance acquisition unit 308 acquires the distance R from the photographing terminal 30 to the photographic subject. For example, as illustrated in FIG. 10, the photographic subject distance acquisition unit 308 may acquire the distance R from the photographing terminal 30 to the photographic subject based on a size (the number of pixels) of the photographic subject on the display screen. In the example illustrated in FIG. 10, the photographic subject distance acquisition unit 308 assumes an average size H (m) of a face. The photographic subject distance acquisition unit 308 may calculate the distance R using the following relation based on the size h (pixel) of the face on the display screen. Specifically, the photographic subject distance acquisition unit 308 can derive Equation (4) by applying a relation of Equation (3) to Equation (2). The photographic subject distance acquisition unit 308 can calculate the distance R using Equation (4). Further, in Equation (2) to Equation (4), l is assumed to be a value of half of the vertical width of the display screen and L is assumed to be an actual distance corresponding to l.

$$\frac{L}{R} = \tan\theta_5 \quad \text{Equation (2)}$$

$$L:H = l:h \quad \text{Equation (3)}$$

$$R = \frac{lH}{h\tan\theta_5} \quad \text{Equation (4)}$$

Figure 11:
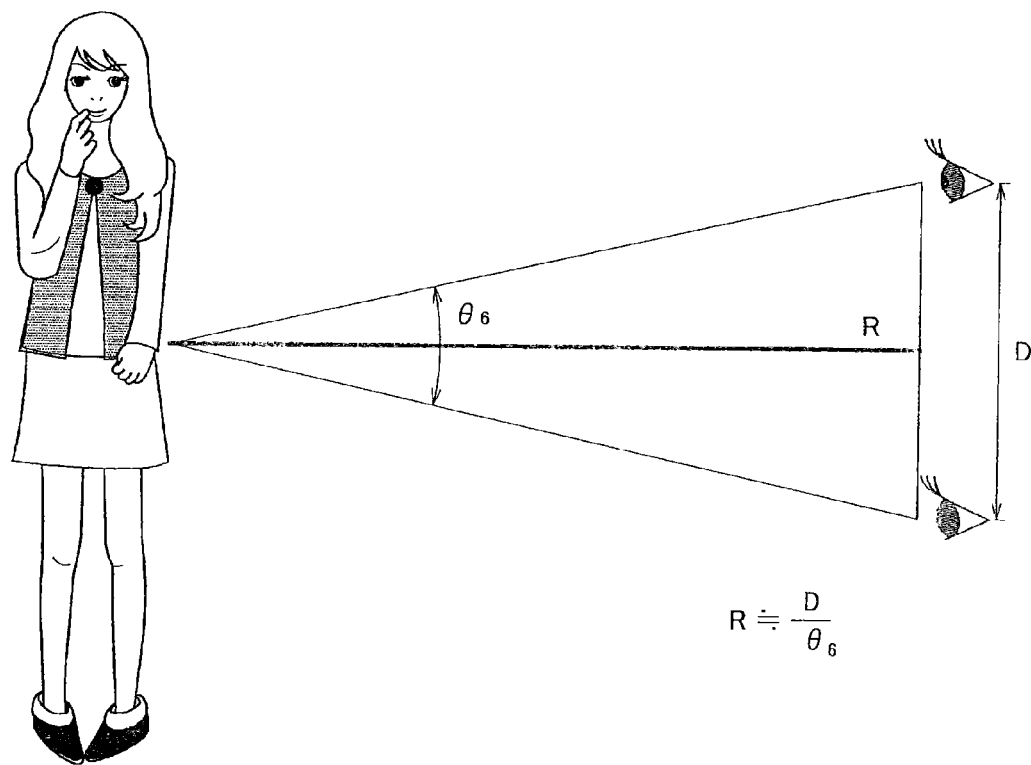
FIG. 11 is a diagram illustrating a second example of a method of estimating a distance from a photographer to the position of the photographic subject according to the first embodiment.

For example, as illustrated in FIG. 11, the photographic subject distance acquisition unit 308 can estimate the distance R from the photographing terminal 30 to the photographic subject based on parallax of a compound-eye camera. At this time, the photographic subject distance acquisition unit 308 can calculate the distance R using the following Equation (5).

$$R = \frac{D}{\theta_6} \quad \text{Equation (5)}$$

Figure 12:
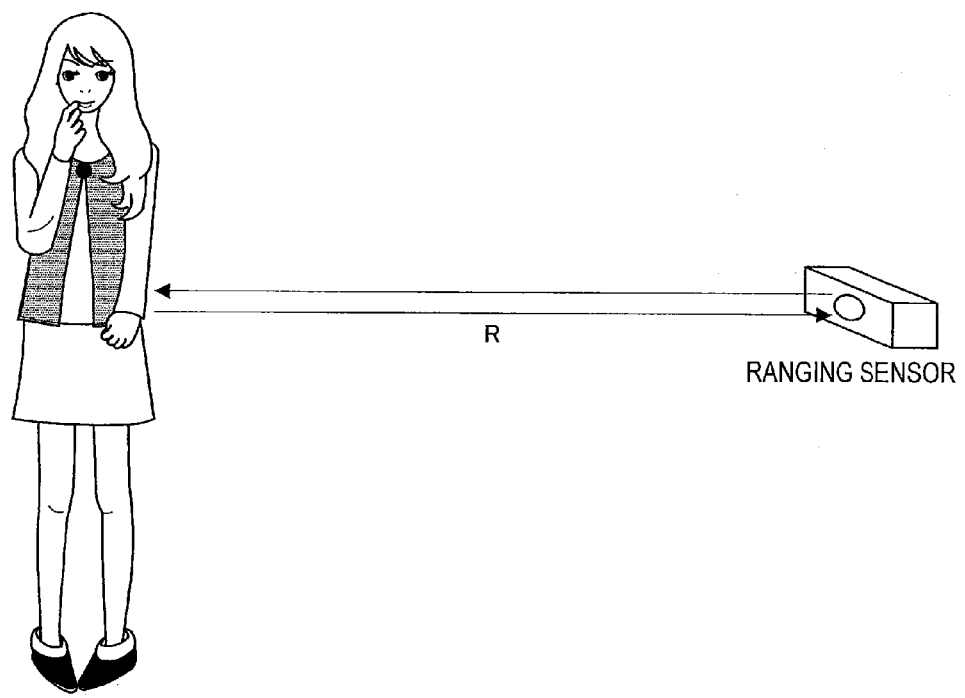
FIG. 12 is a diagram illustrating a third example of a method of estimating a distance from a photographer to the position of the photographic subject according to the first embodiment.

For example, as illustrated in FIG. 12, the photographic subject distance acquisition unit 308 may acquire the distance R from the photographing terminal 30 to the photographic subject using various ranging sensors. The ranging sensors used by the photographic subject distance acquisition unit 308 may be, for example, an ultrasonic wave ranging sensor, an electrostatic displacement ranging sensor, an optical ranging sensor, and an electromagnetic wave ranging sensor.

When the photographic subject is focused by the imaging unit 300, the photographic subject distance acquisition unit 308 may determine the distance up to the photographic subject obtained by the imaging unit 300 as a photographic subject distance.

Here, the configuration of the photographing terminal 30 will be described continuously with reference to FIG. 7. The communication unit 310 transmits and receives various kinds of information to and from the photographing approval management server 20 via the communication network 12. For example, the communication unit 310 transmits the position information of the photographic subject acquired by the photographic subject position acquisition unit 304 to the photographing approval management server 20 or receives information regarding photographing approval or disapproval for the photographic subject from the photographing approval management server 20.

The determination unit 312 determines whether the process of protecting the person image is performed based on information received from the photographing approval management server 20 and obtained according to the result of the comparison performed by the comparison unit 204. For example, when the information obtained according to the result of the comparison performed by the comparison unit 204 includes information prescribing to perform the process of protecting the person image, the determination unit 312 may determine that the process of protecting the person image is performed.

The mask unit 314 performs the mask processing on the person image included in the photographic image based on the result of the determination performed by the determination unit 312. For example, when the determination unit 312 determines that the process of protecting the person image is performed, the mask unit 314 may perform the mask processing on the person image. Here, the mask processing may be, for example, image processing performed to form mosaic in a predetermined region of an original image, image processing performed to substitute a person image with an icon such as a character in a predetermined region, image processing (that is, an image interpolation process based on a background image) performed to delete a person image in a predetermined region, image processing performed to substitute a person image with a specific color such as black in a predetermined region, or image processing performed to add an image effect in a predetermined region so that "halation" is recognized.

When an image processing method designated by the communication terminal 10 is received from the photographing approval management server 20, the mask unit 314 may perform the mask processing on the person image according to the designated image processing method.

The storage unit 316 stores an image photographed by the imaging unit 300 or an image subjected to the mask processing by the mask unit 314. The storage unit 316 may delete the photographic image stored in the storage unit when a photographic image deletion request made by the communication terminal 10 is received from the photographing approval management server 20.

The display unit 318 has a function of a finder that displays an image formed by the lens of the photographing terminal 30 before photographing. The display unit 318 displays the image stored in the storage unit 316 or the image subjected to the mask processing by the mask unit 314. The display unit 318 displays various display screens such as an operation screen used to operate the photographing terminal 30.

The operation unit 320 receives various operations performed by the photographer. For example, the operation unit 320 receives a photographing operation performed by the photographer, an operation of displaying an image stored in the storage unit 316, or the like on the display unit 318.

According to each embodiment of the present disclosure, a computer program can be also provided to cause hardware such as a CPU, a ROM, and a RAM included in the photographing terminal 30 to perform the same functions as the constituent elements of the above-described photographing terminal 30. A storage medium that stores the computer program is also provided.

3-1-2. Processes According to First Embodiment

3-1-2-1. Processes Before Photographing

Figure 13:
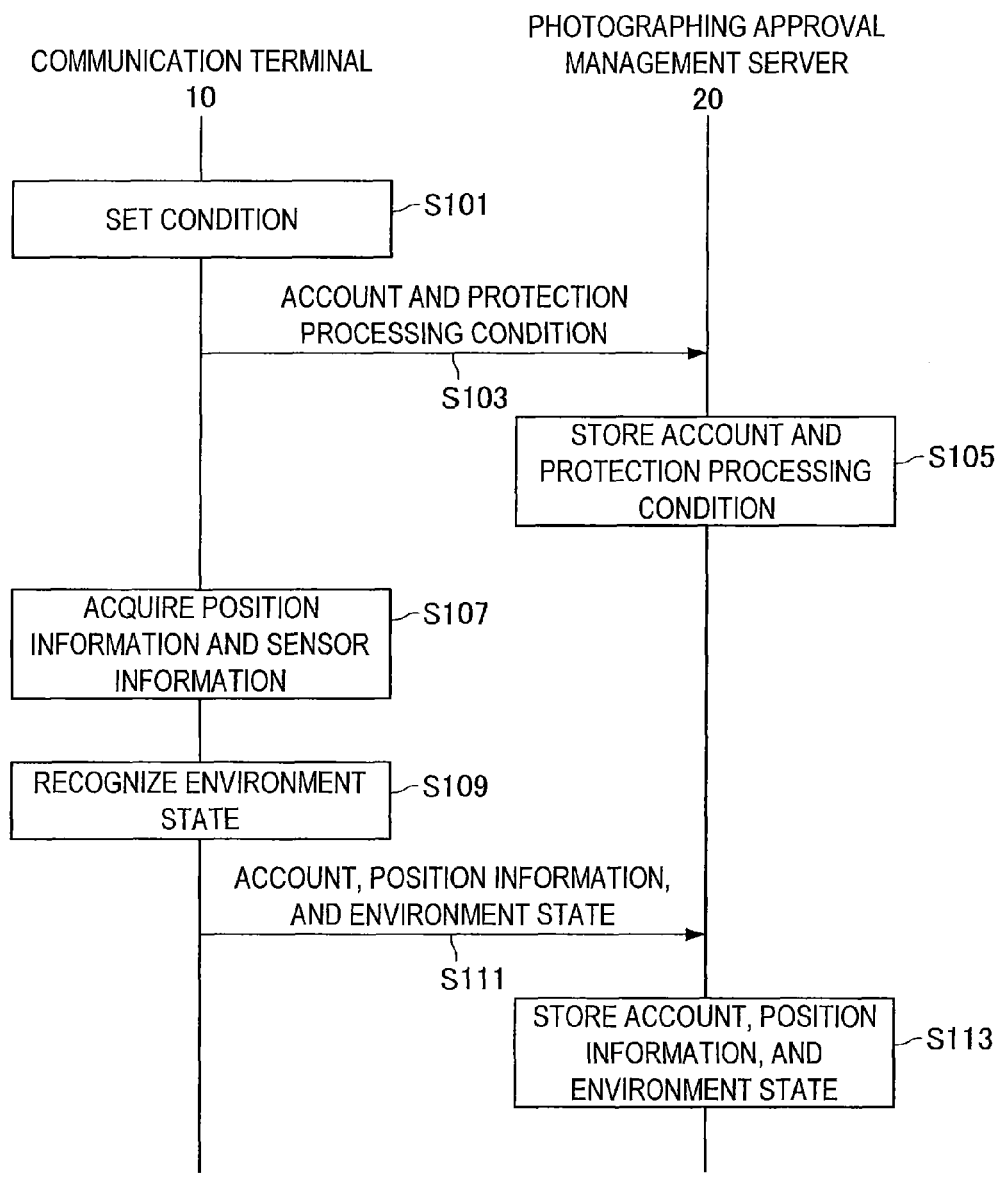
FIG. 13 is a diagram illustrating a sequence of processes before photographing according to the first embodiment.

The configuration according to the first embodiment has been described above. Next, processes according to the first embodiment will be described. First, processes before the photographing according to the first embodiment will be described. FIG. 13 is a diagram illustrating a sequence of the processes before the photographing according to the first embodiment.

As illustrated in FIG. 13, the possessor of the communication terminal 10 first sets various conditions such as an account and the protection processing condition on the condition setting unit 108 through the operation unit 106 (S101). Here, the setting of the above-described various conditions may be performed using another device such as a PC connected to the communication network 12, instead of the communication terminal 10.

Subsequently, the communication unit 110 transmits information such as the set account and the set protection processing condition to the photographing approval management server 20 (S103).

Subsequently, the photographing approval condition storage unit 206 of the photographing approval management server 20 stores the received account and the received protection processing condition in association therewith (S105).

Subsequently, the position information acquisition unit 100 of the communication terminal 10 acquires the position information of the communication terminal 10. The sensor information acquisition unit 102 acquires various kinds of sensor information such as an acceleration of the communication terminal 10, an angle of the communication terminal 10, an atmospheric pressure, and geomagnetism (S107). Next, the environment state recognition unit 104 determines a current environment state of the communication terminal 10 based on the acquired position information and the acquired sensor information. Alternatively, the environment state recognition unit 104 determines the current environment state of the communication terminal 10 based on the acquired position information and information received from an external device and indicating the environment state (S109).

Subsequently, the communication unit 110 transmits the account set in S101, the position information acquired in S107, and the environment state determined in S109 to the photographing approval management server 20 (S111).

Subsequently, the position and environment state storage unit 202 of the photographing approval management server 20 stores the received account, the received position information, and the received environment state in association therewith (S113).

Thereafter, the processes of S107 to S113 are repeated at predetermined time intervals. As a modification example, the processes of S107 to S113 may not be repeated at the predetermined time intervals, but may be repeated whenever the sensor information acquisition unit 102 detects movement of the communication terminal 10.

3-1-2-2. Processes at Time of Photographing

Figure 14:
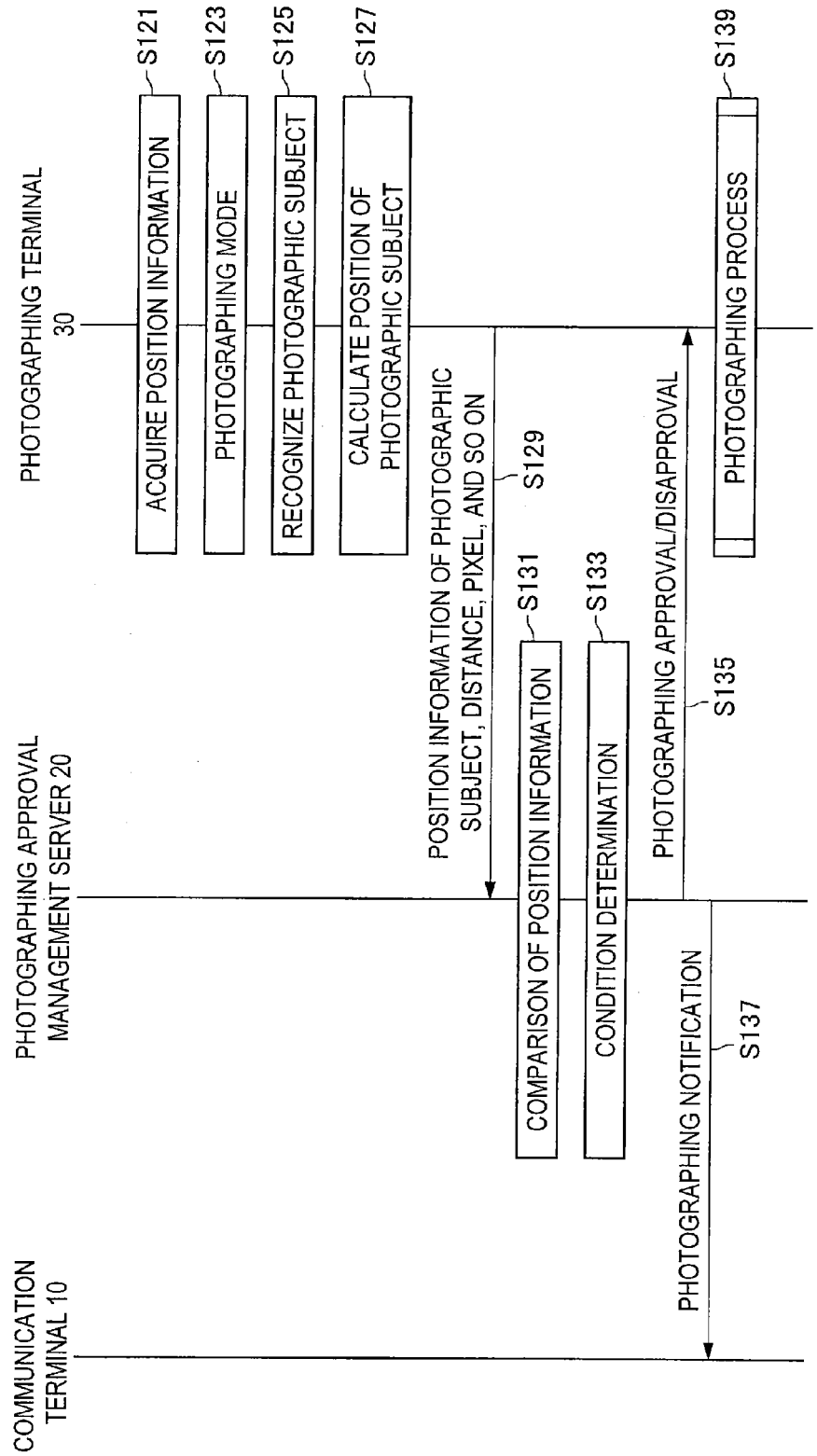
FIG. 14 is a diagram illustrating a sequence of processes at the time of photographing according to the first embodiment.

Next, processes at the time of the photographing according to the first embodiment will be described. FIG. 14 is a diagram illustrating a sequence of the processes at the time of the photographing according to the first embodiment.

As illustrated in FIG. 14, the position information acquisition unit 302 of the photographing terminal 30 first acquires the position information of the photographing terminal 30 (S121). Next, a photographing mode is activated through a photographer's operation on the operation unit 320 (S123). When the photographing mode is activated, a photographic image before the photographing is displayed on the finder of the photographing terminal 30.

Subsequently, the photographic subject position acquisition unit 304 determines whether the person image is included in the photographic image using a predetermined person detection method. When one or more person images are included in the photographic image, the photographic subject position acquisition unit 304 detects a pixel region of each person image included in the photographic image (S125).

Subsequently, the photographic subject position acquisition unit 304 calculates the position information of each photographic subject corresponding to each of the detected person images (S127). More specifically, as described above, the photographic subject position acquisition unit 304 calculates the position information of each photographic subject based on the position information of the photographing terminal 30 acquired by the position information acquisition unit 302, the distance information up to each photographic subject calculated by the photographic subject distance acquisition unit 308, and the sight line direction calculated by the photographic subject position acquisition unit 304.

Subsequently, the communication unit 310 transmits the position information of each of the calculated photographic subjects to the photographing approval management server 20 (S129). The communication unit 310 may also transmit the calculated distance information from the photographing terminal 30 to each photographic subject, the detected pixel region of each person image, or the like to the photographing approval management server 20.

Subsequently, the comparison unit 204 of the photographing approval management server 20 compares the position information of the communication terminal 10 stored in the position and environment state storage unit 202 with the position information of the photographic subject received from the photographing terminal 30 (S131). For example, in the example of the position and environment state storage unit 202 illustrated in FIG. 5, the comparison unit 204 compares the position information of the photographic subject received from the photographing terminal 30 with each value of the position information column 2022 and extracts an account of which the position information is the same. For example, when the position information of the photographic subject is "(x, y)," the comparison unit 204 compares each value of the position information column 2022 and extracts the account "Yamada" of which the position information is the same.

Subsequently, the condition determination unit 208 of the photographing approval management server 20 determines whether the environment state stored in the position and environment state storage unit 202 satisfies the protection processing condition stored in the photographing approval condition storage unit 206 with regard to the account for which the comparison unit 204 determines that the position information is identical or the difference is less than the predetermined threshold value. Then, the condition determination unit 208 determines whether the process of protecting the person image is performed according to the result of the above-described determination (S133). For example, in the examples illustrated in FIGS. 5 and 6, when the account "Yamada" is extracted by the comparison unit 204, the value of the environment state column 2024 in the position and environment state storage unit 202 is "driving car" and the value of the photographing approval condition column 2062 in the photographing approval condition storage unit 206 is "disapproval when moving." Therefore, since the value of the environment state column 2024 does not satisfy the value of the photographing approval condition column 2062, the condition determination unit 208 may determine whether the process of protecting the person image is performed with regard to this account, for example, "photographing disapproval."

Subsequently, with regard to the account for which the comparison unit 204 determines that the position information is identical or the difference is less than the predetermined threshold value, the communication unit 200 transmits the information prescribing whether to perform the process of protecting the person image corresponding to this account to the photographing terminal 30 (S135). For example, when the condition determination unit 208 determines that the photographic subject is permitted to be photographed, the communication unit 200 transmits notification (hereinafter referred to as photographing notification) indicating that the photographing is performed to the communication terminal 10 (S137). Here, the photographing notification may include a photographing time, a photographing place, and the size of a photographed photographic image or person image. The process of S137 may be performed simultaneously with S135, may be performed between S133 and S135, or may not be performed.

Subsequently, the photographing terminal 30 performs a photographing process based on the received information prescribing whether to perform the process of protecting each person image (S139).

—First Processing Example of Photographing Processes—

Figure 15:
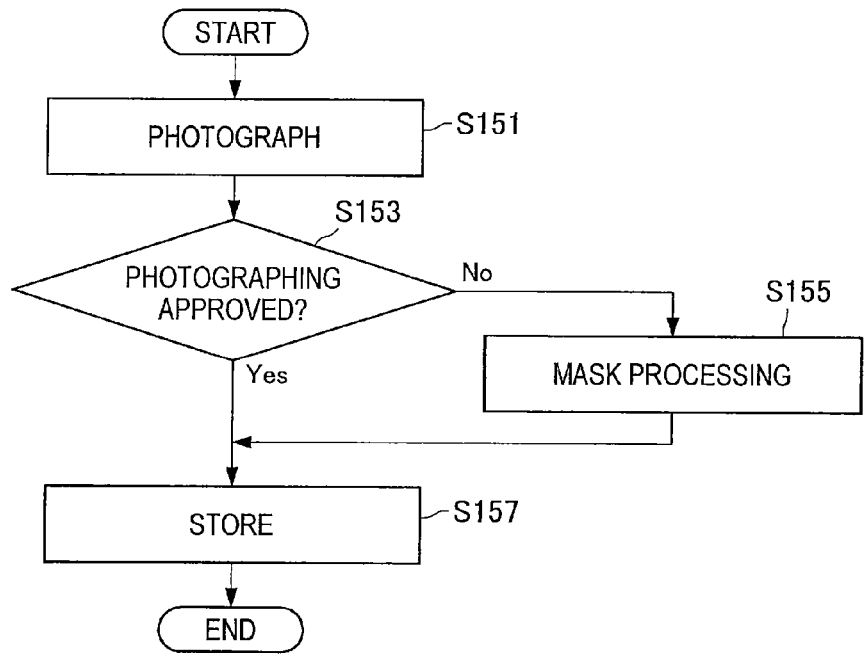
FIG. 15 is a flowchart illustrating the details of a first processing example of a photographing process according to the first embodiment.

Here, the process of S139 will be described in detail with reference to FIGS. 15 and 16. FIG. 15 is a flowchart illustrating a first processing example of the photographing process in S139. In the first processing example, as will be described below, when it is determined that photographing may not be performed by the photographing terminal 30, the photographing terminal 30 performs the mask processing on the person image included in the photographic image.

In the first processing example, as illustrated in FIG. 15, for example, the imaging unit 300 first photographs a photographic image through the photographer's operation such as pressing a shutter button of the photographing terminal 30 (S151).

Subsequently, the determination unit 312 determines whether the photographing may be performed on the photographic subject corresponding to each person image based on the information received from the photographing approval management server 20 and indicating whether to perform the process of protecting each person image (S153). For example, when the information prescribing to perform the process of protecting a given person image is received, the determination unit 312 determines that the photographing may not be performed on the photographic subject corresponding to this person image.

When the determination unit 312 determines that the photographing may be performed (Yes in S153), the storage unit 316 stores the photographic image photographed by the imaging unit 300 (S157).

Conversely, when the determination unit 312 determines that the photographing may not be performed (No in S153), the mask unit 314 performs the mask processing on the person image included in the photographic image photographed by the imaging unit 300 (S155). Subsequently, the storage unit 316 stores the photographic image subjected to the mask processing by the mask unit 314 (S157).

—Second Processing Example of Photographing Processes—

Figure 16:
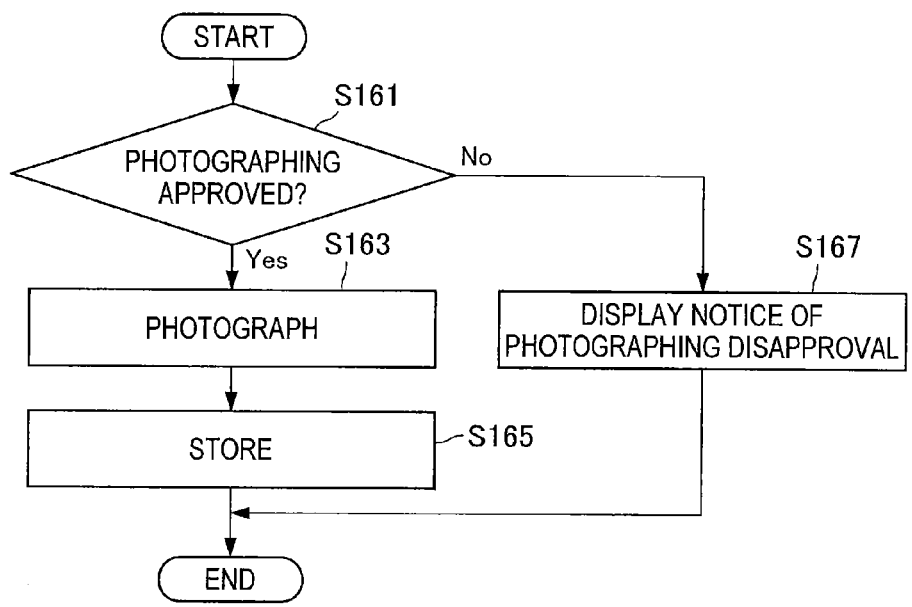
FIG. 16 is a flowchart illustrating the details of a second processing example of a photographing process according to the first embodiment.

FIG. 16 is a flowchart illustrating a second processing example of the photographing process in S139. In the second processing example, as will be described below, when it is determined that photographing may not be performed by the photographing terminal 30, the photographing terminal 30 does not photograph the photographic image.

In the second processing example, as illustrated in FIG. 16, the determination unit 312 first determines whether the photographing may be performed on all of the photographic subjects corresponding to the person images based on the information received from the photographing approval management server 20 and indicating whether to perform the process of protecting each person image, as in S153 (S161).

When the determination unit 312 determines that the photographing may be performed on all of the photographic subjects (Yes in S161), the imaging unit 300 photographs the photographic image, as in S151 (S163). Subsequently, the storage unit 316 stores the photographic image photographed by the imaging unit 300, as in S157 (S165).

Conversely, when the determination unit 312 determines that any one person may not be photographed (No in S161), the display unit 318 displays a notice of photographing disapproval (S167). In S167, the display unit 318 may display a photographic subject on which the photographing disapproval is determined on the finder of the photographing terminal 30 in an emphatic manner, for example, by surrounding a pixel region corresponding to this photographic subject by a solid line. By displaying the photographic subject in such an emphatic manner, the photographer can identify which photographic subject may not be photographed.

Modification Examples

There is a probability that with regard to the photographic subject queried to the photographing approval management server 20 in S129, the position of a person image corresponding to this photographic subject is changed in the frame of the photographic terminal 30 or may be framed out once and then framed in again due to, for example, movement of the photographer or the photographic subject. Therefore, the photographic subject position acquisition unit 304 of the photographing terminal 30 may track the photographic subject according to an image processing method such as image tracking.

According to this modification example, the photographing terminal 30 does not query the photographic subject to the photographing approval management server 20 again, even when the position of the person image is changed in the frame by a photographer's operation. Therefore, the number of queries to the photographing approval management server 20 can be suppressed.

However, there is also probability that the setting of the protection processing condition may be changed by the possessor of the communication terminal 10 after the query to the photographing approval management server 20 by the photographing terminal 30. Therefore, as in the above-described modification example, even when the photographic subject position acquisition unit 304 tracks the photographic subject, the communication unit 310 may query whether to photograph the photographic subject to the photographing approval management server 20 at each predetermined time interval, as in S129. As another modification example, when the possessor of the communication terminal 10 changes the setting of the protection processing condition within a predetermined time after the query to the photographing approval management server 20 by the photographing terminal 30, the photographing approval management server 20 may automatically notify the photographing terminal 30 of the change in the setting of the protection processing condition.

3-1-3. Advantages According to First Embodiment

According to the first embodiment, as described above, the photographing approval management server 20 confirms whether the possessor of the communication terminal 10 and the photographic subject are the same by comparing the position information of the communication terminal 10 received from the communication terminal 10 with the position information of the photographic subject corresponding to the person image included in the photographic image and received from the photographing terminal 30. The photographing approval management server 20 determines whether the environment state received from the communication terminal 10 satisfies the protection processing condition received from the communication terminal 10 and transmits the information prescribing whether to perform the process of protecting the person image corresponding to the photographic subject, that is, the possessor of the communication terminal 10, to the photographing terminal 30 according to the result of the determination. Therefore, the photographic subject can reflect the request for privacy protection in the photographic image by setting the protection processing condition according to the intention of the photographic subject himself or herself.

For example, the photographic subject can restrict the photographing performed by the photographing terminal 30 by setting a condition in which the photographing is not permitted as the protection processing condition, when the photographic subject hates being photographed. Further, the photographic subject can perform control such that the photographic subject is recorded in an unidentifiable form, for example, by designating a mask processing method such as mosaic processing as the protection processing condition.

For example, when the photographer and the photographic subject are acquaintances, the photographic subject can add an image effect desired by the photographic subject himself or herself to the photographic image after the photographing, for example, by designating a character or the like as the mask processing method. Therefore, the photographer and the photographic subject can mutually enjoy the photographing.

Hardware having a special function is not necessary since the photographing terminal 30 calculates the position information of the photographic subject based on the position information of the photographing terminal 30, the sight line direction of the photographing terminal 30, and the number of pixels of the person image. Therefore, a cheap device such as a digital still camera available in a market can be used as the photographing terminal 30.

3-2. Second Embodiment

The first embodiment has been described above. In the first embodiment, as described above, the photographing approval management server 20 determines whether the environment state of the communication terminal 10 satisfies the protection processing condition. In a second embodiment, as will be described below, a communication terminal 10 determines whether the environment state of the communication terminal 10 satisfies the protection processing condition.

3-2-1. Configuration of Second Embodiment

3-2-1-1. Communication Terminal 10

Figure 17:
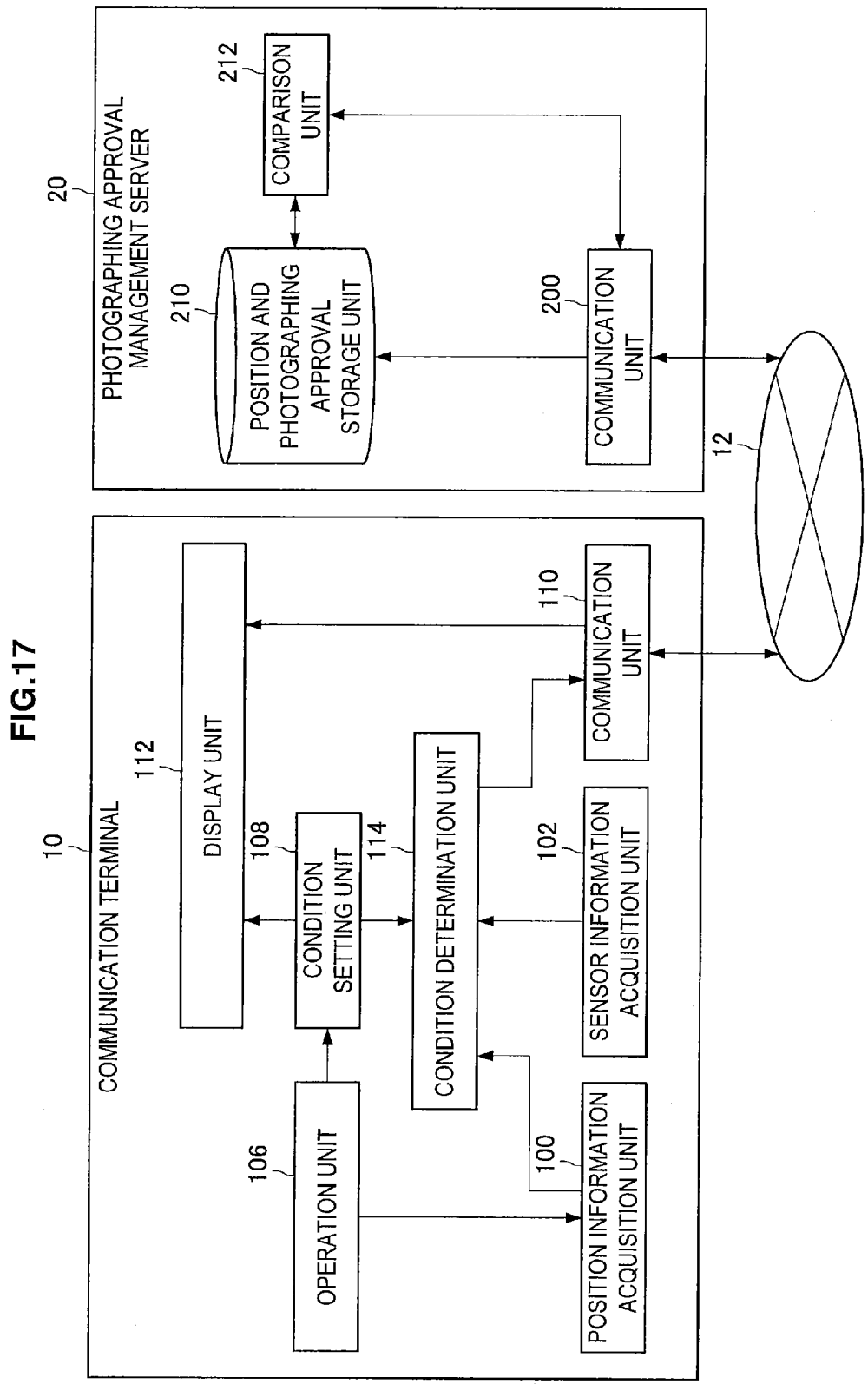
FIG. 17 is a functional block diagram illustrating the configurations of a communication terminal and a photographing approval management server according to a second embodiment of the present disclosure.

FIG. 17 is a functional block diagram illustrating the configurations of the communication terminal 10 and a photographing approval management server 20 according to the second embodiment. As illustrated in FIG. 17, the communication terminal 10 according to the second embodiment does not include the environment state recognition unit 104 and newly includes a condition determination unit 114 instead, compared to the first embodiment. The functions of the remaining constituent elements are the same as those of the first embodiment.

The condition determination unit 114 determines a current environment state of the communication terminal 10 based on position information acquired by the position information acquisition unit 100 and sensor information acquired by the sensor information acquisition unit 102. The condition determination unit 114 determines whether the determined environment state satisfies a protection processing condition set by the condition setting unit 108 and transmits the result of the determination to the photographing approval management server 20 via the communication unit 110.

3-2-1-2. Photographing Approval Management Server 20

As illustrated in FIG. 17, the photographing approval management server 20 according to the second embodiment does not include the position and environment state storage unit 202, the comparison unit 204, the photographing approval condition storage unit 206, and the condition determination unit 208 and newly includes a position and photographing approval storage unit 210 and a comparison unit 212 instead, compared to the first embodiment. The functions of the remaining constituent elements are the same as those of the first embodiment.

The position and photographing approval storage unit 210 stores the position information received from the communication terminal 10, necessity or non-necessity of a process of protecting a person image, and a protection processing condition in association therewith.

FIG. 18 is a diagram illustrating an example of the configuration of the position and photographing approval storage unit 210 according to the second embodiment. As illustrated in FIG. 18, the position and photographing approval storage unit 210 may store a position information column 2100, a photographing approval column 2102, and a mask method destination column 2104 in association therewith. For example, data shown in the third row of FIG. 18 indicates that "(a, b)" is received as position information, "approval" is received as photographing approval or disapproval, and "substitution with icon A" is received as designation of a mask method from the communication terminal 10.

The comparison unit 212 compares the position information of the communication terminal 10 stored in the position and photographing approval storage unit 210 with position information of a photographic subject received from the photographing terminal 30. When the comparison unit 212 transmits the position information, the necessity or non-necessity of the process of protecting the person image, and the protection processing condition to the photographing terminal 30 via the communication unit 200, when it is determined that the position information is identical or the difference is less than a predetermined threshold value by the above-described comparison.

3-2-1-3. Photographing Terminal 30

Since the configuration of the photographing terminal 30 according to the second embodiment is the same as that of the first embodiment, the description thereof will be omitted here.

3-2-2. Processes According to Second Embodiment

3-2-2-1. Processes Before Photographing

Figure 19:
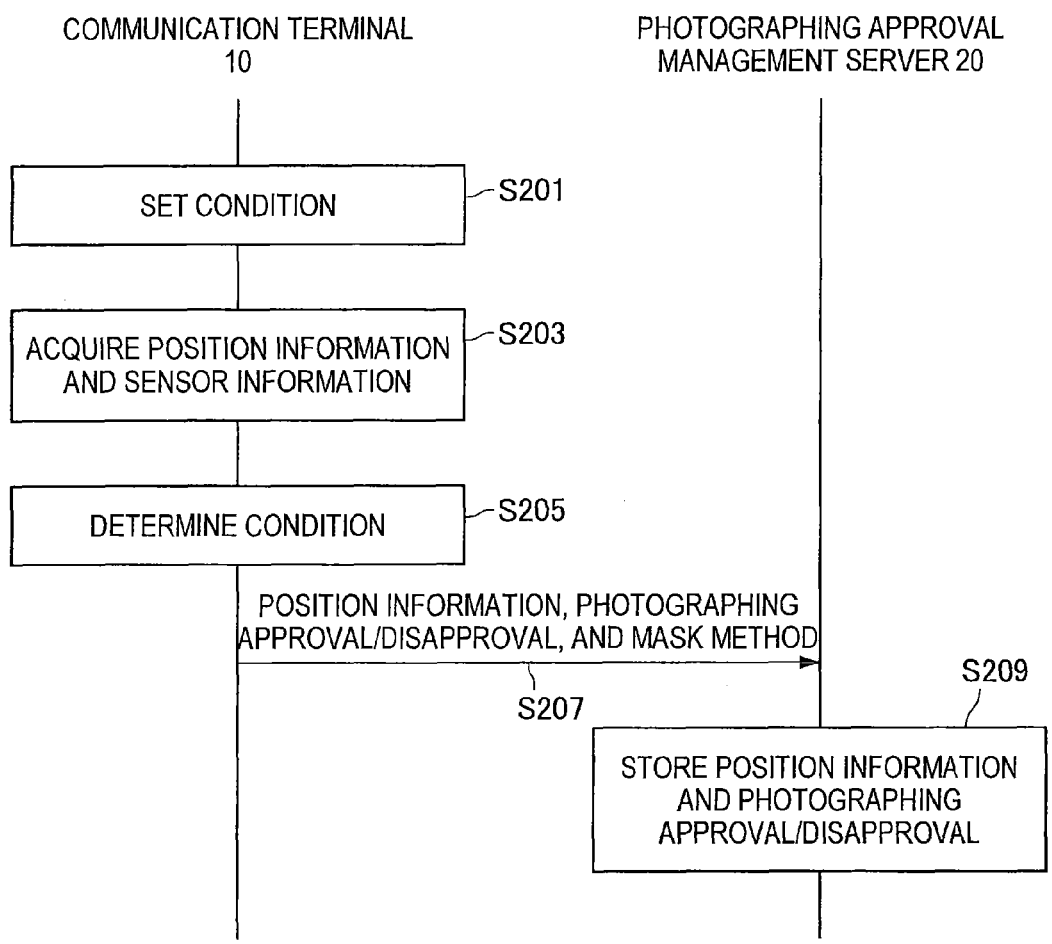
FIG. 19 is a diagram illustrating a sequence of processes before photographing according to the second embodiment.

The configuration according to the second embodiment has been described above. Next, processes according to the second embodiment will be described. First, processes before the photographing according to the second embodiment will be described. FIG. 19 is a diagram illustrating a sequence of processes before the photographing according to the second embodiment. The processes of S201 and S203 are the same as the processes of S101 and S107, respectively, in the first embodiment. Accordingly, the description thereof will be omitted here.

After S203, the condition determination unit 114 of the communication terminal 10 determines a current environment state of the communication terminal 10 based on the position information acquired by the position information acquisition unit 100 and the sensor information acquired by the sensor information acquisition unit 102. Next, the condition determination unit 114 determines whether the determined environment state satisfies the protection processing condition set by the condition setting unit 108 (S205).

Subsequently, the communication unit 110 transmits the position information acquired in S203, the necessity or non-necessity of the process of protecting the person image determined in S205, and the protection processing condition set in S201 to the photographing approval management server 20 (S207).

Subsequently, the position and photographing approval storage unit 210 of the photographing approval management server 20 stores the received position information and the received necessity and non-necessity of the process of protecting the person image, and the received protection processing condition in association therewith (S209).

Thereafter, the processes of S203 to S209 are repeated at predetermined time intervals. As a modification example, the processes of S203 to S209 may not be repeated at the predetermined time intervals, but may be repeated instead whenever the sensor information acquisition unit 102 detects movement of the communication terminal 10.

3-2-2-2. Processes at Time of Photographing

Figure 20:
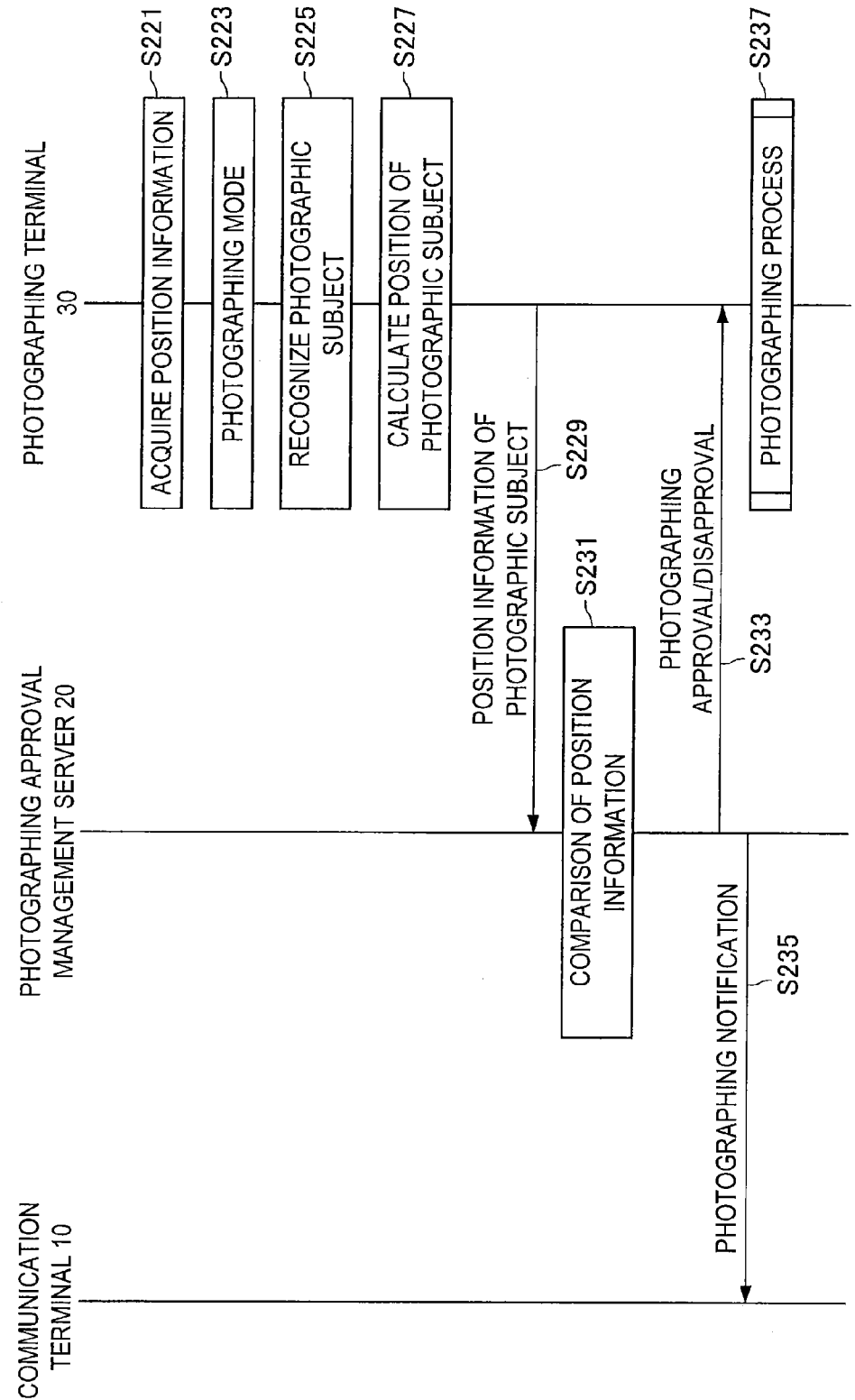
FIG. 20 is a diagram illustrating a sequence of processes at the time of photographing according to the second embodiment.

Next, processes at the time of the photographing according to the second embodiment will be described. FIG. 20 is a diagram illustrating a sequence of the processes at the time of the photographing according to the second embodiment. Processes of S221 to S227 are the same as the process (S121 to S127) of the first embodiment. Accordingly, the description thereof will be omitted here.

After S227, the communication unit 310 of the photographing terminal 30 transmits the position information of the photographic subject calculated in S227 to the photographing approval management server 20 (S229).

Subsequently, the comparison unit 204 of the photographing approval management server 20 compares the position information of the communication terminal 10 stored in the position and photographing approval storage unit 210 with the position information of the photographic subject received from the photographing terminal 30 (S231). For example, in the example of the position and photographing approval storage unit 210 illustrated in FIG. 18, the comparison unit 204 compares the position information of the photographic subject received from the photographing terminal 30 with each value of the position information column 2100 and extracts a data row of which the position information is the same. For example, when the position information of the photographic subject is "(a, b)," the comparison unit 204 extracts data in the third row of which the position information is the same by comparison with each value of the position information column 2100.

Subsequently, when the comparison unit 212 determines that the position information is identical or the difference is less than the predetermined threshold value by the above-described comparison, the communication unit 200 transmits the necessity and non-necessity of the process of protecting the person image and the protection processing condition to the photographing terminal 30 (S233). When the result of the comparison performed by the comparison unit 204 is identical or similar and, for example, the fact that the photographing of a photographic subject is permitted is stored in the position and photographing approval storage unit 210, the communication unit 200 transmits photographing notification to the communication terminal 10, as in S137 (S235). The process of S235 may be performed simultaneously with S233, may be performed between S231 and S233, or may not be performed.

Subsequently, the photographing terminal 30 performs a photographing process based on the received information prescribing whether to perform the process of protecting each person image (S237). The detailed process of S237 is substantially the same as the process of S139 of the first embodiment. Accordingly, the description thereof will be omitted here.

3-2-3. Advantages According to Second Embodiment

In the second embodiment of the present disclosure, as described above, the communication terminal 10 determines whether the environment state acquired by the communication terminal 10 satisfies the protection processing condition set in the communication terminal 10 and transmits the necessity and non-necessity of the process of protecting the person image corresponding to the photographic subject, that is, the possessor of the communication terminal 10, and the protection processing condition to the photographing approval management server 20 according to the result of the determination. Then, the photographing approval management server 20 compares the position information of the communication terminal 10 received from the communication terminal 10 with the position information of the photographing subject corresponding to the person image included in the photographic image and received from the photographing terminal 30. When the result of the comparison is identical or similar, the necessity and non-necessity of the process of protecting the person image and the protection processing condition are transmitted to the photographing terminal 30. Therefore, the photographic subject can reflect the request for privacy protection in the photographic image by setting the protection processing condition according to the intention of the photographic subject himself or herself.

Compared to the first embodiment, in the second embodiment, the communication terminal 10 determines whether the environment state of the communication terminal 10 satisfies the protection processing condition, instead of the photographing approval management server 20. Therefore, it is possible to obtain the advantage of reducing the load of the photographing approval management server 20.

3-3. Third Embodiment

The second embodiment of the present disclosure has been described above. Next, a third embodiment will be described. In the third embodiment, as will be described below, the communication terminal 10 can request the photographing terminal 30 to perform mask processing on a photographic image after photographing, after the photographing terminal 30 performs a photographing process.

3-3-1. Configuration of Third Embodiment

The configurations of the communication terminal 10, the photographing approval management server 20, and the photographing terminal 30 according to the third embodiment are the same as those of the first embodiment. Accordingly, the description thereof will be omitted here.

3-3-2. Processes According to Third Embodiment

3-3-2-1. Processes Before Photographing

Next, processes according to the third embodiment will be described. The processes before photographing according to the third embodiment are the same as those of the first embodiment. Accordingly, the description thereof will be omitted here.

3-3-2-2. Processes at Time of Photographing

Figure 21:
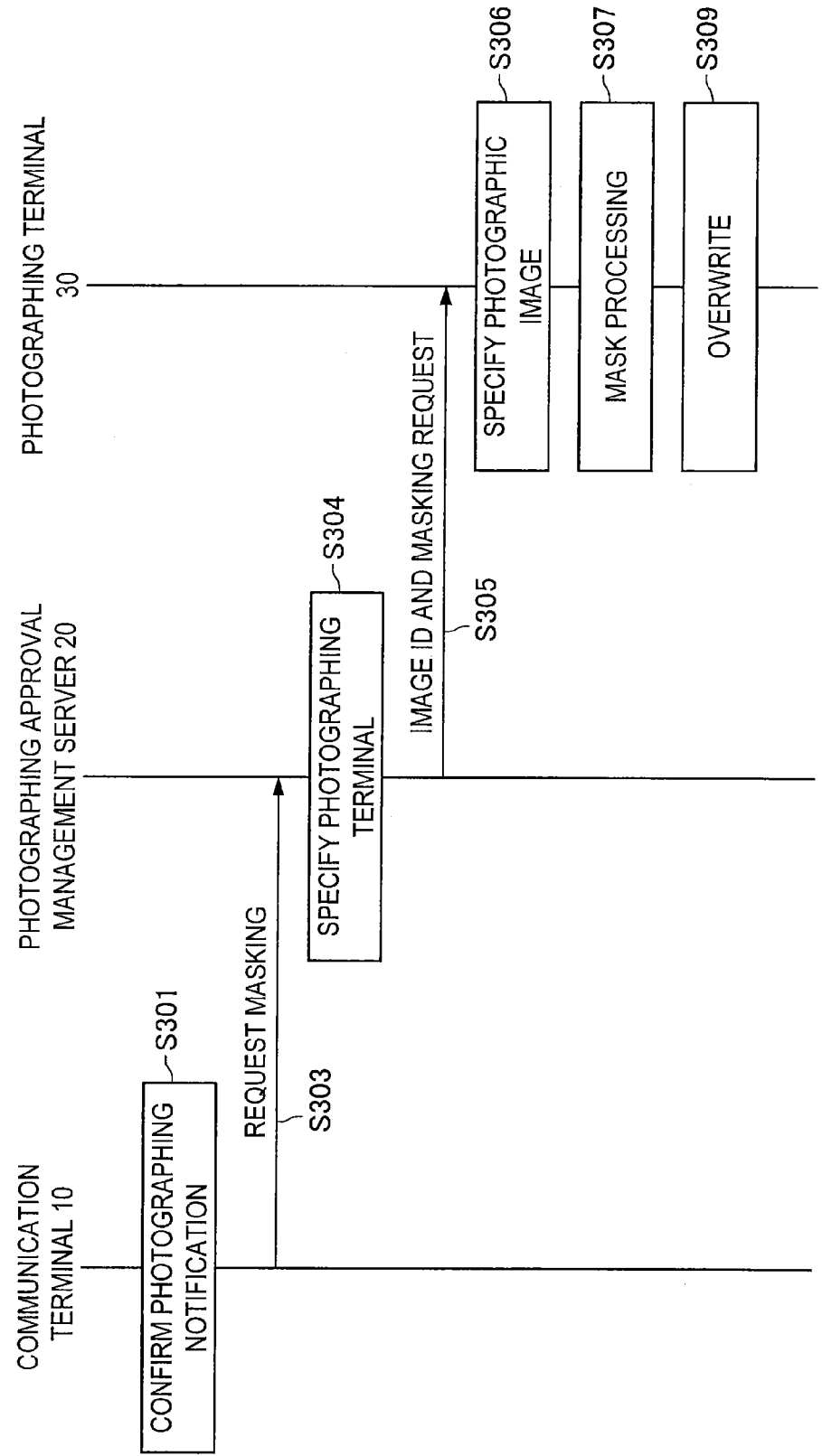
FIG. 21 is a diagram illustrating a sequence of processes at the time of photographing according to a third embodiment of the present disclosure.

Next, processes at the time of the photographing according to the third embodiment will be described. FIG. 21 is a diagram illustrating a sequence of some of the processes at the time of the photographing according to the third embodiment.

Since the processes of S121 to S139 according to the first embodiment are substantially the same in the third embodiment, the description thereof is omitted in FIG. 21. However, the third embodiment differs from the first embodiment mainly as follows.

In S129 of the third embodiment, the communication terminal 10 transmits a device ID of the photographing terminal 30 together with the position information of each photographic subject to the photographing approval management server 20.

In S133, the condition determination unit 208 determines whether the process of protecting the person image included in the photographic image is performed and determines an image ID used to identify this photographic image. The storage unit (not illustrated) of the photographing approval management server 20 stores the device ID received from the communication terminal 10 and the image ID determined by the condition determination unit 208 in association therewith.

In S135, first, the photographing approval management server 20 adds a predetermined retention period of an image after photographing and prohibition of copy or sharing of the photographic image to the protection processing condition. Then, the photographing approval management server 20 transmits the protection processing condition and the image ID determined by the condition determination unit 208 to the photographing terminal 30.

In S139, after the imaging unit 300 of the photographing terminal 30 performs the photographing process on the photographic image, the storage unit 316 stores the image ID received from the photographing approval management server 20 and the photographic image in association therewith.

Next, processes after S139 will be described. After S139, the display unit 112 of the communication terminal 10 displays content of the photographing notification transmitted from the photographing approval management server 20 in S137. Then, the possessor of the communication terminal 10 confirms the content of the photographing notification (S301). For example, the photographing notification may have the content such as "An image with a size of 300×200 was photographed in OO city XX address at 15:30 today. Would you like to mask it? Yes/No." The photographing notification may include a message urging the possessor of the communication terminal 10 to change the protection processing condition, such as "Would you like to change the photographing permission condition? Yes/No."

Subsequently, when the possessor of the communication terminal 10 desires the masking on the photographed photographic image, the possessor operates the operation unit 106 to input a request for the masking on the photographed photographic image. Here, the operation unit 106 may receive not only the masking request but also designation of the masking method. Next, the communication unit 110 transmits the input masking request and the designated masking method to the photographing approval management server 20 (S303).

Subsequently, the storage unit of the photographing approval management server 20 specifies the photographing terminal 30 corresponding to the masking request received from the communication terminal 10 (S304). More specifically, the storage unit specifies the device ID of the photographing terminal 30 stored in association with the image ID corresponding to the masking request.

Subsequently, the communication unit 200 of the photographing approval management server 20 transmits the masking request received from the communication terminal 10, the masking method, and the image ID to the photographing terminal 30 specified in S304 (S305).

Subsequently, the storage unit 316 of the photographing terminal 30 specifies the photographic image corresponding to the image ID received from the photographing approval management server 20 (S306).

Subsequently, the mask unit 314 of the photographing terminal 30 performs mask processing on a region of a person image corresponding to the possessor of the communication terminal 10 based on the received masking request and the masking method with regard to the photographic image specified by the storage unit 316 (S307).

Subsequently, the storage unit 316 overwrites the photographic image subjected to the mask processing in S307 on the photographic image stored in the storage unit 316 and stores the overwritten photographic image (S309).

3-3-3. Advantages According to Third Embodiment

In the third embodiment of the present disclosure, as described above, the communication terminal 10 receives the photographing notification from the photographing approval management server 20, and then transmits, to the photographing approval management server 20, the request for the masking on the photographic image corresponding to the photographing notification through the operation performed by the possessor of the communication terminal 10. The photographing approval management server 20 transmits the received masking request to the photographing terminal 30. Therefore, after the photographing process performed by the photographing terminal 30, the communication terminal 10 requests the photographing terminal 30 to perform the mask processing on the photographic image after the photographing. For example, when the possessor of the communication terminal 10 forgets to set the protection processing condition or erroneously sets a condition different from his or her intention, the photographing terminal 30 can be requested to perform the mask processing on the photographed photographic image after the photographing process performed by the photographing terminal 30.

The communication terminal 10 can receive not only the masking request but also the designation of the masking method. Therefore, for example, when the photographer and the photographic subject are acquaintances, the photographic subject can designate the mask processing method after viewing the photographic image after the photographing, and thus an image effect desired by the photographic subject himself or herself can be added to the photographic image after the photographing, so that the photographer and the photographic subject can mutually enjoy the photographing.

The photographing approval management server 20 stores the image ID of the photographic image and the device ID of the photographing terminal 30 in association therewith. Therefore, for example, even when the photographing is performed and a long time elapses, the photographing approval management server 20 can reflect the masking request by the communication terminal 10 to the photographing terminal 30.

3-4. Fourth Embodiment

The third embodiment of the present disclosure has been described above. Next, a fourth embodiment will be described. In the fourth embodiment, as will be described below, a photographing terminal 30 can request the possessor of a communication terminal 10 to permit photographing via a photographing approval management server 20.

3-4-1. Configuration of Fourth Embodiment

The configurations of the communication terminal 10, the photographing approval management server 20, and the photographing terminal 30 according to the fourth embodiment are the same as those of the first embodiment. Accordingly, the description thereof will be omitted here.

3-4-2. Processes According to Fourth Embodiment

3-4-2-1. Processes Before Photographing

Next, processes according to the fourth embodiment will be described. The processes before photographing according to the fourth embodiment are the same as those of the first embodiment. Accordingly, the description thereof will be omitted here.

3-4-2-2. Processes at Time of Photographing

Figure 22:
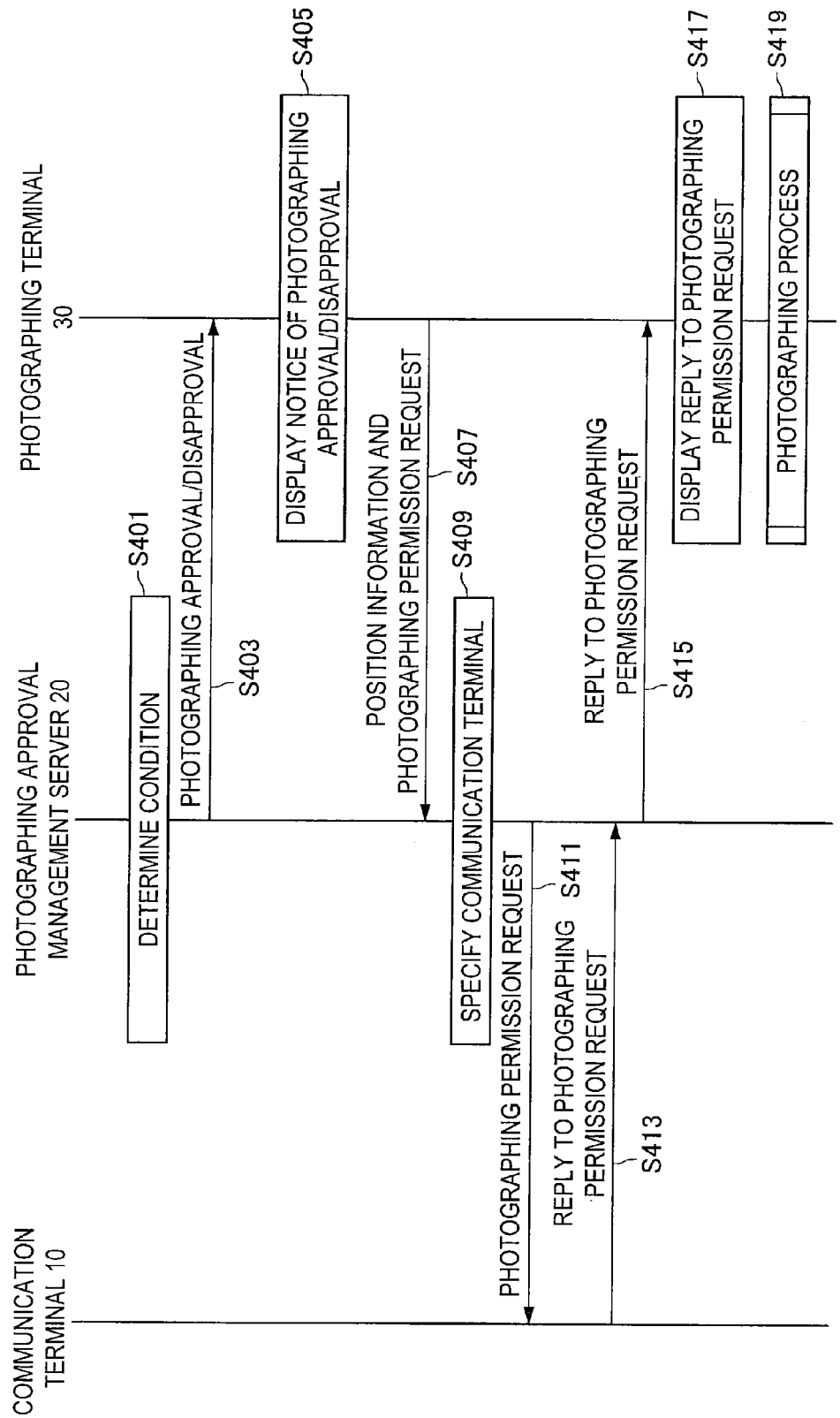
FIG. 22 is a diagram illustrating a sequence of processes at the time of photographing according to a fourth embodiment of the present disclosure.

Next, processes at the time of the photographing according to the fourth embodiment will be described. FIG. 22 is a diagram illustrating a sequence of some of the processes at the time of the photographing according to the fourth embodiment. Since the processes of S121 to S131 according to the first embodiment are performed in substantially the same manner in the fourth embodiment, the description thereof is omitted in FIG. 22.

Next, processes subsequent to S131 will be described. After S131, the condition determination unit 208 of the photographing approval management server 20 determines whether the process of protecting the person image included in the photographic image will be performed, as in S133 (S401). Next, with regard to the account for which the comparison unit 204 determines that the position information is identical or the difference is less than the predetermined threshold value, the communication unit 200 transmits photographing approval or disapproval of the person image corresponding to this account to the photographing terminal 30, as in S135 (S403).

Figure 23:
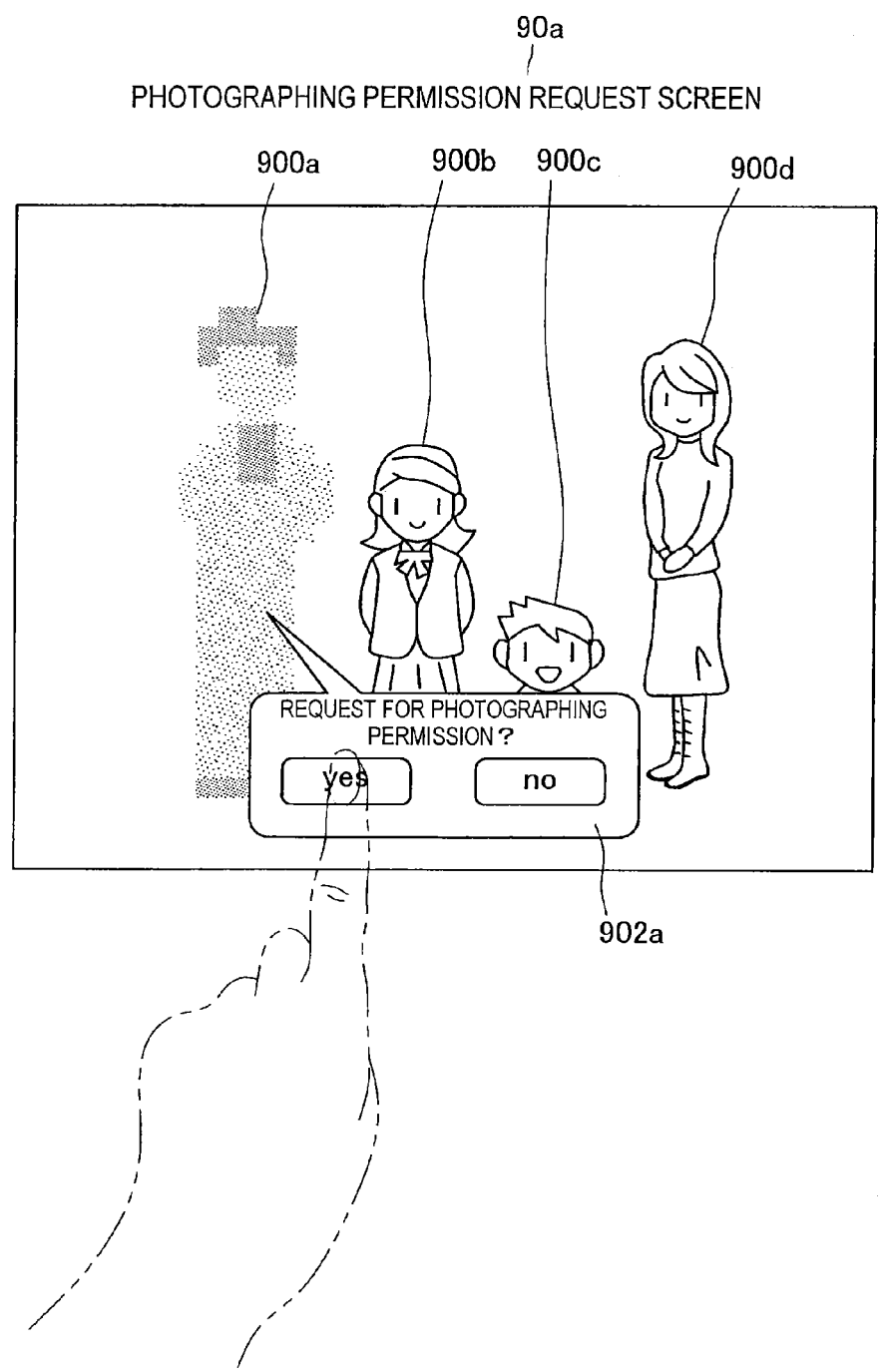
FIG. 23 is a diagram illustrating an example of a photographing permission request screen according to the fourth embodiment.

Subsequently, the display unit 318 of the photographing terminal 30 displays the photographing approval or disapproval of each person image received from the photographing approval management server 20 by displaying, for example, a photographing permission request screen 90*a* illustrated in FIG. 23 on the display unit 318. Here, the photographing permission request screen 90*a* may be displayed on, for example, the finder of the photographing terminal 30. Next, the operation unit 320 receives a photographing approval request of the photographic subject corresponding to a person image with regard to the person image for which photographing disapproval is displayed on the display unit 318, for example, as in the photographing permission request screen 90*a* illustrated in FIG. 23 (S405).

Here, a structure example of the photographing permission request screen 90*a* will be described with reference to FIG. 23. The photographing permission request screen 90*a* includes person images 900 and a photographing permission request field 902. On the photographing permission request screen 90*a*, the photographing approval or disapproval received from the photographing approval management server 20 is indicated for each person image 900 according to whether each person image 900 is displayed so as not to be mosaicked. For example, since a person image 900*a* is displayed so as to be mosaicked, the fact that the person image 900*a* is not permitted to be photographed is indicated. The photographing permission request field 902 is a display field used to request permission to photograph a photographic subject corresponding to the person image 900 for which the photographing disapproval is displayed. For example, a photographing permission request field 902*a* is a display field used to request permission to photograph a photographic subject corresponding to the person image 900*a*. Here, when the photographer presses a "Yes" button included in the photographing permission request field 902*a*, the operation unit 320 may transmit a photographing permission request for the photographic subject corresponding to the person image 900*a* to the photographing approval management server 20 via the communication unit 310.

At this time, the communication unit 310 transmits the photographing permission request received from the operation unit 320 and the position information of the photographic subject corresponding to the photographing permission request to the photographing approval management server 20 (S407).

Subsequently, the comparison unit 204 of the photographing approval management server 20 compares the position information stored in the position and environment state storage unit 202 with the position information received from the photographing terminal 30 and specifies the communication terminal 10 of which position information is the same (S409).

Subsequently, the communication unit 200 transmits the photographing permission request received from the photographing terminal 30 to the communication terminal 10 specified in S409 (S411).

Figure 24:
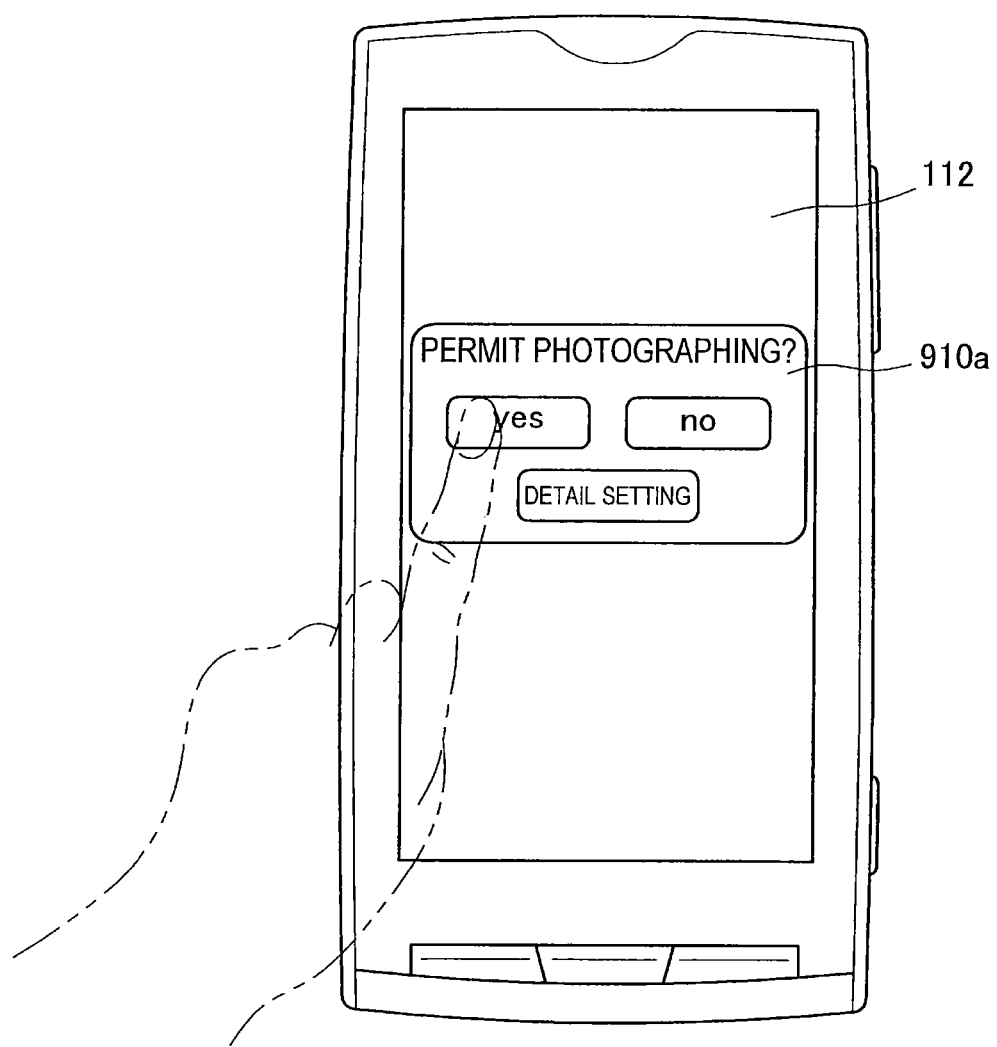
FIG. 24 is a diagram illustrating an example of a photographing permission screen according to the fourth embodiment.

Subsequently, the display unit 112 of the communication terminal 10 displays, for example, a photographing permission screen 90*b* illustrated in FIG. 24. Here, a structure example of the photographing permission screen 90*b* will be described with reference to FIG. 24. The photographing permission screen 90*b* includes a photographing permission field 910. The photographing permission field 910 is a display field used to give a permission or non-permission reply to the photographing permission request received from the photographing approval management server 20. For example, when the possessor of the communication terminal 10 presses a "Yes" button included in the photographing permission field 910, the operation unit 106 may transmit the permission reply to the received photographing permission request to the photographing approval management server 20 via the communication unit 110. As illustrated in FIG. 24, the photographing permission field 910 may include a detail setting button. The detail setting button may be, for example, a button used to set a detailed condition such as copy prohibition of a photographic image with regard to photographing permission.

Subsequently, the operation unit 106 receives an operation of the possessor of the communication terminal 10 on the photographing permission screen 90*b* displayed on the display unit 112. Then, the communication unit 110 transmits a reply to the photographing permission request received by the operation unit 106 to the photographing approval management server 20 (S413).

Subsequently, the communication unit 200 of the photographing approval management server 20 transmits the reply to the photographing permission request received from the communication terminal 10 to the photographing terminal 30 (S415).

Figure 25:
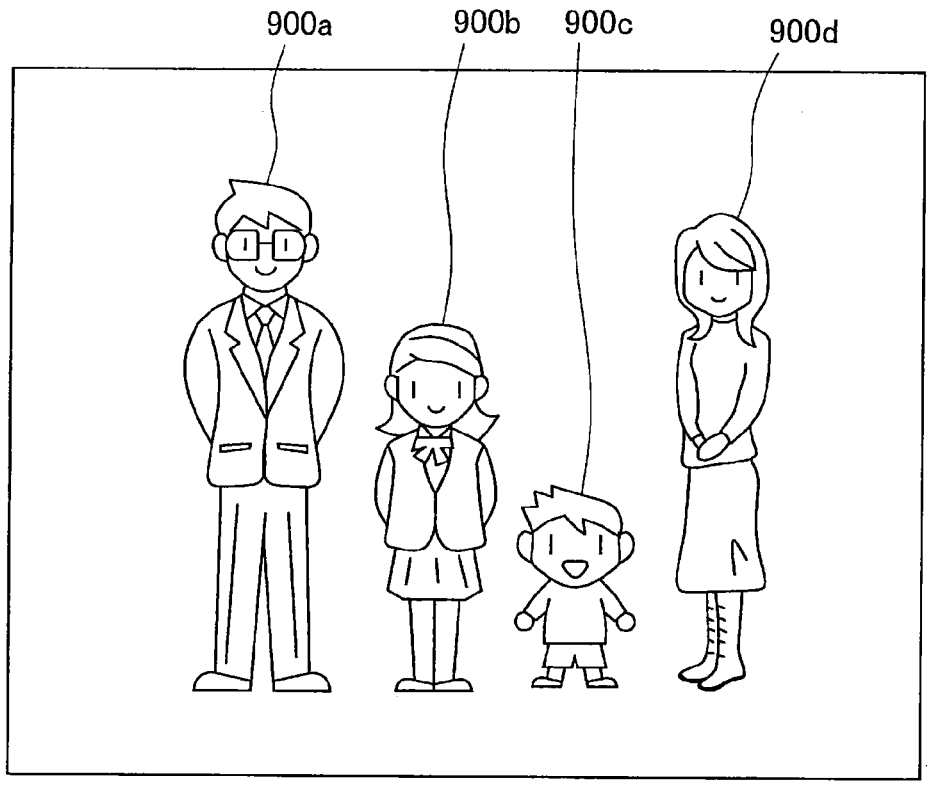
FIG. 25 is a diagram illustrating an example of a photographing permission request result screen according to the fourth embodiment.

Subsequently, the display unit 318 of the photographing terminal 30 displays a reply to the photographing permission request received from the photographing approval management server 20, for example, as in a photographing permission request result screen 90*c* illustrated in FIG. 25 (S417). Here, a structure example of the photographing permission request result screen 90*c* will be described with reference to FIG. 25. The photographing permission request result screen 90*c* includes person images 900. On the photographing permission request result screen 90*c*, whether to permit the photographing permission request received from the photographing approval management server 20 is indicated for each person image 900 according to whether each person image 900 is displayed so as not to be mosaicked. For example, the person image 900*a* is displayed so as not to be mosaicked in FIG. 25, but is displayed so as to be mosaicked in FIG. 23. Therefore, the fact that the photographing permission request of the photographing terminal 30 is permitted by the communication terminal 10 is indicated for the person image 900*a*.

Thereafter, the photographing terminal 30 performs the photographing process based on the reply to the received photographing permission request (S419). The detailed process of S419 is substantially the same as the process of S139 of the first embodiment. Accordingly, the description thereof will be omitted here.

3-4-3. Advantages According to Fourth Embodiment

In the fourth embodiment, as described above, the photographing terminal 30 displays the photographing approval or disapproval received from the photographing approval management server 20 on the display unit 318 and receives the photographing permission request of the photographer for the photographing subject corresponding to the person image with regard to the person image for which the photographing disapproval is notified of. Then, the photographing terminal 30 transmits the received photographing permission request to the photographing approval management server 20. The photographing approval management server 20 transmits the photographing permission request received from the photographing terminal 30 to the communication terminal 10 and transmits the reply of the photographing permission request received from the communication terminal 10 to the photographing terminal 30. Through the above-described process, the photographing terminal 30 can request the photographing permission from the possessor of the communication terminal 10 via the photographing approval management server 20. The photographing terminal 30 can perform the photographing process based on the content of the reply of the communication terminal 10 to the requested photographing permission.

3-5. Fifth Embodiment

The fourth embodiment of the present disclosure has been described above. Next, a fifth embodiment will be described. In the fifth embodiment, as will be described below, the possessor of the communication terminal 10 can set a protection processing condition regarding a time using schedule software mounted on the communication terminal 10.

3-5-1. Configuration of Fifth Embodiment

The configurations of the communication terminal 10, a photographing approval management server 20, and a photographing terminal 30 according to the fifth embodiment are the same as those of the first embodiment. Accordingly, the description thereof will be omitted here.

3-5-2. Processes According to Fifth Embodiment

3-5-2-1. Processes Before Photographing

Figure 26:
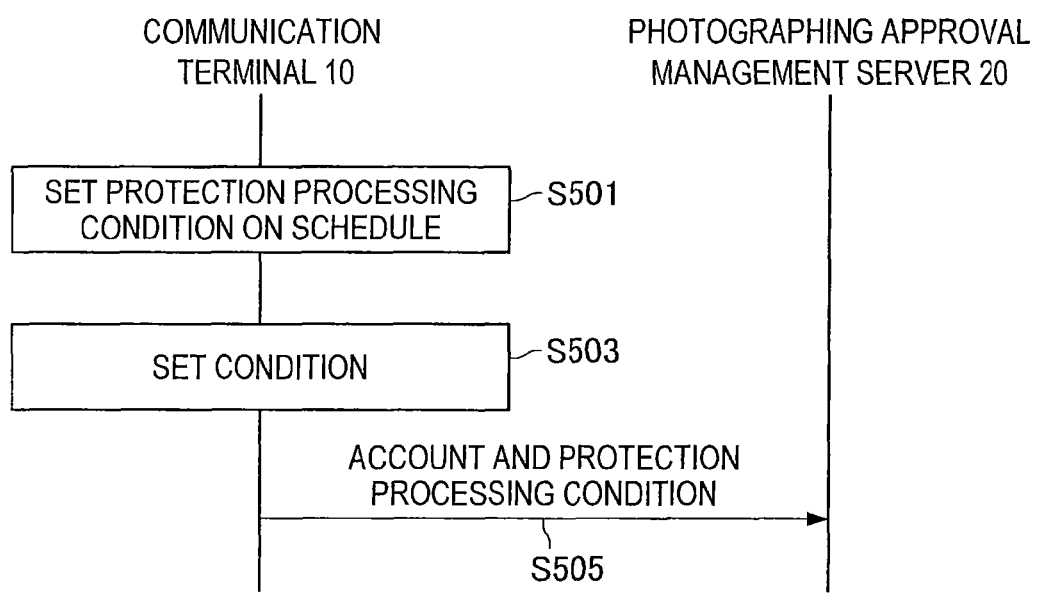
FIG. 26 is a diagram illustrating a sequence of processes before photographing according to a fifth embodiment of the present disclosure.

Next, processes according to the fifth embodiment will be described. First, the processes before photographing according to the fifth embodiment will be described. FIG. 26 is a diagram illustrating a sequence of some of the processes before the photographing according to the fifth embodiment.

As illustrated in FIG. 26, the possessor of the communication terminal 10 first operates the operation unit 106 to activate the schedule software mounted on the communication terminal 10 and sets, for example, a protection processing condition such as a time at which photographing is permitted on the schedule software (S501). The schedule software may include, for example, a registration screen such as a schedule registration screen 92a illustrated in FIG. 27.

Figure 27:
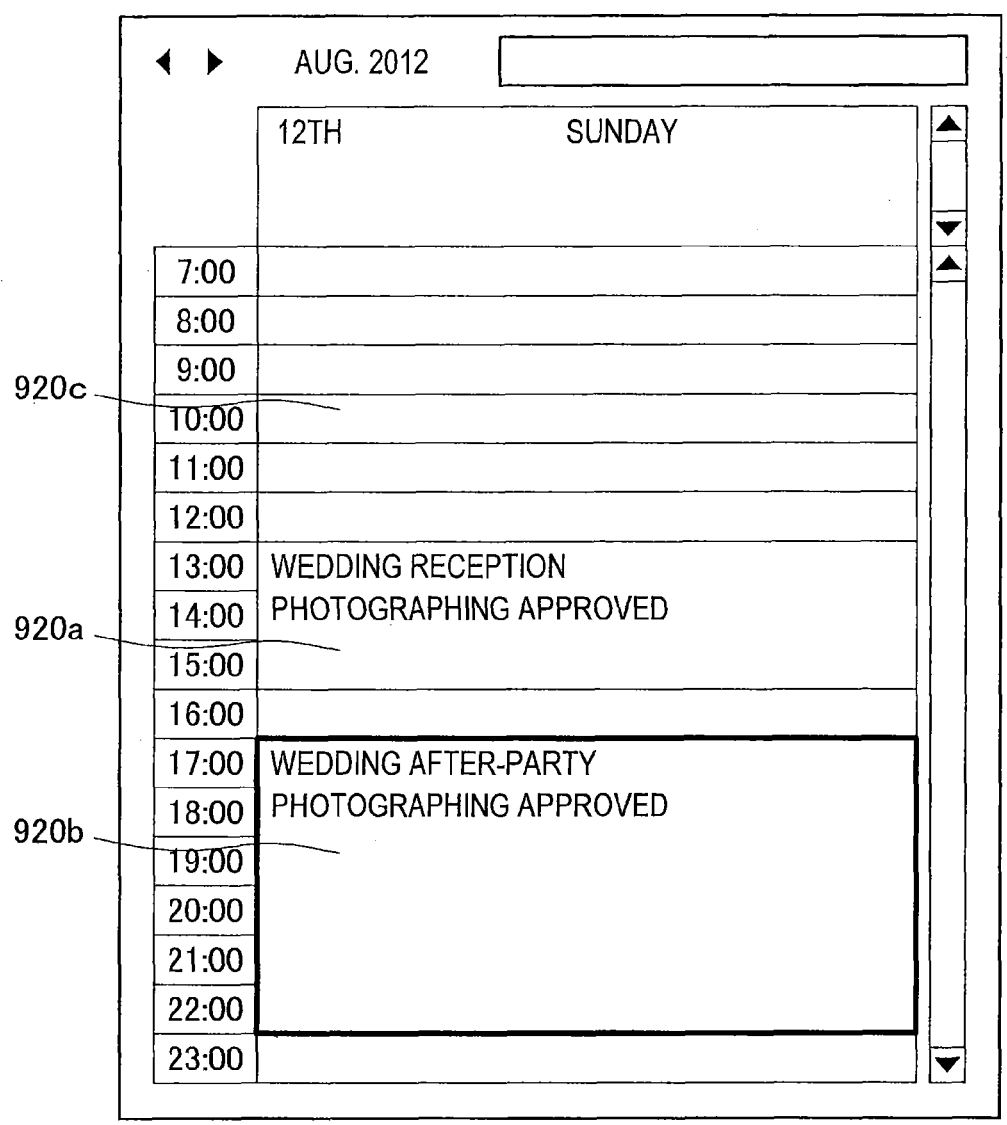
FIG. 27 is a diagram illustrating an example of a schedule registration screen according to the fifth embodiment.

Here, a structure example of the schedule registration screen 92a will be described with reference to FIG. 27. The schedule registration screen 92a includes photograph approval time input fields 920. The photograph approval time input fields 920 are input fields used to set a time at which the photographing by the photographing terminal 30 is permitted or not permitted. For example, a photographing approval time input field 920a indicates a set example in which the possessor of the communication terminal 10 is "permitted to perform photographing" "from 13:00 to 16:00 on Aug. 12, 2012". When the possessor of the communication terminal 10 inputs nothing as in a photographing approval time input field 920c, no condition may be set or a condition may be automatically set such that photographing is uniformly permitted or photographing is uniformly prohibited. Not only the time but also another condition regarding, for example, designation of a mask method may be input in the photographing approval time input field 920.

Subsequently, the possessor of the communication terminal 10 sets an account and a protection processing condition other than a time, and the like on the condition setting unit 108 through the operation unit 106 (S503). Next, the communication unit 110 transmits, to the photographing approval management server 20, information regarding the set account, the protection processing condition regarding the time set by the schedule software, the other protection processing condition, and the like (S505).

Processes subsequent to S505 are substantially the same as the processes of S105 to S113 according to the first embodiment. Accordingly, the description thereof will be omitted here.

3-5-2-2. Processes at Time of Photographing

The processes at the time of the photographing according to the fifth embodiment are the same as those of the first embodiment. Accordingly, the description thereof will be omitted here.

3-5-3. Advantages According to Fifth Embodiment

In the fifth embodiment of the present disclosure, as described above, the possessor of the communication terminal 10 sets, for example, the protection processing condition regarding a time, such as a time at which the photographing is permitted or not permitted, using the schedule software mounted on the communication terminal 10. Therefore, the possessor of the communication terminal 10 can perform an operation on schedule software in daily use to easily set the protection processing condition regarding a time.

The possessor of the communication terminal 10 can confirm a setting status of the protection processing condition regarding a time when using the schedule software. Therefore, it is possible to obtain the advantage of easily detecting setting omission of the protection processing condition or a setting error.

3-6. Sixth Embodiment

The fifth embodiment has been described above. In the fifth embodiment, as described above, the possessor of the communication terminal 10 sets the protection processing condition regarding a time using the schedule software mounted on the communication terminal 10. In a sixth embodiment, as will be described below, the possessor of the communication terminal 10 can register the protection processing condition regarding a time in a schedule management server 40 connected to the communication network 12.

Figure 28:
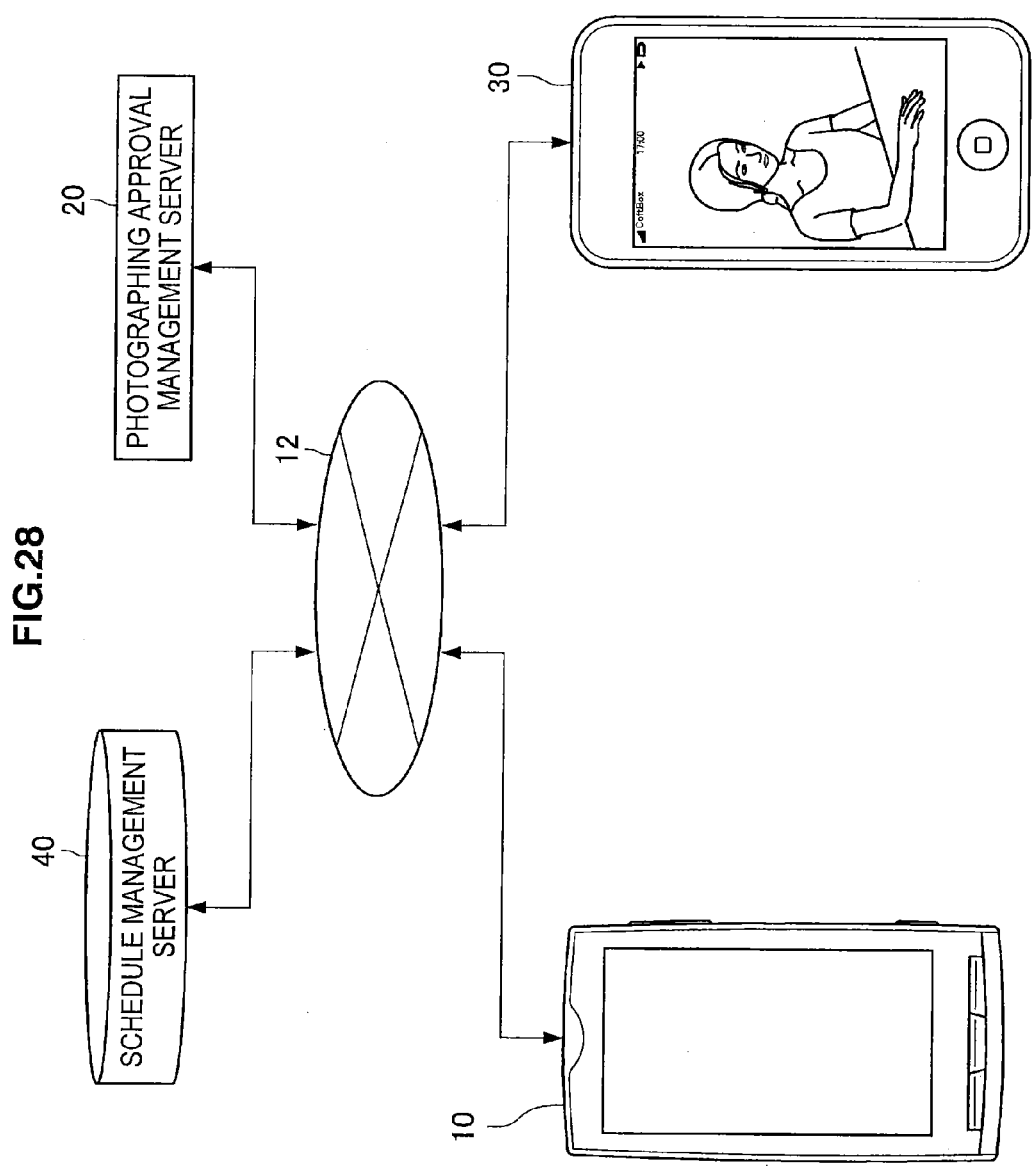
FIG. 28 is a diagram illustrating the configuration of an image processing system according to a sixth embodiment of the present disclosure.

3-6-1. Basic Configuration of Image Processing System According to Sixth Embodiment FIG. 28 is a diagram illustrating the basic configuration of an image processing system according to the sixth embodiment of the present disclosure. As illustrated in FIG. 28, the image processing system according to the sixth embodiment newly includes the schedule management server 40 compared to the first embodiment.

(Schedule Management Server 40)

The schedule management server 40 is a computer that stores and manages schedule information by a device connected to the communication network 12 and protection processing conditions associated with the schedule information. FIG. 29 is a diagram illustrating an example of schedule information registered in the schedule management server 40. As illustrated in FIG. 29, the schedule management server 40 may store an account column 4000, a time column 4002, and a photographing approval column 4004 in association therewith. Accounts set to use the image processing system according to the sixth embodiment are registered in the account column 4000. A time regarding each schedule item is registered in the time column 4002. A protection processing condition such as approval or disapproval of the photographing by, for example, the photographing terminal 30 is registered in the photographing approval column 4004. For example, data shown in the second row of FIG. 29 is data registered by a user of which an account is "Yamada" and indicates that "photographing disapproval" by the photographing terminal 30 is registered at a period of time "from 0:00 to 13:00 on Aug. 12, 2012."

3-6-2. Configuration of Sixth Embodiment

The configurations of the communication terminal 10, the photographing approval management server 20, and the photographing terminal 30 according to the sixth embodiment are the same as those of the first embodiment. Accordingly, the description thereof will be omitted here.

Figure 30:
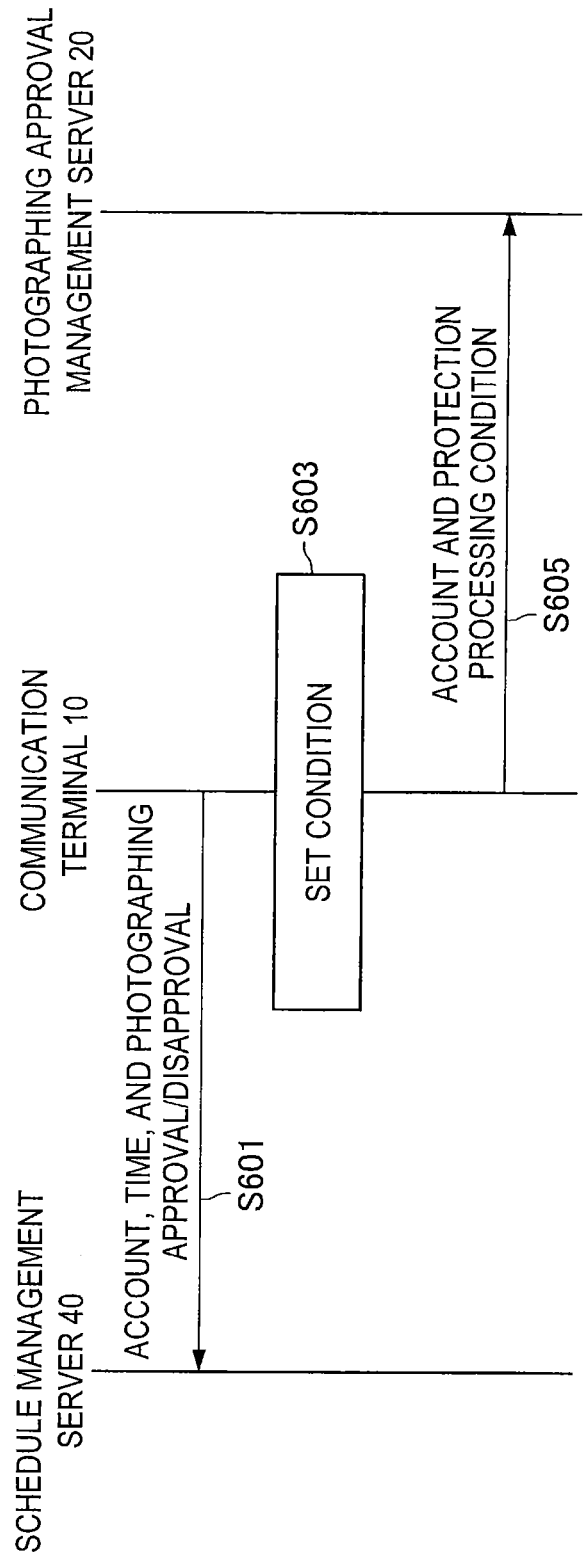
FIG. 30 is a diagram illustrating a sequence of processes before photographing according to the sixth embodiment.

3-6-3. Processes According to Sixth Embodiment 3-6-3-1. Processes Before Photographing Next, processes according to the sixth embodiment will be described. First, processes before photographing according to the sixth embodiment will be described. FIG. 30 is a diagram illustrating a sequence of some of the processes before the photographing according to the sixth embodiment.

As illustrated in FIG. 30, the possessor of the communication terminal 10 first sets an account and a protection processing condition regarding a time on the condition setting unit 108 through the operation unit 106. Then, the communication unit 110 transmits the set account, the time, the protection processing condition regarding the time, and the like to the schedule management server 40 (S601).

Subsequently, the schedule management server 40 stores the account, the time, the protection processing condition regarding the time, and the like received from the communication terminal 10 in association therewith.

Subsequently, the possessor of the communication terminal 10 sets an account and various conditions such as a protection processing condition on the condition setting unit 108 through the operation unit 106, as in S101 (S603). Next, the communication unit 110 transmits information regarding the set account, the protection processing condition, and the like to the photographing approval management server 20 (S605).

Processes subsequent to S605 are substantially the same as the processes of S105 to S113 according to the first embodiment. Accordingly, the description thereof will be omitted here.

3-6-3-2. Processes at Time of Photographing

Figure 31:
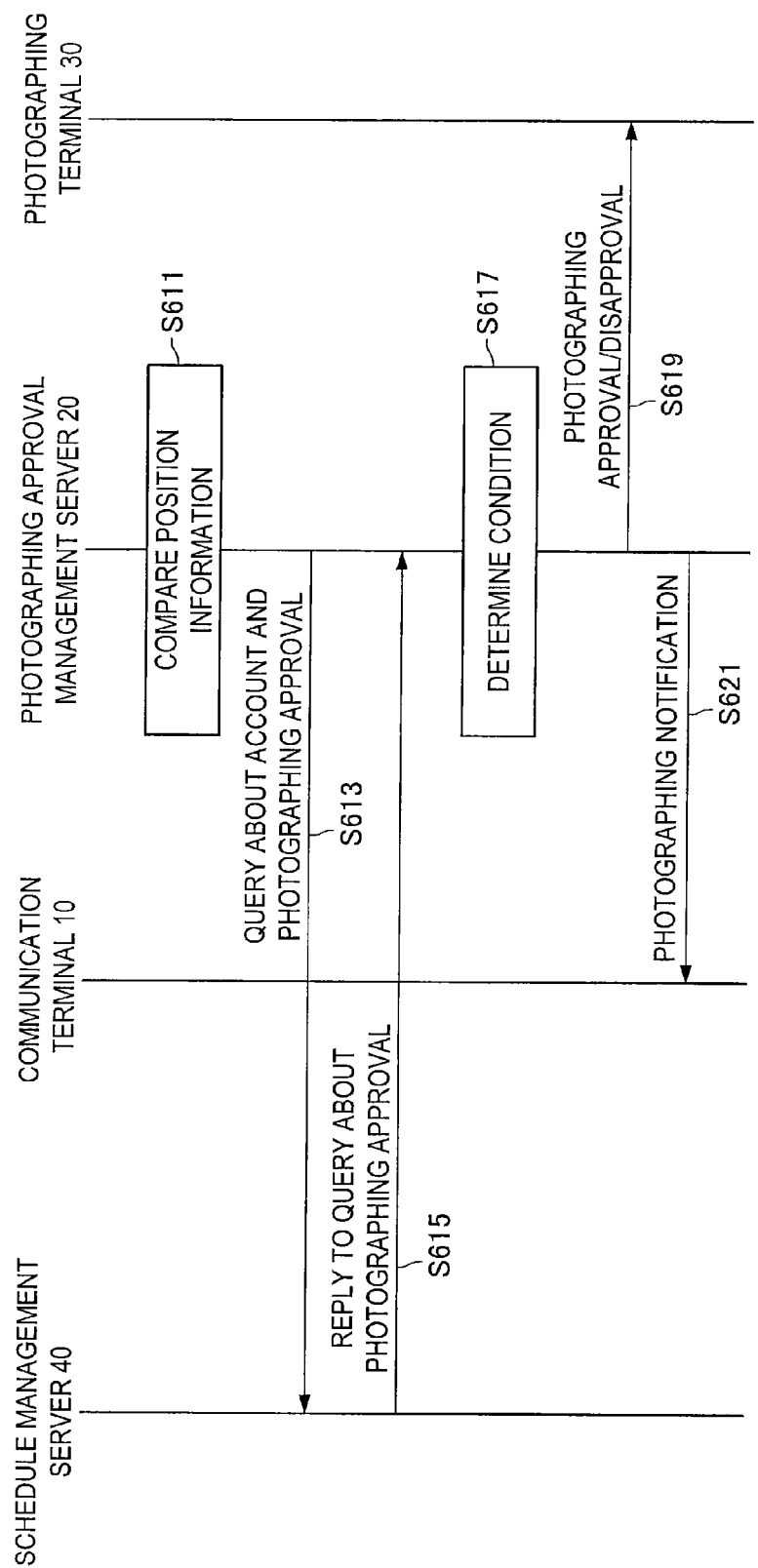
FIG. 31 is a diagram illustrating a sequence of processes at the time of photographing according to the sixth embodiment.

Next, processes at the time of the photographing according to the sixth embodiment will be described. FIG. 31 is a diagram illustrating a sequence of the processes at the time of the photographing according to the sixth embodiment. Since the processes of S121 to S129 according to the first embodiment are substantially same in the sixth embodiment, the description thereof is omitted in FIG. 31.

Next, processes subsequent to S129 will be described. After S129, the comparison unit 204 of the photographing approval management server 20 compares the position information of the communication terminal 10 stored in the position and environment state storage unit 202 with the position information of the photographic subject received from the photographing terminal 30, as in S131 (S611).

Subsequently, the communication unit 200 transmits the account to the schedule management server 40 and queries the protection processing condition regarding the time for the photographing subject corresponding to the account with regard to the account for which the comparison unit 204 determines that the position information is identical or the difference is less than the predetermined threshold value (S613).

Subsequently, the schedule management server 40 extracts the protection processing condition regarding the time registered in the schedule management server 40 with regard to the account received from the photographing approval management server 20, and then transmits the extracted protection processing condition to the photographing approval management server 20.

Subsequently, with regard to the account for which the comparison unit 204 determines that the position information is identical or the difference is less than the predetermined threshold value, the condition determination unit 208 of the photographing approval management server 20 determines whether the environment state stored in the position and environment state storage unit 202 satisfies two conditions, that is, the protection processing condition regarding the time received from the schedule management server 40 and the protection processing condition stored in the photographing approval condition storage unit 206. Then, the condition determination unit 208 determines whether the process of protecting the person image is performed according to the result of the above-described determination (S617).

Processes subsequent to S619 are the same as the processes of S135 to S139 according to the first embodiment. Accordingly, the description thereof will be omitted here.

3-6-4. Advantages According to Sixth Embodiment

In the sixth embodiment of the present disclosure, as described above, the possessor of the communication terminal 10 sets, for example, the protection processing condition such as a time at which the photographing is permitted or not permitted, in the schedule management server 40. The photographing approval management server 20 determines whether the environment state received from the communication terminal 10 satisfies two conditions, that is, the protection processing condition regarding the time received from the schedule management server 40 and the protection processing condition received from the communication terminal 10, and then transmits, to the photographing terminal 30, information prescribing whether to perform the process of protecting the person image corresponding to the photographic subject according to the result of the determination. Through the above-described process, the possessor of the communication terminal 10 can easily set the protection processing condition regarding a time by setting the protection processing condition in his or her own schedule registered in the schedule management server 40.

Since the protection processing condition is set in the schedule management server 40, it is possible to obtain the advantage that a risk of viewing or alteration of the set protection processing condition is small even when the communication terminal 10 is used by a person other than the possessor.

3-7. Seventh Embodiment

The sixth embodiment of the present disclosure has been described above. Next, a seventh embodiment will be described. In the seventh embodiment, as will be described below, the possessor of the communication terminal 10 can set a condition regarding whether acquaintance setting is performed in a predetermined SNS as a protection processing condition.

Figure 32:
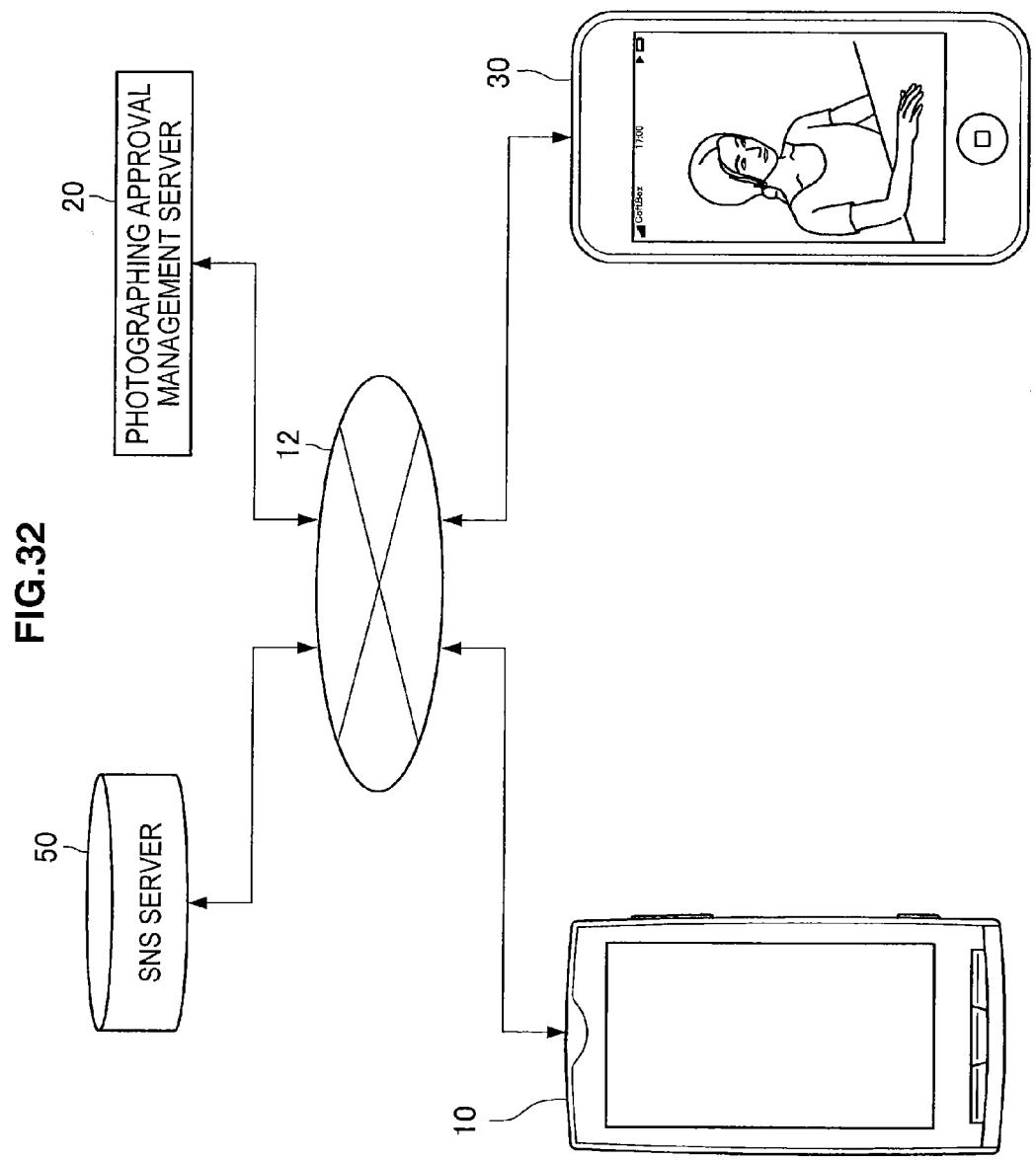
FIG. 32 is a diagram illustrating the configuration of an image processing system according to a seventh embodiment of the present disclosure.

3-7-1. Basic Configuration of Image Processing System According to Seventh Embodiment FIG. 32 is a diagram illustrating the basic configuration of an image processing system according to the seventh embodiment of the present disclosure. As illustrated in FIG. 32, the image processing system according to the seventh embodiment newly includes an SNS server 50 compared to the first embodiment.

(SNS Server 50)

The SNS server 50 is a computer that manages an SNS configured by devices connected to the communication network 12. In the SNS, SNS participants can share character information or image information between the participants. In the SNS, the participants can set a range of information to be opened according to attributes of the other participants. For example, the participants can open private information to people called "acquaintances" close to the participants and perform control such that the private information is not opened to people other than the "acquaintances."

Figure 33:
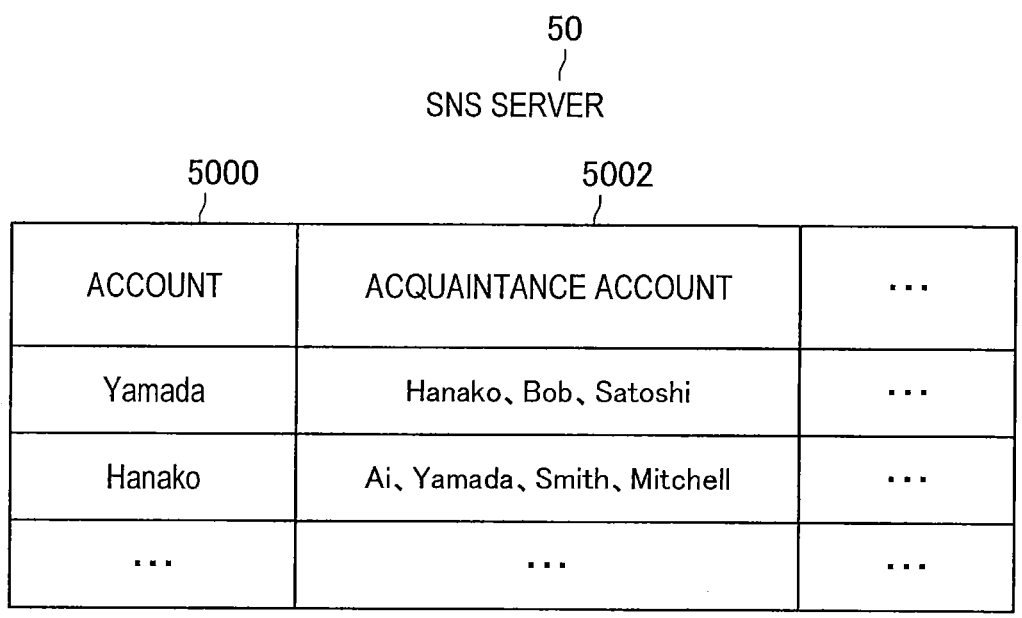
FIG. 33 is a diagram illustrating an example of the configuration of an SNS server according to the seventh embodiment.

FIG. 33 is a diagram illustrating an example of registration information registered in the SNS server 50. As illustrated in FIG. 33, the SNS server 50 may store an account column 5000 and an acquaintance account column 5002 in association therewith. Accounts set to use the SNS managed by the SNS server 50 are registered in the account column 5000. Accounts used in acquaintance registration in the SNS for each user of the account column 5000 are registered in the acquaintance account column 5002. For example, data shown in the second row of FIG. 33 indicates that "Hanako," "Bob," and "Satoshi" are registered as acquaintances accounts for a user having the SNS account "Yamada."

3-7-2. Configuration According to Seventh Embodiment

The configurations of the communication terminal 10, the photographing approval management server 20, and the photographing terminal 30 according to the seventh embodiment are the same as those of the first embodiment. Accordingly, the description thereof will be omitted here.

3-7-3. Process According to Seventh Embodiment

3-7-3-1. Processes Before Photographing

Figure 34:
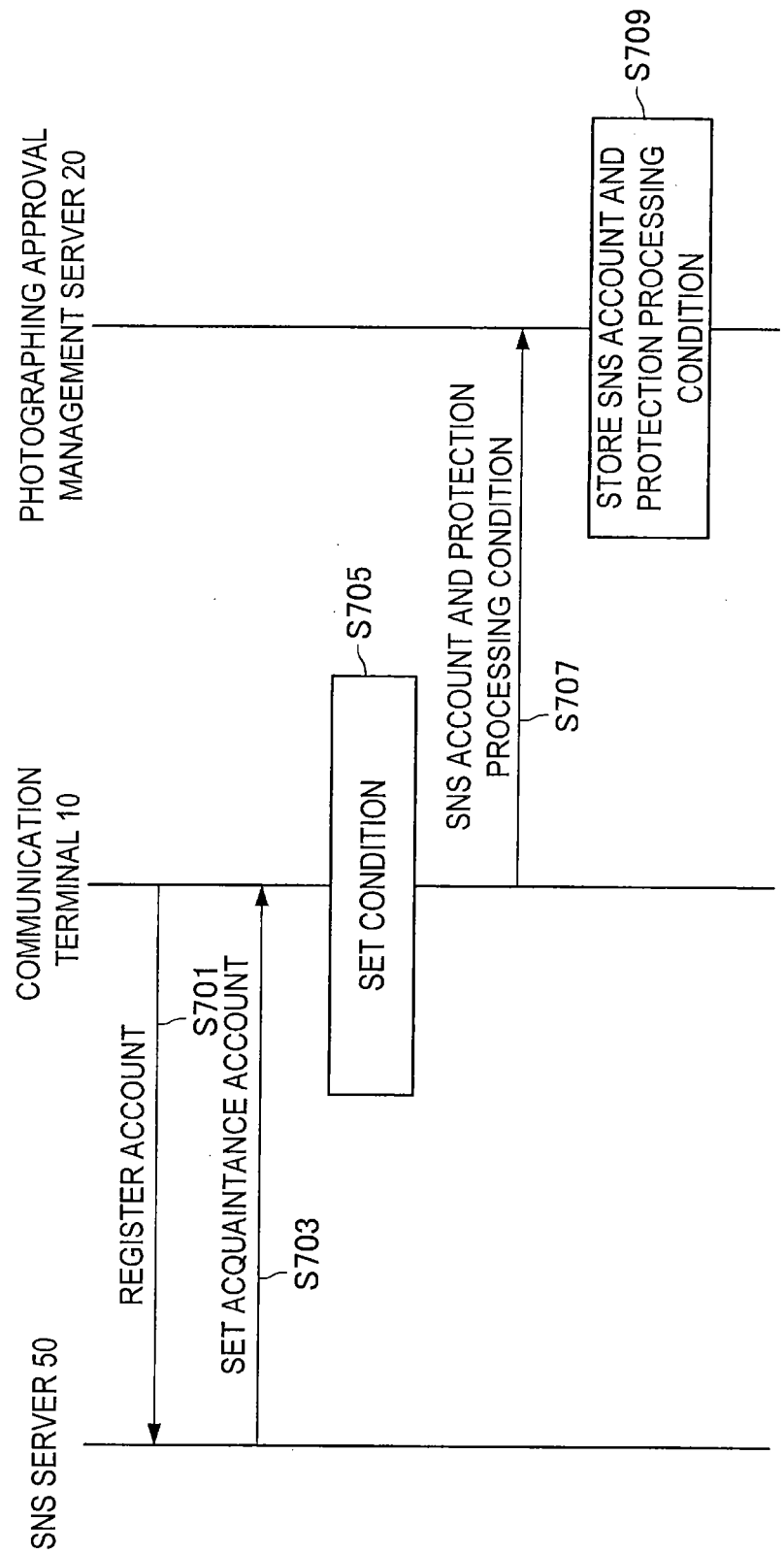
FIG. 34 is a diagram illustrating a sequence of processes before photographing according to the seventh embodiment.

Next, processes according to the seventh embodiment will be described. First, processes before the photographing according to the seventh embodiment will be described. FIG. 34 is a diagram illustrating a sequence of some of the processes before the photographing according to the seventh embodiment.

As illustrated in FIG. 34, the possessor of the communication terminal 10 first registers an account (hereinafter referred to as an SNS account) set to use the SNS in the SNS server 50 via the communication unit 110 (S701). Next, the possessor of the communication terminal 10 registers an account (hereinafter referred to as an acquaintance account) of an "acquaintance" in the SNS in the SNS server 50 (S703).

Subsequently, the possessor of the communication terminal 10 sets various conditions such as an SNS account and a protection processing condition on the condition setting unit 108 through the operation unit 106 (S705). Next, the communication unit 110 transmits information regarding the set SNS account, the protection processing condition, and the like to the photographing approval management server 20 (S707).

Subsequently, the photographing approval condition storage unit 206 of the photographing approval management server 20 stores the SNS account and the protection processing condition received from the communication terminal 10 in association therewith (S709). For example, in the example of the photographing approval condition storage unit 206 illustrated in FIG. 6, the received SNS account is stored in the account column 2060.

Processes subsequent to S709 differ from the processes of S107 to S113 according to the first embodiment in that the "SNS account" is used as an account, but the remaining processes are substantially the same. Accordingly, the description thereof will be omitted here.

3-7-3-2. Process at Time of Photographing

Figure 35:
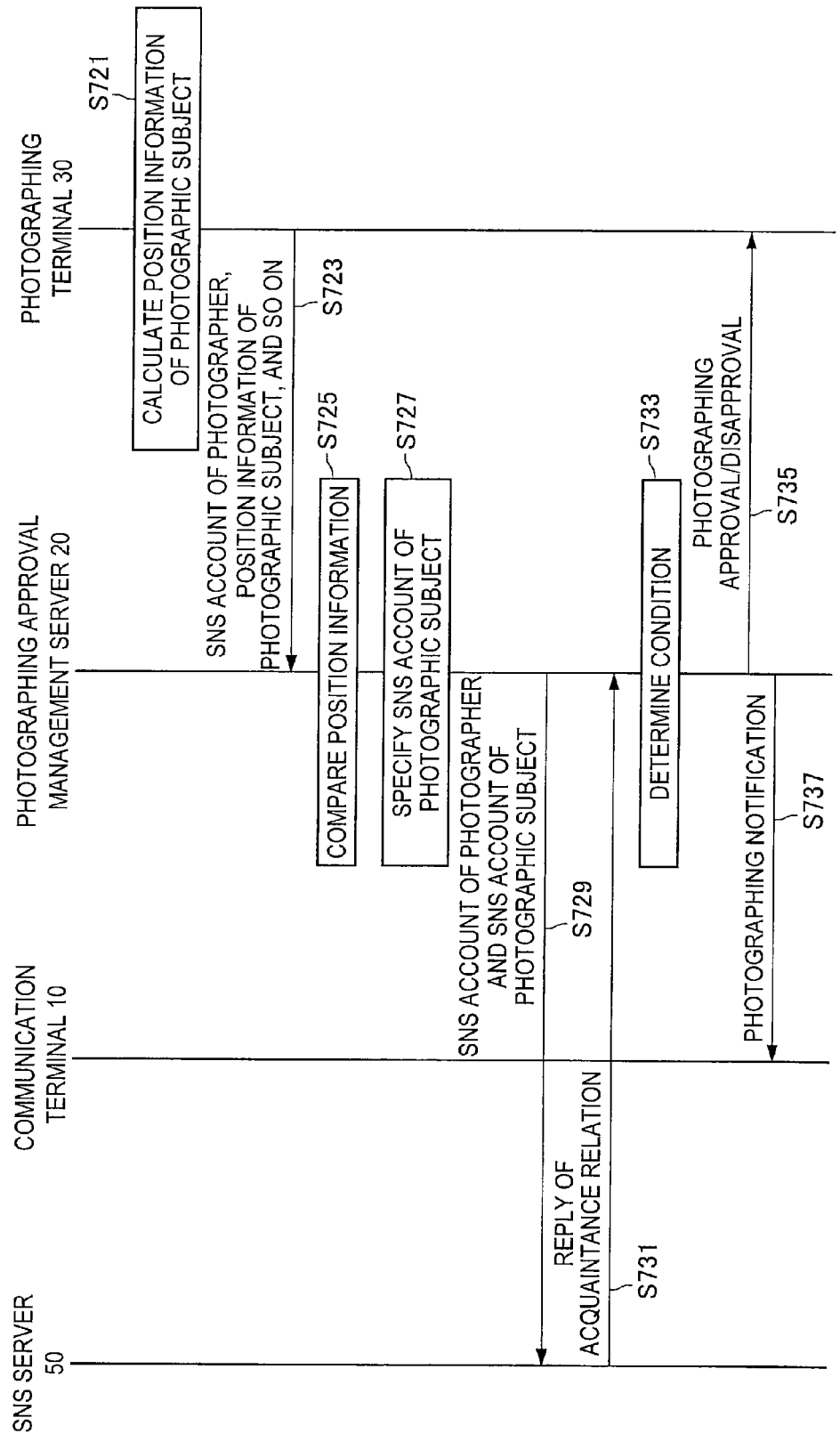
FIG. 35 is a diagram illustrating a sequence of processes at the time of photographing according to the seventh embodiment.

Next, processes at the time of the photographing according to the seventh embodiment will be described. FIG. 35 is a diagram illustrating a sequence of the processes at the time of the photographing according to the seventh embodiment. Since the processes of S121 to S125 according to the first embodiment are performed in substantially the same manner in the seventh embodiment, the description thereof is omitted in FIG. 35.

After S125, the photographic subject position acquisition unit 304 calculates position information of a photographic subject corresponding to a person image included in a photographic image, as in S127 (S721).

Subsequently, the communication unit 310 transmits the information regarding the SNS account of the photographer, the calculated position information of the photographic subject, and the like to the photographing approval management server 20 (S723).

Subsequently, the comparison unit 204 of the photographing approval management server 20 compares the position information of the communication terminal 10 stored in the position and environment state storage unit 202 with the position information of the photographic subject received from the photographing terminal 30, as in S131 (S725). Then, when the comparison unit 204 determines that the position information is identical or the difference is less than the predetermined threshold value by the above-described comparison, the comparison unit 204 acquires the account of the photographic subject, that is, the SNS account of the photographic subject from the position and environment state storage unit 202 (S727).

Subsequently, the communication unit 200 transmits the SNS account acquired by the comparison unit 204 and the SNS account of the photographer received from the photographing terminal 30 to the SNS server 50 and queries the registration content regarding a relationship between the photographer and the photographic subject in the SNS server 50 (S729). For example, the communication unit 200 queries whether the account of the photographer is registered as an acquaintance account with regard to the account of the photographic subject in the SNS server 50.

Subsequently, the SNS server 50 confirms the registration content regarding the relationship between the photographer and the photographic subject based on the SNS account of the photographer received from the photographing approval management server 20 and the SNS account of the photographic subject. Then, the SNS server 50 transmits, for example, information indicating whether the photographer is registered as an acquaintance of the photographic subject as the result of the confirmation to the photographing approval management server 20 (S731).

Subsequently, with regard to the data for which the comparison unit 204 determines that the position information is identical or the difference is less than the predetermined threshold value, the condition determination unit 208 of the photographing approval management server 20 determines whether a result of the reply to the query received from the SNS server 50 satisfies the protection processing condition set in advance for the registration content regarding the relationship between the photographer and the photographic subject in the SNS. For example, the condition determination unit 208 may determine that the protection processing condition is not satisfied when information indicating that the photographer is not registered as an acquaintance of the photographic subject is received from the SNS server 50.

Further, as in S133, with regard to the data for which the comparison unit 204 determines that the position information is identical or the difference is less than the predetermined threshold value, the condition determination unit 208 determines whether the environment state stored in the position and environment state storage unit 202 satisfies the protection processing condition stored in the photographing approval condition storage unit 206. Then, the condition determination unit 208 determines whether the process of protecting the person image is performed according to the results of the above-described two determinations (S733).

Processes subsequent to S735 are the same as the processes of S135 to S139 according to the first embodiment. Accordingly, the description thereof will be omitted here.

3-7-4. Advantages According to Seventh Embodiment

In the seventh embodiment of the present disclosure, as described above, the photographing approval management server 20 queries the registration content regarding the relationship between the photographer and the photographic subject to the SNS server 50. Then, the photographing approval management server 20 determines whether the result of the reply to the query received from the SNS server 50 satisfies the protection processing condition set in advance by the communication terminal 10 and transmits the information prescribing whether to perform the process of protecting the person image corresponding to the photographic subject according to the result of the determination to the photographing terminal 30. Therefore, the possessor of the communication terminal 10 can easily set the condition regarding whether the photographer is set as an acquaintance in the SNS as the protection processing condition.

The possessor of the communication terminal 10 can change the protection processing condition according to the registration content regarding the relationship between the photographer and the photographic subject in the SNS. For example, the possessor of the communication terminal 10 can change the protection processing condition. For example, the possessor sets "photographing is approved anytime" as the protection processing condition with regard to the acquaintance account and set "photographing is approved only on weekdays" as the protection processing condition with regard to accounts other than the acquaintance account.

3-8. Eighth Embodiment

The seventh embodiment of the present disclosure has been described above. Next, an eighth embodiment will be described. In the eighth embodiment, as will be described below, the possessor of the communication terminal 10 can confirm whether an acquaintance is located within a range in which the acquaintance is photographed jointly by the photographing terminal 30 and can change a protection processing condition according to the confirmed acquaintance.

Figure 36:
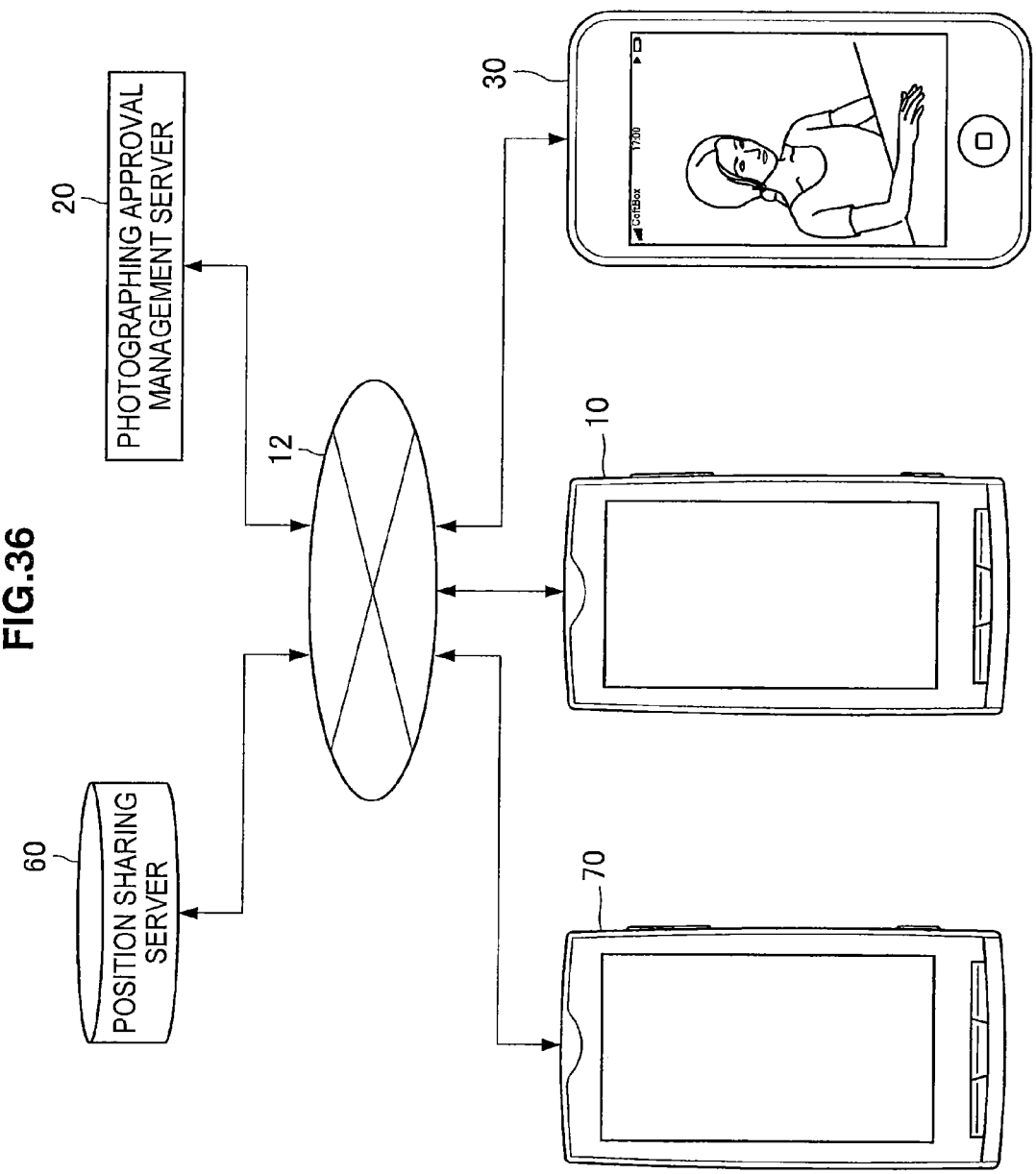
FIG. 36 is a diagram illustrating the configuration of an image processing system according to an eighth embodiment of the present disclosure.

3-8-1. Basic Configuration of Image Processing System According to Eighth Embodiment FIG. 36 is a diagram illustrating the basic configuration of an image processing system according to the eighth embodiment. As illustrated in FIG. 36, the image processing system according to the eighth embodiment newly includes a position sharing server 60 and a second communication terminal 70 compared to the first embodiment.

(Position Sharing Server 60)

The position sharing server 60 is a computer that stores and manages position information transmitted from a device connected to the communication network 12. The position sharing server 60 may have a function of managing a predetermined SNS configured by devices connected to the communication network 12. FIG. 37 is a diagram illustrating an example of registration information registered in the position sharing server 60. As illustrated in FIG. 37, the position sharing server 60 may store an account column 6000, a position information column 6002, and an acquaintance account column 6004 in association therewith. Accounts set to use the image processing system according to the eighth embodiment are registered in the account column 6000. Position information transmitted from a communication terminal held by a user corresponding to each account registered in the account column 6000 is registered in the position information column 6002. Accounts in which acquaintances of each user of the account column 6000 are registered in the SNS are registered in the acquaintance account column 6004. For example, data shown in the second row of FIG. 37 indicates that "(x, y)" is received as position information from the communication terminal used by a user of which the account is "Yamada" and "Hanako," "Bob," and "Satoshi" are registered as the acquaintance accounts of the user of which the account is "Yamada."

(Second Communication Terminal 70)

The second communication terminal 70 is a communication terminal that is held by a person other than the person that possesses the communication terminal 10. The second communication terminal 70 has a positioning function, a wireless communication function, a screen display function, and the like. The configuration and the functions of the second communication terminal 70 may be the same as those of the communication terminal 10. In FIG. 36, only one second communication terminal 70 is illustrated. However, in principle, there are the plurality of second communication terminals 70 and different users are assumed to use the terminals.

3-8-2. Configuration of Eighth Embodiment

The configurations of the communication terminal 10, the photographing approval management server 20, and the photographing terminal 30 according to the eighth embodiment are the same as those of the first embodiment. Accordingly, the description thereof will be omitted here.

3-8-3. Processes According to Eighth Embodiment

3-8-3-1. Processes Before Photographing

Figure 38:
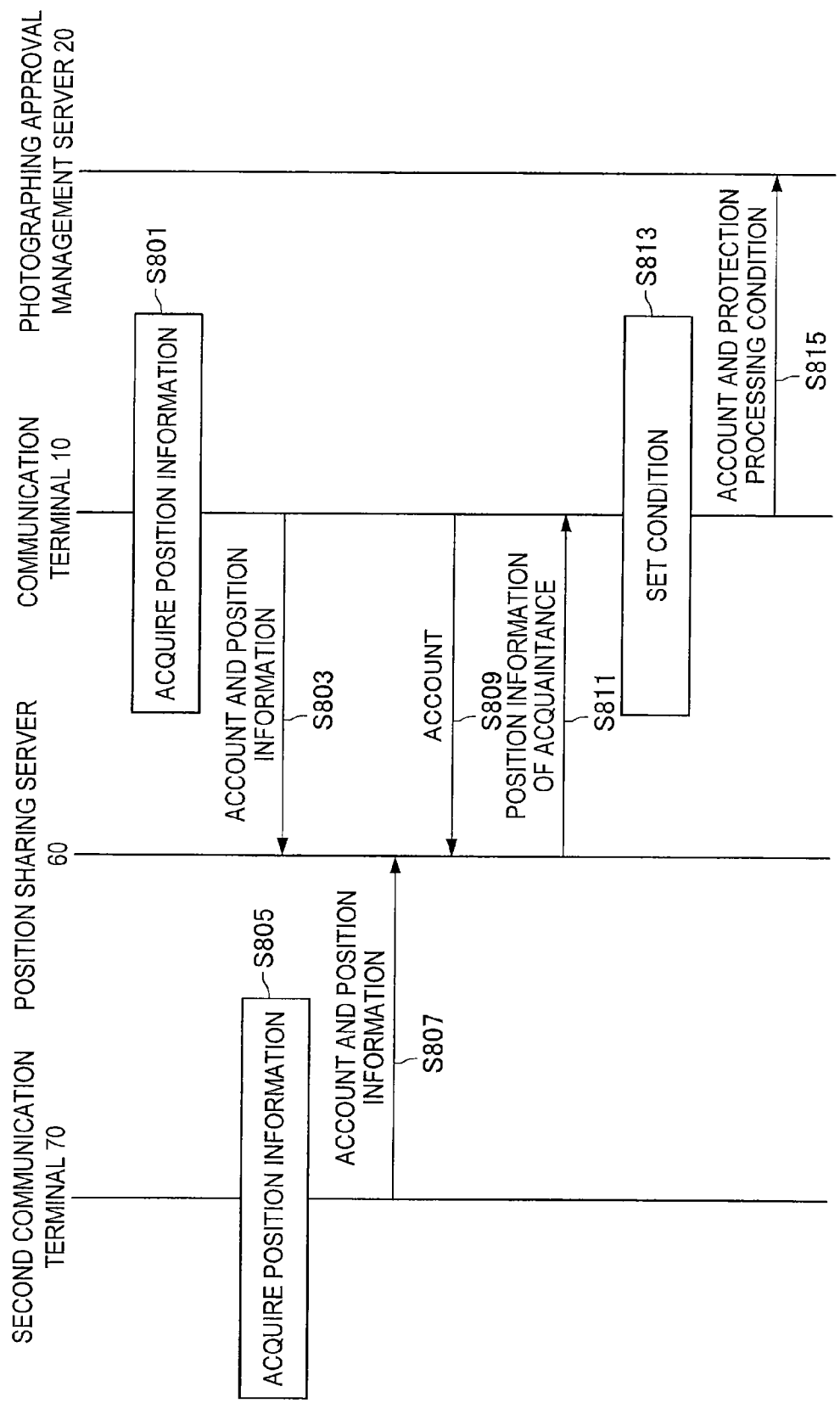
FIG. 38 is a diagram illustrating a sequence of processes before photographing according to the eighth embodiment.

Next, processes according to the eighth embodiment will be described. First, processes before photographing according to the eighth embodiment will be described. FIG. 38 is a diagram illustrating a sequence of some of the processes before the photographing according to the eighth embodiment.

As illustrated in FIG. 38, the position information acquisition unit 100 first acquires the position information of the communication terminal 10 through an operation performed by the possessor of the communication terminal 10 (S801). Next, the communication unit 110 transmits the account which the possessor of the communication terminal 10 has and the acquired position information to the position sharing server 60 (S803). The account may be an SNS account set to use an SNS managed by the position sharing server 60.

Subsequently, the second communication terminal 70 acquires position information of the second communication terminal 70, for example, by the positioning function of the second communication terminal 70 (S805). Next, the second communication terminal 70 transmits the account which the possessor of the second communication terminal 70 has and the acquired position information to the position sharing server 60 (S807). The account may be an SNS account set to use the SNS managed by the position sharing server 60.

Subsequently, when the possessor of the communication terminal 10 desires to set a protection processing condition, the communication unit 110 transmits the account of the possessor of the communication terminal 10 to the position sharing server 60 and queries position information of an acquaintance through an operation performed by the possessor of the communication terminal 10 (S809).

Subsequently, the position sharing server 60 extracts the acquaintance accounts corresponding to the account received from the communication terminal 10 and the position information corresponding to each acquaintance account. Then, the position sharing server 60 transmits a combination of the acquaintance accounts and the position information to the communication terminal 10 (S811).

Subsequently, the possessor of the communication terminal 10 confirms the position information received from the position sharing server 60 and confirms whether an acquaintance is located within, for example, the joint photographic range. Then, the possessor of the communication terminal 10 sets various conditions such as the protection processing condition on the condition setting unit 108 based on the result of the confirmation (S813). For example, the possessor of the communication terminal 10 can set "photographing disapproval" as the protection processing condition, when the fact that an acquaintance with whom the possessor does not want to be photographed is located within the joint photographic range is confirmed.

Processes subsequent to S813 are substantially the same as the processes of S103 to S113 according to the first embodiment. Accordingly, the description thereof will be omitted here.

3-8-3-2. Process at Time of Photographing

Processes at the time of the photographing according to the eighth embodiment are the same as those of the first embodiment. Accordingly, the description thereof will be omitted here.

3-8-4. Advantages According to Eighth Embodiment

In the eighth embodiment, as described above, the communication terminal 10 transmits the account of the possessor of the communication terminal 10 to the position sharing server 60 and queries the position information of the acquaintance of the possessor of the communication terminal 10. The position sharing server 60 extracts the acquaintance accounts corresponding to the account received from the communication terminal 10 and the position information corresponding to the acquaintance account and transmits a combination of the acquaintance accounts and the position information to the communication terminal 10. Therefore, the possessor of the communication terminal 10 can confirm whether an acquaintance is located within the joint photographic range and change the protection processing condition according to the confirmed acquaintance.

3-9. Ninth Embodiment

The eighth embodiment of the present disclosure has been described above. In the eighth embodiment, as described above, the communication terminal 10 queries the position information of an "acquaintance" to the position sharing server 60. In a ninth embodiment, as will be described below, the communication terminal 10 can query whether a second communication terminal 70 is a communication terminal of an "acquaintance" to the second communication terminal 70 located nearby through inter-device communication.

Figure 39:
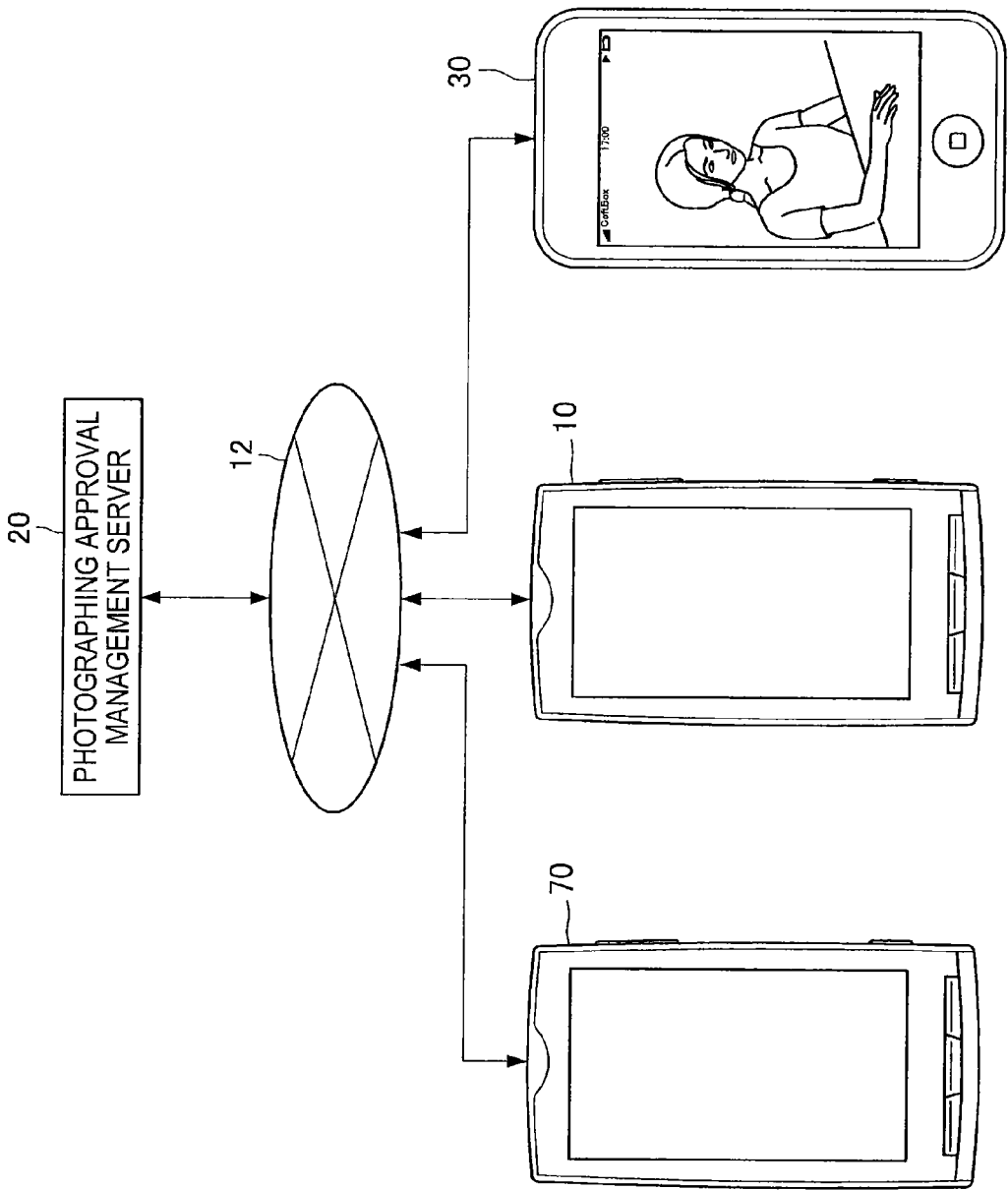
FIG. 39 is a diagram illustrating the configuration of an image processing system according to a ninth embodiment of the present disclosure.

3-9-1. Basic Configuration of Image Processing System According to Ninth Embodiment FIG. 39 is a diagram illustrating the basic configuration of an image processing system according to the ninth embodiment of the present disclosure. As illustrated in FIG. 39, the image processing system according to the ninth embodiment differs in that the position sharing server 60 is not included compared to the eighth embodiment.

3-9-2. Configuration of Ninth Embodiment

The configurations of the communication terminal 10, the photographing approval management server 20, and the photographing terminal 30 according to the ninth embodiment are the same as those of the first embodiment. Accordingly, the description thereof will be omitted here.

3-9-3. Processes According to Ninth Embodiment

3-9-3-1. Processes Before Photographing

Figure 40:
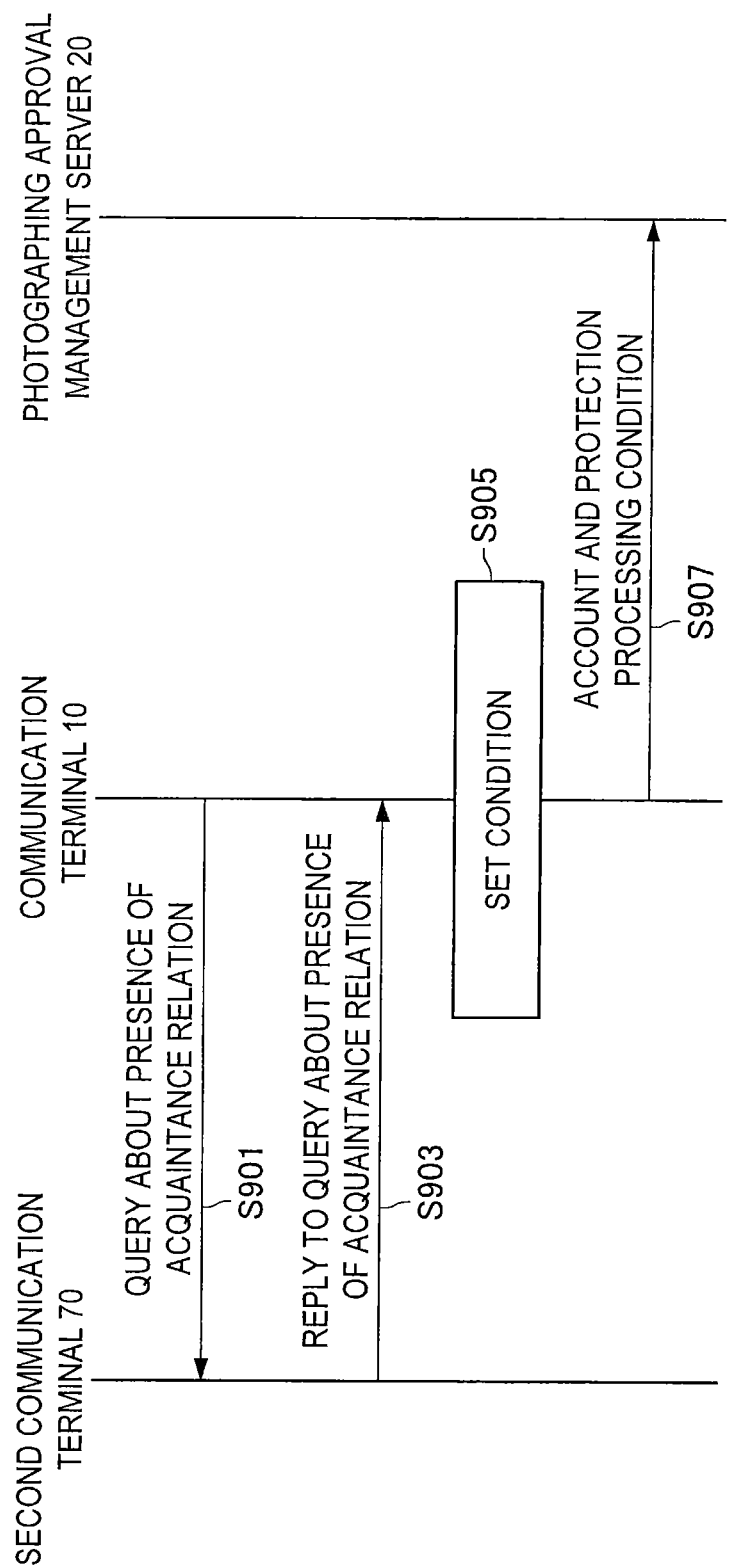
FIG. 40 is a diagram illustrating a sequence of processes before photographing according to the ninth embodiment.

Next, processes according to the ninth embodiment will be described. First, processes before photographing according to the ninth embodiment will be described. FIG. 40 is a diagram illustrating a sequence of some of the processes before the photographing according to the ninth embodiment.

As illustrated in FIG. 40, the communication unit 110 first queries whether the second communication terminal 70 is a communication terminal of "an acquaintance" (hereinafter referred to as presence or absence of an acquaintance relation) to the second communication terminal 70 located nearby, for example, via the communication network 12 such as the Internet through the inter-device communication through an operation of the possessor of the communication terminal 10 (S901). Here, the communication unit 110 may query the "presence or absence of the acquaintance relation" by transmitting the account of the possessor of the communication terminal 10 input on the operation unit 106 to the periphery.

Subsequently, when the second communication terminal 70 receives the query of the "presence or absence of the acquaintance relation" from the communication terminal 10, the second communication terminal 70 transmits the account of the possessor of the second communication terminal 70 and the account received from the communication terminal 10 to a predetermined SNS server to confirm presence or absence of the acquaintance relation. Next, the second communication terminal 70 transmits the result of the confirmation received from the SNS server as a reply to the query from the communication terminal 10 to the communication terminal 10 through the inter-device communication. When the reply to the query is the "presence of the acquaintance relation," the second communication terminal 70 transmits the own account together (S903).

As a modification example of S903, the second communication terminal 70 may store an acquaintance relation list in the own terminal instead of confirming whether there is the acquaintance relation in a predetermined SNS server. In this modification example, the second communication terminal 70 transmits a reply to the query from the communication terminal 10 to the communication terminal 10 through the inter-device communication based on the acquaintance relation list.

Subsequently, the possessor of the communication terminal 10 confirms the reply to the "presence or absence of the acquaintance relation" and the account received from the second communication terminal 70 to confirm whether an acquaintance is located nearby. Then, the possessor of the communication terminal 10 sets various conditions such as a protection processing condition on the condition setting unit 108 based on the result of the conformation (S905). For example, when the possessor of the communication terminal 10 confirms that an acquaintance with whom the possessor does not want to be photographed together is located nearby, the possessor can set "photographing disapproval" as the protection processing condition.

Processes subsequent to S905 are substantially the same as the processes of S103 to S113 according to the first embodiment. Accordingly, the description thereof will be omitted here.

3-9-3-2. Process at Time of Photographing

Processes at the time of the photographing according to the ninth embodiment are the same as those of the first embodiment. Accordingly, the description thereof will be omitted here.

3-9-4. Advantages According to Ninth Embodiment

In the ninth embodiment of the present disclosure, as described above, the communication terminal 10 queries the "presence or absence of the acquaintance relation" to the second communication terminal 70 located nearby through the inter-device communication and receives a reply to the "presence or absence of the acquaintance relation" and the account from the second communication terminal 70. Therefore, the possessor of the communication terminal 10 can confirm whether an acquaintance is located nearby and change the protection processing condition according to the confirmed acquaintance.

In the ninth embodiment, compared to the eighth embodiment, it is possible to obtain, for example, the advantages that it is not necessary for the second communication terminal 70 to upload the position information to the position sharing server 60 and this embodiment is applicable even to a system in which the position sharing server 60 is not installed.

3-10. Tenth Embodiment

The ninth embodiment of the present disclosure has been described above. Next, a tenth embodiment will be described. In the tenth embodiment, as will be described below, the possessor of the communication terminal 10 can allow the photographing terminal 30 to perform a process of protecting his or her own image included in a photographic image after photographing, when the photographic image is viewed on the photographing terminal 30.

3-10-1. Configuration of Tenth Embodiment

Figure 41:
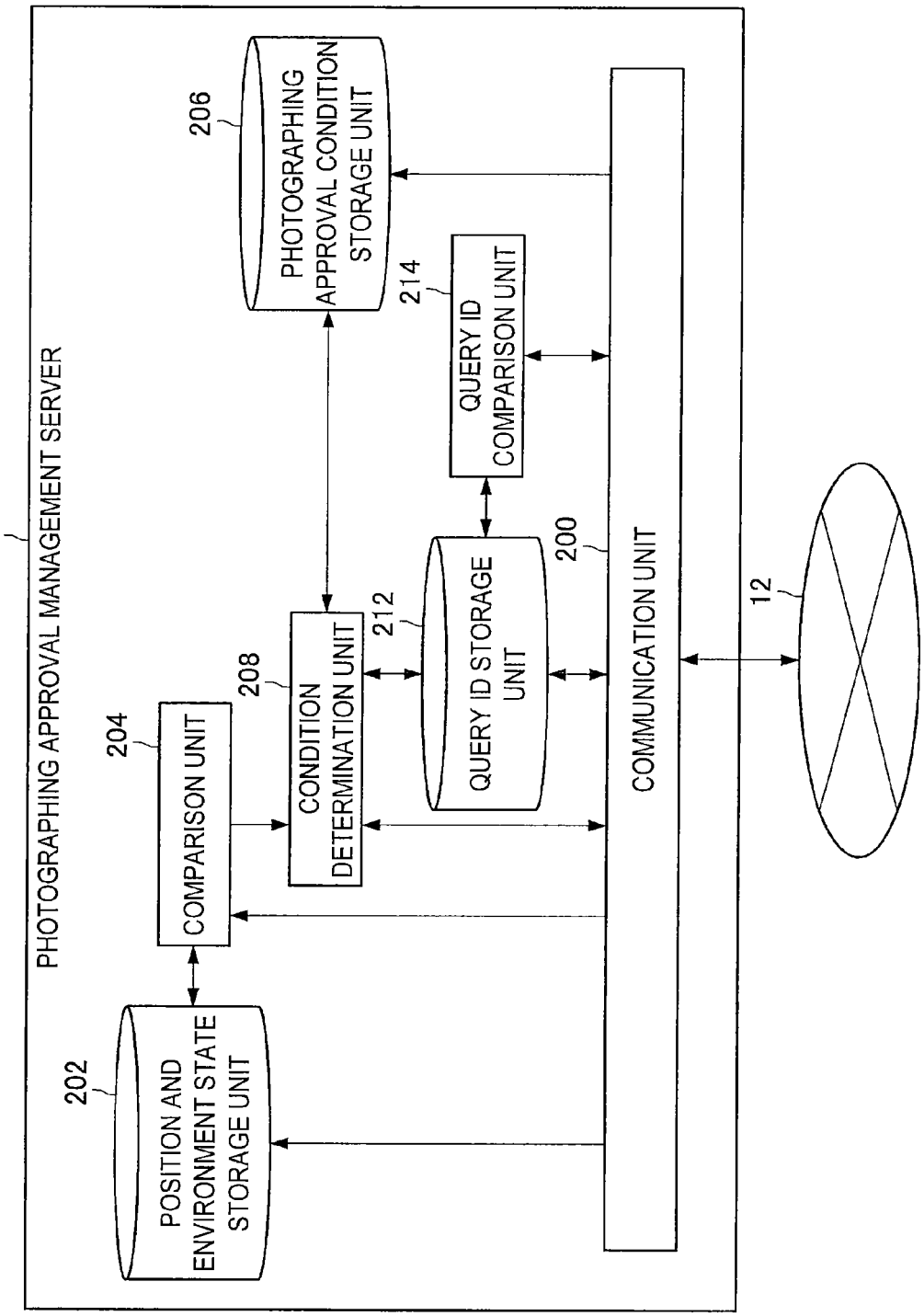
FIG. 41 is a functional block diagram illustrating the configuration of a photographing approval management server according to a tenth embodiment of the present disclosure.

FIG. 41 is a functional block diagram illustrating the configuration of the photographing approval management server 20 according to the tenth embodiment. As illustrated in FIG. 41, the photographing approval management server 20 according to the tenth embodiment newly includes a query ID storage unit 212 compared to the first embodiment. Here, a query ID refers to an identifier that is uniquely allocated to each person image included in each photographic image. That is, the query ID refers to an ID that is allocated so as to differ for each photographic image and each person region (person image) included in each photographic image.

The condition determination unit 208 according to the tenth embodiment has the same function as the condition determination unit 208 according to the first embodiment. The condition determination unit 208 according to the tenth embodiment allocates an ID different from previously allocated IDs to each person image with reference to the query IDs recorded in the query ID storage unit 212.

The query ID storage unit 212 stores a query 1D determined by the condition determination unit 208, an account of a photographic subject corresponding to the person image corresponding to the query ID, a photographic approval condition of the photographic subject, and a view approval condition (protection processing condition) of the person image in association therewith. The query ID storage unit 212 may further store information used to specify a photographic image, such as a photographing time or an account of a person photographed together, in addition to the account, the photographic approval condition, and the view approval condition described above in association with the query ID.

FIG. 42 is a diagram illustrating an example of the configuration of the query ID storage unit 212. As illustrated in FIG. 42, the query ID storage unit 212 may stores a query ID column 2120, an account column 2122, a photographing approval condition column 2124, and a view approval condition column 2126 in association therewith. The query ID determined for each person image included in one photographic image is registered in the query ID column 2120. An account of a photographic subject corresponding to the person image corresponding to each value of the query ID column 2120 is registered in the account column 2122. A condition regarding photographing approval or disapproval set for the person image is registered in the photographing approval condition column 2124. A condition regarding view approval set for the person image is registered in the view approval condition column 2126. For example, data shown in the second row of FIG. 42 indicates that with regard to a person image with the query ID "3124," "Yamada" is registered as the account of a photographic subject corresponding to the person image, "disapproval when moving" is registered as the photographing approval condition of the photographic subject, and "constant disapproval" is registered as the view approval condition of the person image.

The functions of the remaining constituent elements of the photographing approval management server 20 are the same as those of the first embodiment.

The configurations of the communication terminal 10 and the photographing terminal 30 according to the tenth embodiment are the same as those of the first embodiment. Accordingly, the description thereof will be omitted here.

3-10-3. Processes According to Tenth Embodiment

3-10-3-1. Processes Before Photographing

Next, processes according to the tenth embodiment will be described. First, processes before photographing according to the tenth embodiment will be described.

The processes before the photographing according to the tenth embodiment are substantially the same as those of the first embodiment, except that S101 is characterized by condition setting. In the tenth embodiment, in S101, the possessor of the communication terminal 10 may set a provisional condition as the protection processing condition and set the condition regarding the viewing on the photographing terminal 30 again after the photographing terminal 30 performs the photographing. For example, in S101, the possessor of the communication terminal 10 can set, for example, a provisional condition such as "confirmation is necessary at the time of viewing."

3-10-2-2. Processes at Time of Photographing

Figure 43:
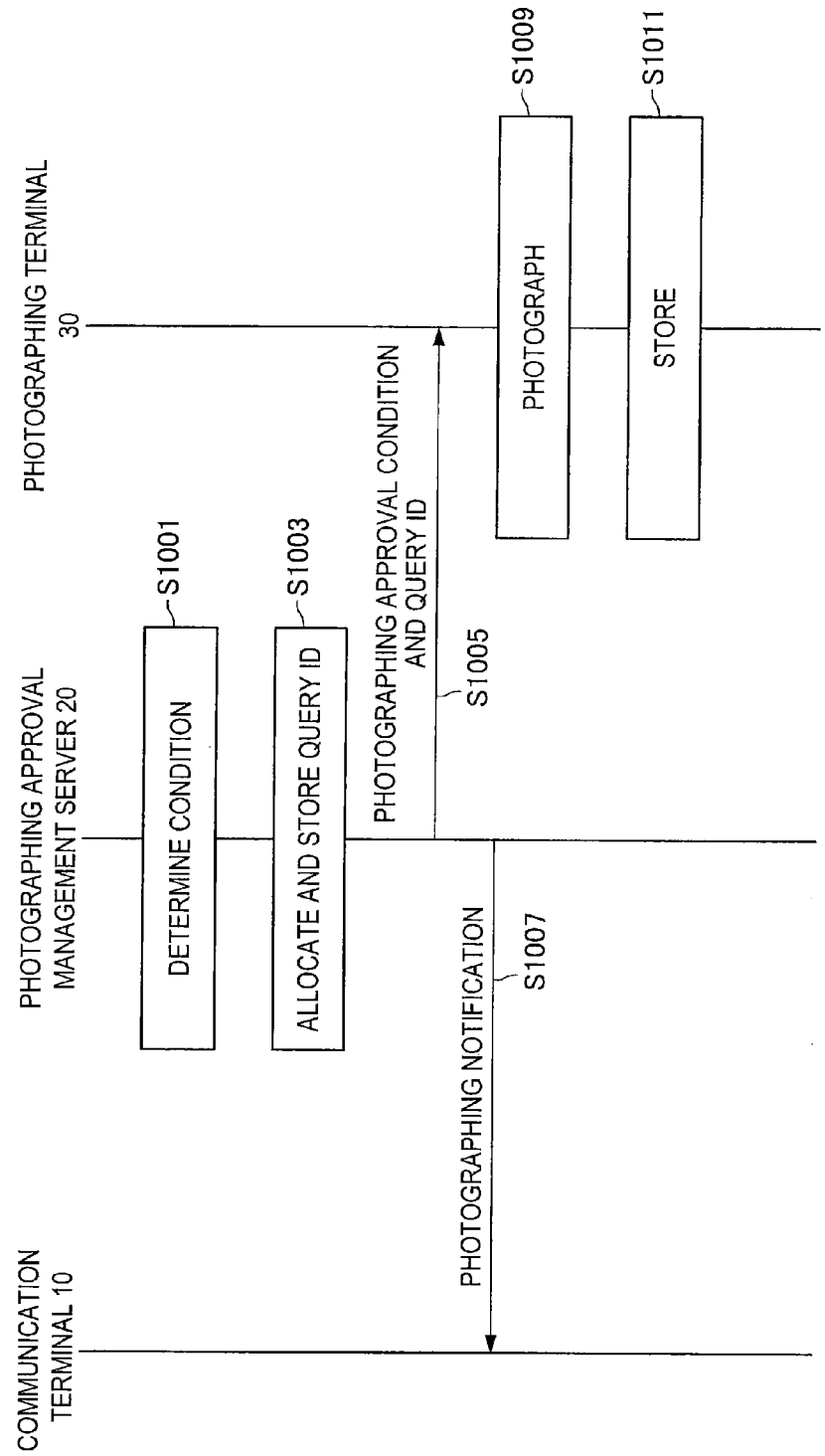
FIG. 43 is a diagram illustrating a sequence of processes at the time of photographing according to the tenth embodiment.

Next, processes at the time of the photographing according to the tenth embodiment will be described. FIG. 43 is a diagram illustrating a sequence of some of the processes at the time of photographing according to the tenth embodiment. Since the processes of S121 to S131 according to the first embodiment are substantially the same in the tenth embodiment, the description thereof is omitted in FIG. 43.

Next, processes subsequent to S131 will be described. After S131, the condition determination unit 208 of the photographing approval management server 20 determines whether the process of protecting each person image included in a photographic image is performed, as in S133 (S1001).

Subsequently, the condition determination unit 208 first determines a query ID of the person image to distinguish this person image from other person images with reference to the query IDs recorded in the query ID storage unit 212. Next, the query ID storage unit 212 stores the query ID determined by the condition determination unit 208, the account of a photographic subject corresponding to the person image, and the protection processing condition of the person image in association therewith (S1003).

As a modification example of S1003, for example, the condition determination unit 208 may issue the query ID only for the account in which "confirmation is necessary at the time of viewing" is set as the protection processing condition. For example, when the photographing terminal 30 performs continuous photographing such as photographing of a moving image, the condition determination unit 208 may determine the same query ID for the person images of the same photographic subject and store each of the continuously photographed photographic images and the query ID in association therewith.

Subsequently, with regard to the account for which the comparison unit 204 determines that the position information is identical or the difference is less than the predetermined threshold value, the communication unit 200 transmits the query ID and the photographing approval condition to the photographing terminal 30 (S1005). Then, the communication unit 200 transmits photographing notification to the communication terminal 10 (S1007). The content of the photographing notification may be the same as that of the first embodiment.

Subsequently, the imaging unit 300 of the photographing terminal 30 photographs a photographic image based on the photographing approval condition received from the photographing approval management server 20 (S1009). Then, the storage unit 316 stores the query ID received from the photographing approval management server 20 and corresponding to each person image included in the photographic image, a pixel region of the person image, and the photographic image in association therewith (S1011).

3-10-2-3. Processes at Time of Change in View Approval Condition

Next, processes at the time of change in the view approval condition according to the tenth embodiment will be described. For example, the change in the view approval condition is performed by the possessor of the communication terminal 10 when the possessor desires to change the condition regarding the viewing of the photographed photographic image.

Figure 44:
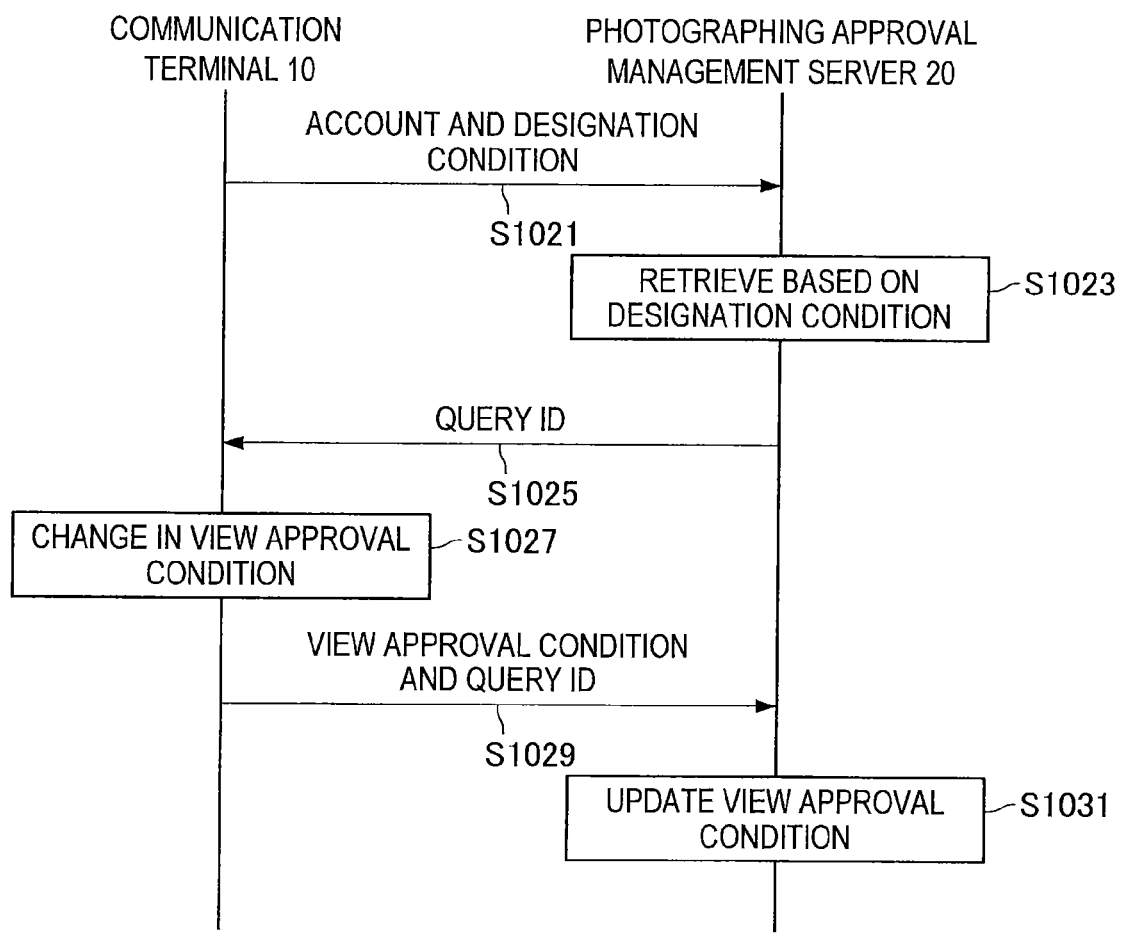
FIG. 44 is a diagram illustrating a sequence of processes at the time of change in a view approval condition according to the tenth embodiment.

FIG. 44 is a diagram illustrating a sequence of some of the processes at the time of the change in the view approval condition according to the tenth embodiment. As illustrated in FIG. 44, for example, the possessor of the communication terminal 10 first sets a condition (designation condition) such as a photographing time used to specify a photographic image for which the view approval condition is desired to be changed on the condition setting unit 108. Next, the communication unit 110 transmits the account and the set designation condition to the photographing approval management server 20 (S1021).

Subsequently, the query ID storage unit 212 of the photographing approval management server 20 extracts the corresponding query ID based on the account and the designation condition received from the communication terminal 10 (S1023). Next, the communication unit 200 transmits the extracted query ID to the communication terminal 10 (S1025).

Subsequently, the possessor of the communication terminal 10 changes the setting of the previously set view approval condition set in the photographing image corresponding to the query ID received from the photographing approval management server 20 on the condition setting unit 108 through the operation unit 106 (S1027). Here, the setting of the view approval condition described above may be performed using another device such as a PC connected to the communication network 12, instead of the communication terminal 10.

Subsequently, the communication unit 110 transmits the query ID and the view approval condition set in S1027 to the photographing approval management server 20 (S1029).

Subsequently, the query ID storage unit 212 of the photographing approval management server 20 updates the view approval condition stored in association with the query ID received from the communication terminal 10 to the view approval condition received from the communication terminal 10 and stores the updated view approval condition (S1031).

When the possessor of the communication terminal 10 desires to repeat the processes of S1021 to S1031, these processes may be repeated a plurality of times.

3-10-2-4. Processes at Time of Viewing

Figure 45:
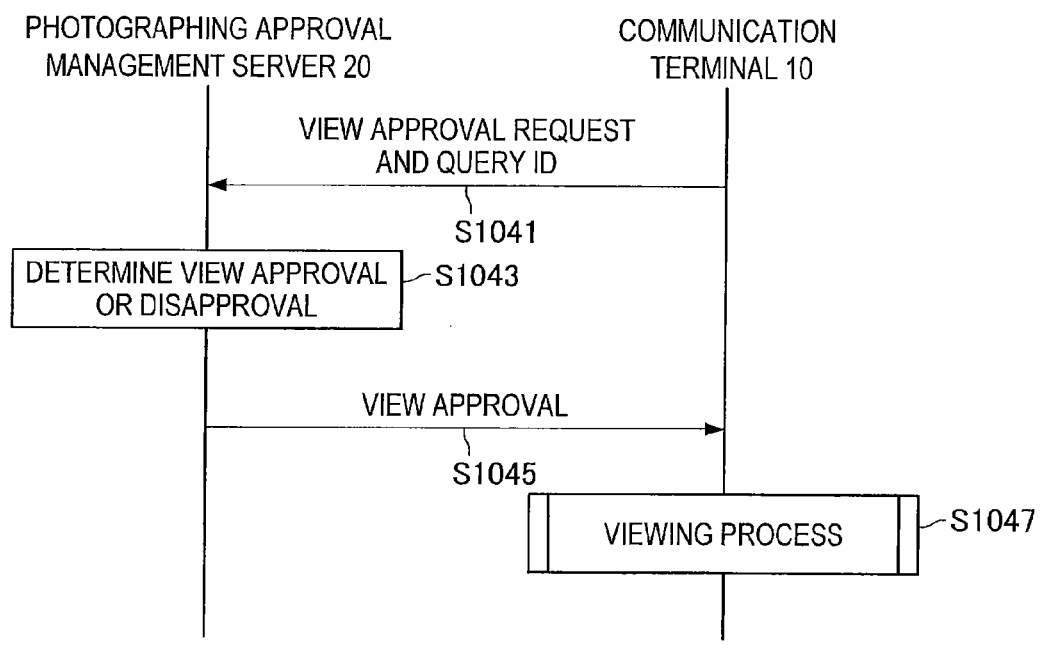
FIG. 45 is a diagram illustrating a sequence of processes at the time of viewing of an image according to the tenth embodiment.

Next, processes at the time of viewing according to the tenth embodiment will be described. FIG. 45 is a diagram illustrating a sequence of the processes at the time of the viewing according to the tenth embodiment.

As illustrated in FIG. 45, a user of the photographing terminal 30 first selects an image which the user desires to view from the photographic images stored in the storage unit 316 through the operation unit 320. Next, the storage unit 316 reads the query ID stored in association with the person image with regard to the person image included in the selected photographic image. Then, the communication unit 310 transmits the read query ID and a view approval query for the person image to the photographing approval management server 20 (S1041).

Subsequently, the query ID storage unit 212 of the photographing approval management server 20 reads the view approval condition stored in association with the query ID based on the query ID received from the photographing terminal 30. Next, the condition determination unit 208 determines whether the environment state stored in the position and environment state storage unit 202 satisfies the view approval condition read by the query ID storage unit 212. Then, the condition determination unit 208 determines view approval or disapproval of the person image according to the result of the above-described determination (S1043).

Subsequently, the communication unit 200 transmits the view approval or disapproval determined by the condition determination unit 208 to the photographing terminal 30 (S1045). Here, for example, the communication unit 200 may also transmit a protection processing condition (view condition) of the person image such as "substitution with icon A" to the photographing terminal 30.

The processes of S1041 to S1045 are repeated according to the number of query IDs stored in association with the photographic image in the storage unit 316. That is, the processes of S1041 to S1045 are repeated according to the number of person images included in the photographic image in principle.

Subsequently, the photographing terminal 30 performs a viewing process based on the view approval or disapproval of each person image received from the photographing approval management server 20 (S1047).

—First Processing Example of Viewing Process—

Figure 46:
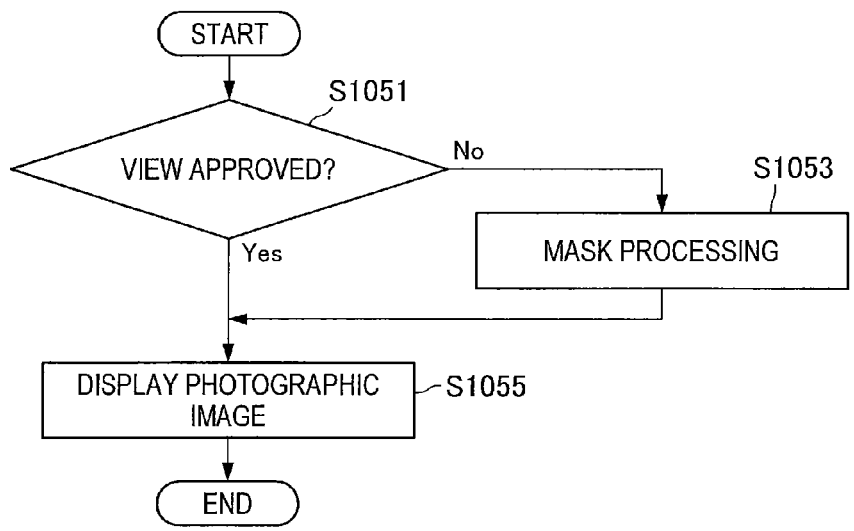
FIG. 46 is a flowchart illustrating the details of a first example of an image viewing process according to the tenth embodiment.

Here, the process of S1047 will be described in detail with reference to FIGS. 46 and 47. FIG. 46 is a flowchart illustrating a first processing example of the viewing process in S1047. In the first processing example, as will be described below, the photographing terminal 30 performs mask processing on a person image included in the photographic image and displays the processed person image, when the photographing terminal 30 determines that the person image may not be viewed.

In the first processing example, as illustrated in FIG. 46, the determination unit 312 first determines whether each person image can be viewed based on the view approval or disapproval of each person image received from the photographing approval management server 20 (S1051).

When the determination unit 312 determines that all of the person images included in the photographic image can be viewed (Yes in S1051), the display unit 318 reads the photographic images from the storage unit 316 and displays the read photographic images (S1055).

Conversely, when the determination unit 312 determines that at least one of the person images included in the photographic image may not be viewed (No in S1051), the mask unit 314 reads the photographic image from the storage unit 316 and performs the mask processing on the person image determined not to be viewable based on the protection processing condition of the person image (S1053). For example, when the condition "substitution with icon A" is set as the protection processing condition of the person image in one person image determined not to be viewable by the determination unit 312, the mask unit 314 performs image processing of "substitution with icon A" on the person image.

Subsequently, the display unit 318 displays the photographic image subjected to the mask processing by the mask unit 314 (S1055).

—Second Processing Example of Viewing Process—

Figure 47:
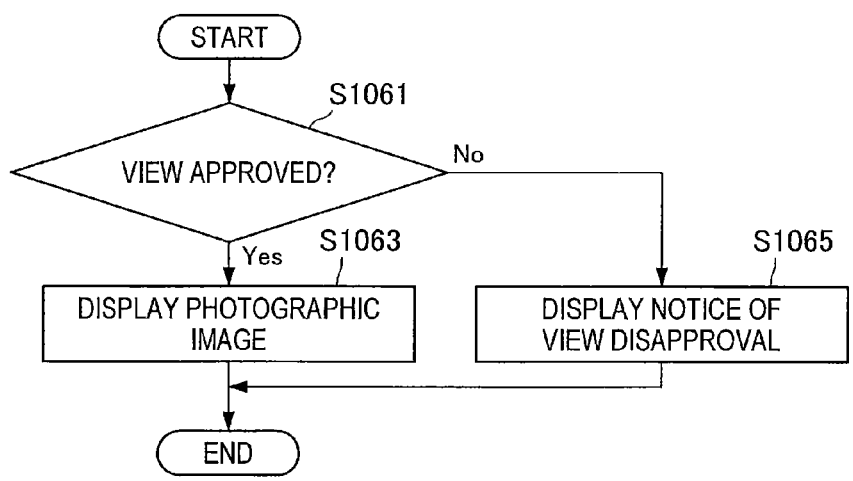
FIG. 47 is a flowchart illustrating the details of a second example of the image viewing process according to the tenth embodiment.

FIG. 47 is a flowchart illustrating a second processing example of the viewing process in S1047. In the second processing example, as will be described below, the photographing terminal 30 does not display the photographic image when it is determined that at least one of the person images included in the photographic image may not be viewed by the photographing terminal 30.

In the second processing example, as illustrated in FIG. 47, the determination unit 312 first determines whether each person image can be viewed based on the view approval or disapproval of each person image received from the photographing approval management server 20, as in S1051 (S1061).

When the determination unit 312 determines that all of the person images included in the photographic image can be viewed (Yes in S1061), the display unit 318 displays the photographic images, as in S1055 (S1063).

Conversely, when the determination unit 312 determines that at least one of the person images included in the photographic image may not be viewed (No in S1061), the display unit 318 displays the fact that the person image may not be viewed (S1065).

3-10-3. Advantages According to Tenth Embodiment

In the tenth embodiment of the present disclosure, as described above, the photographing approval management server 20 reads the view approval condition stored in association with the query ID based on the query ID received from the photographing terminal 30 and determines the view approval or disapproval of the person image corresponding to the query ID based on the read view approval condition. Then, the photographing approval management server 20 transmits the result of the determination to the photographing terminal 30. Therefore, the possessor of the communication terminal 10 can allow the photographing terminal 30 to perform the process of protecting the own image included in the photographic image when the photographic image after the photographing is viewed by the photographing terminal 30.

For example, the possessor of the communication terminal 10 can restrict a period in which another person can view his or her image, before or after the photographing by the photographing terminal 30. The possessor of the communication terminal 10 can prohibit viewing of the photographic image by the photographing terminal 30 or the like by changing the view approval condition when the possessor does not want another person to view his or her own image after the photographing.

The possessor of the communication terminal 10 can control the photographing terminal 30 such that the own image is displayed in an unidentifiable form, for example, by designating a mask processing method such as mosaic processing as the protection processing condition.

3-11. Eleventh Embodiment

The tenth embodiment has been described above. Next, an eleventh embodiment will be described. In the eleventh embodiment, as described above, the possessor of the communication terminal 10 can request the photographing terminal 30 to delete his or her photographic image photographed by the photographing terminal 30. For example, the possessor of the communication terminal 10 can request the photographing terminal 30 to delete the photographed photographic image when an acquaintance with whom the possessor does not want to be photographed is photographed together with the possessor.

3-11-1. Basic Configuration of Image Processing System According to Eleventh Embodiment The basic configuration of an image processing system according to the eleventh embodiment is the same as that of the ninth embodiment. Accordingly, the description thereof will be omitted here.

3-11-2. Configuration of Eleventh Embodiment

3-11-2-1. Photographing Approval Management Server 20

The position and environment state storage unit 202 according to the eleventh embodiment may store, for example, various kinds of detailed information such as an account of an acquaintance who is also present (with the possessor of the communication terminal 10) as one of the environment states in addition to the account and the position information received from the communication terminal 10 in association therewith. Here, the account and the account of the acquaintance who is also present may be accounts set to use a predetermined SNS.

FIG. 48 is a diagram illustrating an example of the configuration of the position and environment state storage unit 202 according to the eleventh embodiment. As illustrated in FIG. 48, the position and environment state storage unit 202 may store an account column 2020, a position information column 2022, an environment state (movement state) column 2024, and an environment state (an account of an acquaintance who is also present) column 2026 in association therewith. For example, data shown in the third row of FIG. 48 indicates that "(a, b)" is received as the position information from the communication terminal 10 used by the possessor of which an account is "Hanako," "stopped" is received as the movement state, and "Ai" is received as the account of an acquaintance who is also present.

The query ID storage unit 212 according to the eleventh embodiment may store, for example, various kinds of detailed information such as a photographing time, a movement state, an account of the acquaintance who is also present, a device ID of the photographing terminal 30, a photographing distance, and an image size of a person image in addition to the query ID determined by the condition determination unit 208, and the account of the photographic subject, and the position information at the time of the photographing of the photographic subject in association therewith.

FIG. 49 is a diagram illustrating an example of the configuration of the query ID storage unit 212 according to the eleventh embodiment. As illustrated in FIG. 49, the query ID storage unit 212 may store, for example, a query ID column 2130, an account column 2131, a time column 2132, a position information column 2133, an environment state (movement state) column 2134, an environment state (an account of an acquaintance who is also present) column 2135, a photographing device ID column 2136, a distance column 2137, and an image size column 2138 in association therewith. A query ID determined for a person image is registered in the query ID column 2130. An account of a photographic subject corresponding to the person image corresponding to each value of the query ID column 2130 is registered in the account column 2131. A time at which the person image (a photographic image including the person image) is photographed is registered in the time column 2132. Position information of the photographic subject corresponding to the person image at the time of the photographing is registered in the position information column 2133. A movement state of the photographic subject at the time of the photographing is registered in the environment state (movement state) column 2134. An account of an acquaintance who is also present with the photographic subject of the photographic image at the time of the photographing is registered in the environment state (an account of an acquaintance who is also present) column 2135. A device ID of the photographing terminal 30 photographing the photographic image is registered in the photographing device ID column 2136. A photographing distance from the photographing terminal 30 to the photographic subject at the time of the photographing of the photographic image is registered in the distance column 2137. An image size of the person image is registered in the image size column 2138.

Data shown in the third row of FIG. 49 indicates that with regard to a person image with a query ID "6580," "Hanako" is registered as the account of the photographic subject corresponding to the person image, "2012/12/31" is registered as the photographing time, "(a, b)" is registered as the position information of the photographic subject at the time of the photographing, "stopped" is registered as the movement state of the photographic subject at the time of the photographing, "Ai" is registered as the account of the acquaintance together with the photographic subject at the time of the photographing, "E3867" is registered as the device ID of the photographing terminal 30, "1.5 m" is registered as the photographing distance from the photographing terminal 30 to the photographic subject at the time of the photographing, and "160×300 pixels" is registered as the image size of the person image.

The functions of the remaining constituent elements of the photographing approval management server 20 are the same as those of the first embodiment.

The configurations of the communication terminal 10 and the photographing terminal 30 according to the eleventh embodiment are the same as those of the first embodiment. Accordingly, the description thereof will be omitted here.

3-11-3. Processes According to Eleventh Embodiment

3-11-3-1. Processes Before Photographing

Figure 50:
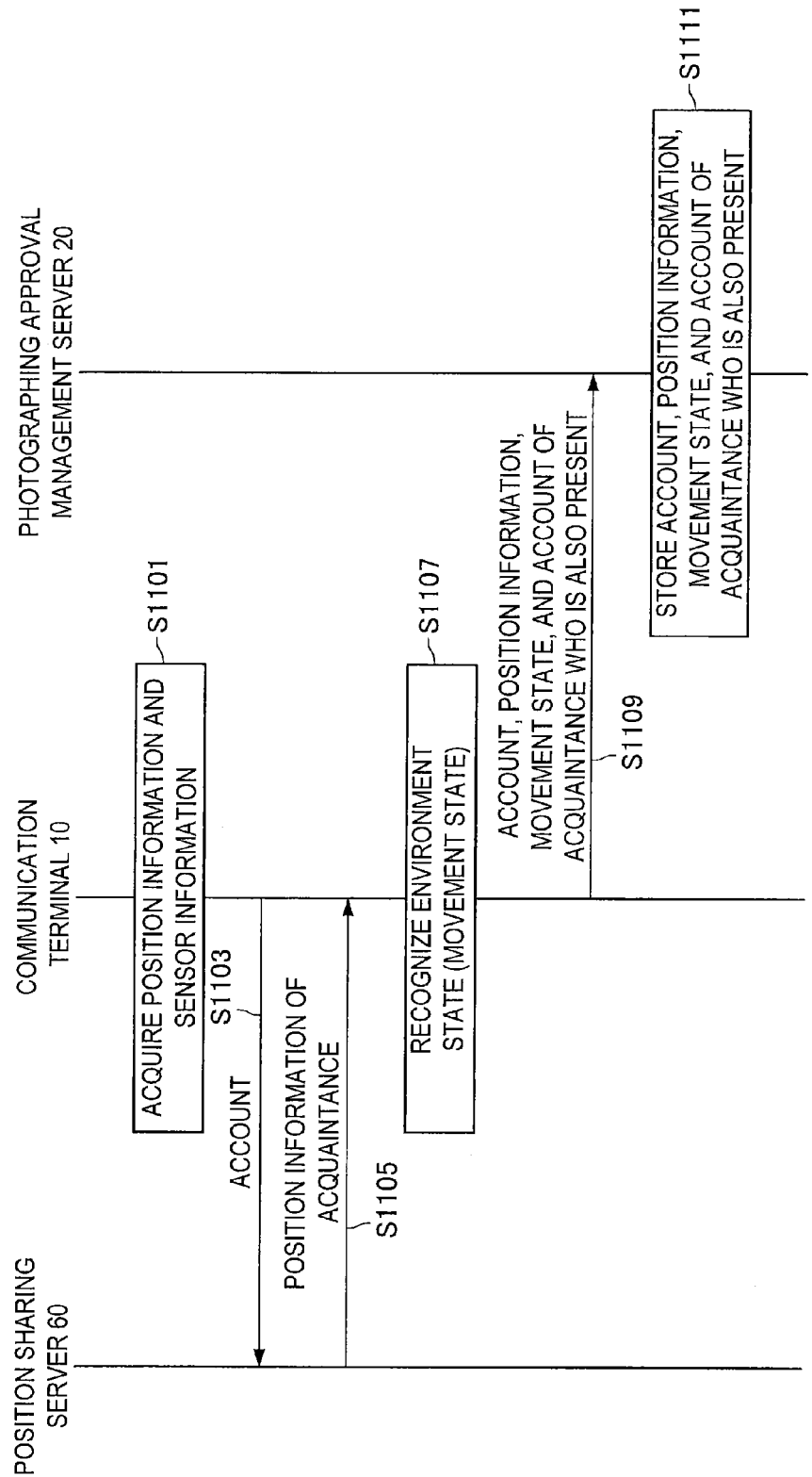
FIG. 50 is a diagram illustrating a sequence of processes before photographing according to the eleventh embodiment.

Next, processes according to the eleventh embodiment will be described. First, processes before photographing according to the eleventh embodiment will be described. FIG. 50 is a diagram illustrating a sequence of some of the processes before the photographing according to the eleventh embodiment. Since the processes of S101 to S105 according to the first embodiment are substantially the same in the eleventh embodiment, the description thereof is omitted in FIG. 50.

Next, processes subsequent to S105 will be described. After S105, the position information acquisition unit 100 of the communication terminal 10 acquires the position information of the communication terminal 10, as in S107. The sensor information acquisition unit 102 acquires various kinds of sensor information such as an acceleration of the communication terminal 10, an angle of the communication terminal 10, an atmospheric pressure, and geomagnetism, as in S107 (S1101).

Subsequently, the communication unit 110 transmits the account of the possessor of the communication terminal 10 to the position sharing server 60 and queries the position information of the acquaintance through an operation of the possessor of the communication terminal 10 (S1103).

Subsequently, the position sharing server 60 extracts acquaintance accounts corresponding to the account received from the communication terminal 10 and position information corresponding to each acquaintance account. Then, the position sharing server 60 transmits a combination of the acquaintance accounts and the position information to the communication terminal 10 (S1105).

Subsequently, the environment state recognition unit 104 determines a movement state of the possessor of the communication terminal 10 based on the acquired position information and the acquired sensor information. The environment state recognition unit 104 extracts the account of an acquaintance present within a joint photographic range from the acquaintance accounts received from the position sharing server 60 (S1107). Then, the communication unit 110 transmits the account set in S101, the position information acquired in S1101, the environment state (movement state) determined in S1107, and the environment state (the account of the acquaintance who is also present) extracted in S1107 to the photographing approval management server 20 (S1109).

Subsequently, the position and environment state storage unit 202 of the photographing approval management server 20 stores the received account, the received position information, the received environment state (movement state), and the received environment state (the account of the acquaintance who is also present) in association therewith (S1111).

Thereafter, the processes of S1101 to S1111 are repeated at predetermined time intervals. As a modification example, the processes of S1101 to S1111 may not be repeated at the predetermined time intervals, or instead may be repeated whenever the sensor information acquisition unit 102 detects movement of the communication terminal 10.

3-11-3-2. Processes at Time of Photographing

Figure 51:
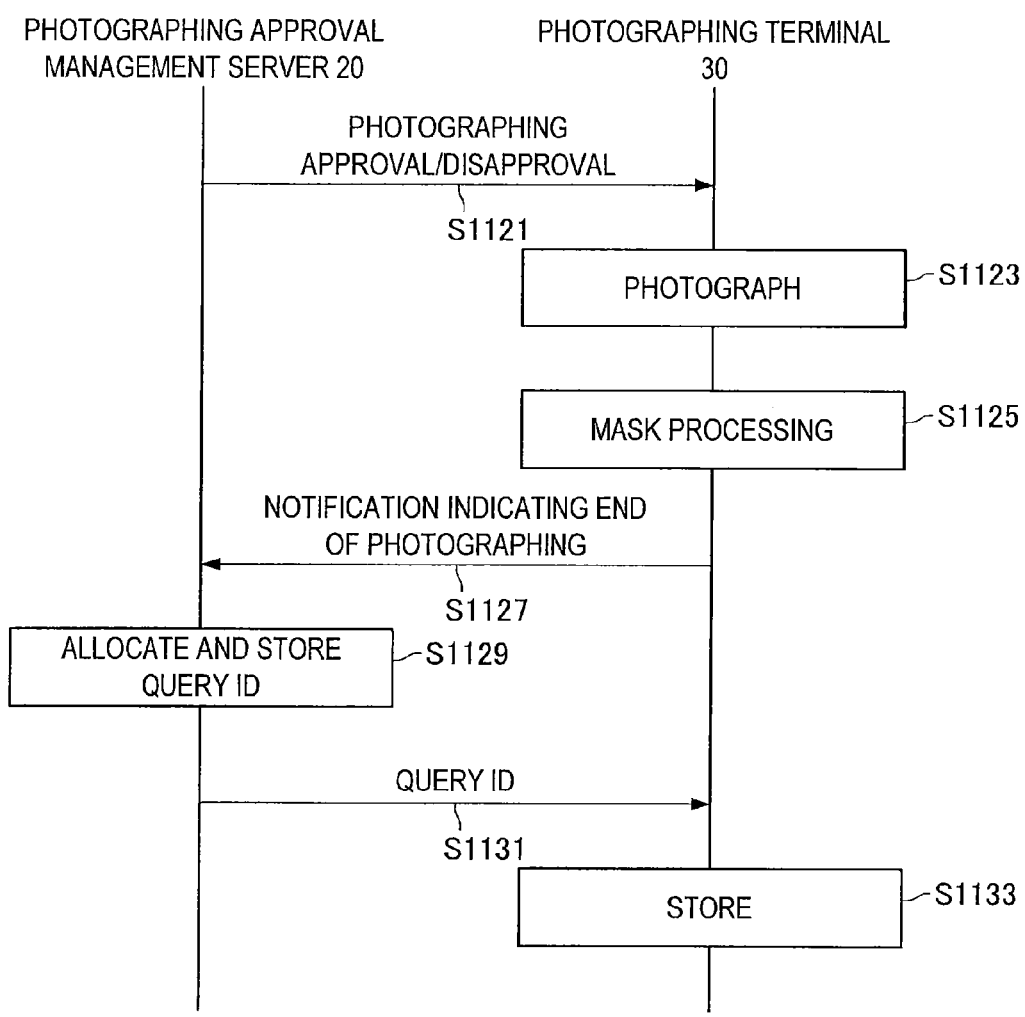
FIG. 51 is a diagram illustrating a sequence of processes at the time of photographing according to the eleventh embodiment.

Next, processes at the time of the photographing according to the eleventh embodiment will be described. FIG. 51 is a diagram illustrating a sequence of some of the processes at the time of the photographing according to the eleventh embodiment. Since the processes of S121 to S133 according to the first embodiment are substantially same in the eleventh embodiment, the description thereof is omitted in FIG. 51.

Next, processes subsequent to S133 will be described. After S133, the communication unit 200 of the photographing approval management server 20 transmits information prescribing whether to perform the process of protecting the person image corresponding to the account to the photographing terminal 30 with regard to the account for which the comparison unit 204 determines that the position information is identical or the difference is less than the predetermined threshold value, as in S135 (S1121).

Subsequently, the imaging unit 300 of the photographing terminal 30 photographs the photographic image (S1123).

Subsequently, the determination unit 312 determines whether the photographic subject corresponding to each person image can be photographed based on the information received from the photographing approval management server 20 and indicating whether to perform the process of protecting each person image. Next, based on the result of the determination performed by the determination unit 312, the mask unit 314 performs the mask processing on each person image included in the photographic image photographed by the imaging unit 300 (S1125). As a modification example, the process of S1125 may not be performed.

Subsequently, the communication unit 310 transmits notification indicating the end of the photographing to the photographing approval management server 20 (S1127).

Subsequently, with regard to each person image included in the photographic image, the condition determination unit 208 first determines the query ID of the person image to distinguish the person image from other person images with reference to the query IDs recorded in the query ID storage unit 212. Next, the query ID storage unit 212 stores the query ID determined by the condition determination unit 208, the account of the photographic subject corresponding to the person image, and the protection processing condition of the person image in association therewith (S1129).

Subsequently, the communication unit 200 transmits the query ID determined by the condition determination unit 208 to the photographing terminal 30 (S1131).

Subsequently, the storage unit 316 of the photographing terminal 30 stores the photographic image photographed by the imaging unit 300, the query ID received from the photographing approval management server 20, and the pixel region of the person image corresponding to the query ID in association therewith (S1133).

3-11-3-3. Processes at Time of Deletion of Photographic Image

Figure 52:
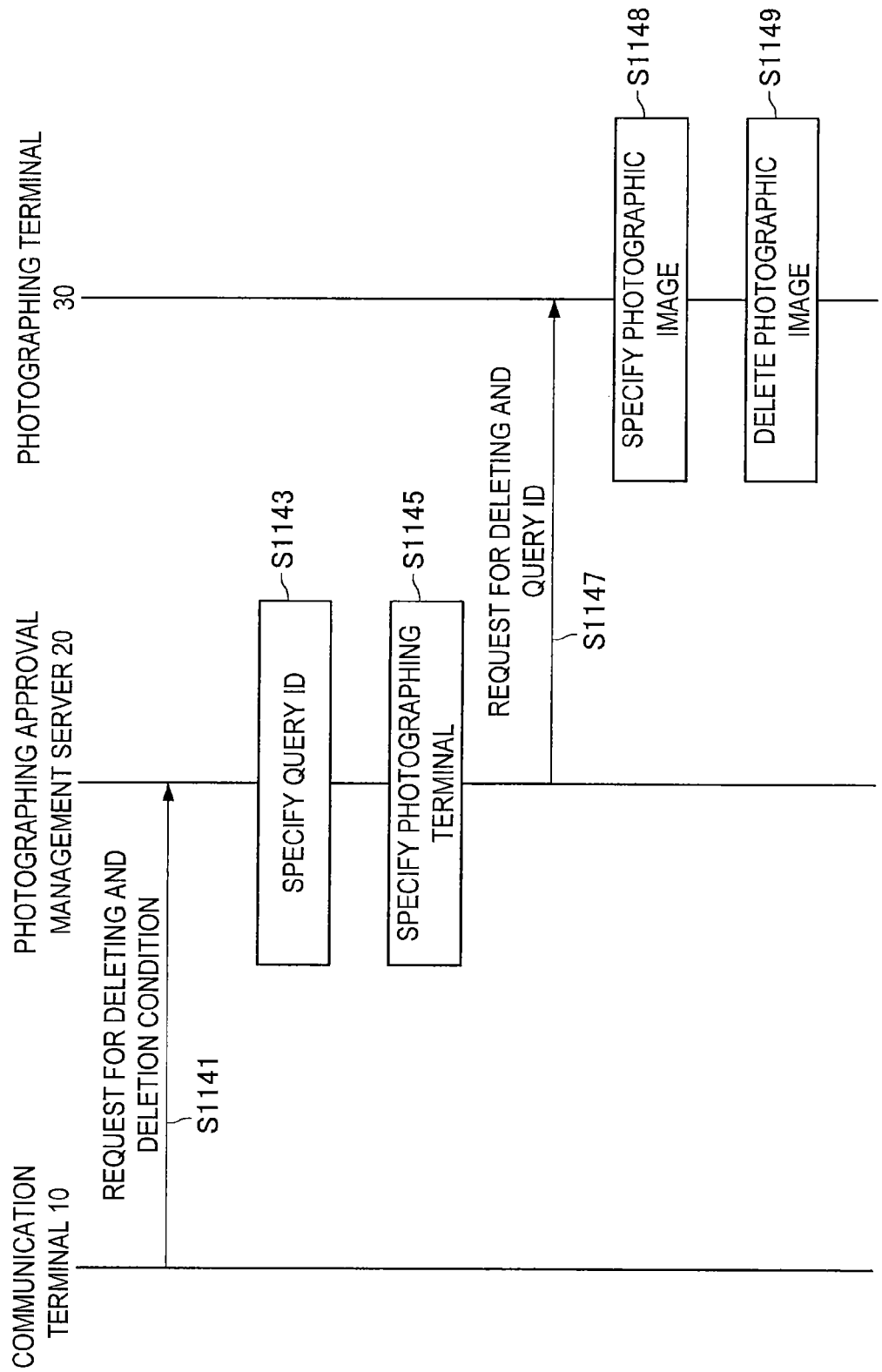
FIG. 52 is a diagram illustrating a sequence of processes at the time of deletion of an image according to the eleventh embodiment.

Next, processes at the time of deletion of a photographic image according to the eleventh embodiment will be described. FIG. 52 is a diagram illustrating a sequence at the time of deletion of a photographic image according to the eleventh embodiment.

As illustrated in FIG. 52, the possessor of the communication terminal 10 first sets a deletion condition on the condition setting unit 108 through the operation unit 106 when the possessor desires to delete a photographic image in which the possessor himself or herself is photographed. Next, the communication unit 110 transmits the set deletion condition and a request for deleting a photographic image to the photographing approval management server 20 (S1141).

Subsequently, the query ID storage unit 212 of the photographing approval management server 20 determines whether there is a photographic image corresponding to the deletion condition received from the communication terminal 10. The query ID storage unit 212 acquires all of the query IDs corresponding to the corresponding photographic images (S1143). For example, in the example illustrated in FIG. 49, when the condition "photographing time is 2012/12/31" is received as the deletion condition from the communication terminal 10, the query ID storage unit 212 extracts all of the data columns in which "2012/12/31" is registered in the time column 2132 and acquires values of the query ID column 2130 in the extracted data columns.

Subsequently, the query ID storage unit 212 specifies the photographing terminal 30 corresponding to all of the acquired query IDs (S1145). More specifically, the query ID storage unit 212 specifies the device ID of the photographing terminal 30 stored in association with the query ID.

Subsequently, the communication unit 200 transmits the query ID corresponding to each photographing terminal 30 and the request for deleting the person image (the photographic image including the person image) to which the query ID is allocated to all of the photographing terminals 30 specified in S1145 (S1147).

Subsequently, the storage unit 316 of the photographing terminal 30 specifies the photographic image corresponding to the query ID received from the photographing approval management server 20 (S1148). Then, the storage unit 316 deletes the specified photographic image from the storage unit 316 (S1149).

3-11-4. Advantages According to Eleventh Embodiment

In the eleventh embodiment, as described above, the photographing approval management server 20 specifies the query ID corresponding to the deletion condition received from the communication terminal 10 among the query IDs stored in the photographing approval management server 20 and transmits the query ID and the request for deleting the photographic image corresponding to the query ID to the photographing terminal 30 corresponding to the specified query ID. When the photographing terminal 30 receives the query ID and the deletion request from the photographing approval management server 20, the photographing terminal 30 deletes the photographic image corresponding to the query ID. Therefore, the possessor of the communication terminal 10 can cause the photographing terminal 30 to delete his or her photographic image photographed by the photographing terminal 30.

The photographing approval management server 20 according to the eleventh embodiment stores the query ID and, for example, various kinds of detailed information such as the photographing time, the position information, the movement state, the account of the acquaintance who is also present, the device ID of the photographing terminal 30, the photographing distance, and the image size of the person image in association therewith. Therefore, the possessor of the communication terminal 10 can set deletion conditions in detail. For example, when the possessor is photographed together with an acquaintance with whom the possessor does not want to be photographed at a specific time, the possessor of the communication terminal 10 can request the photographing terminal 30 to delete only the photographic image corresponding to the deletion conditions by setting the photographing time and the account of the acquaintance who is also present as the deletion conditions.

4. Summarization

In the first to eleventh embodiments of the present disclosure, as described above, the photographing approval management server 20 compares the position information of the communication terminal 10 received from the communication terminal 10 with the position information of the photographic subject received from the photographing terminal 30 and corresponding to the person image included in the photographic image, and then transmits the information prescribing whether to perform the process of protecting the person image according to the result of the comparison to the photographing terminal 30. Therefore, the photographic subject can reflect a request for privacy protection in a photographic image.

5. Modification Examples

The preferred embodiments of the present disclosure have been described in detail with reference to the appended drawings, but embodiments of the present disclosure are not limited to these examples. It should be apparent to those skilled in the art of the technical field of the present disclosure that various modifications or corrections can be made within the scope of the technical sprit and essence described in the claims and these modifications and corrections are, of course, construed to pertain to the technical range of the present disclosure.

Hereinafter, "5-1. First modification example" and "5-2. Second modification example" will be described as examples of modifications of the present disclosure.

5-1. First Modification Example

Figure 53:
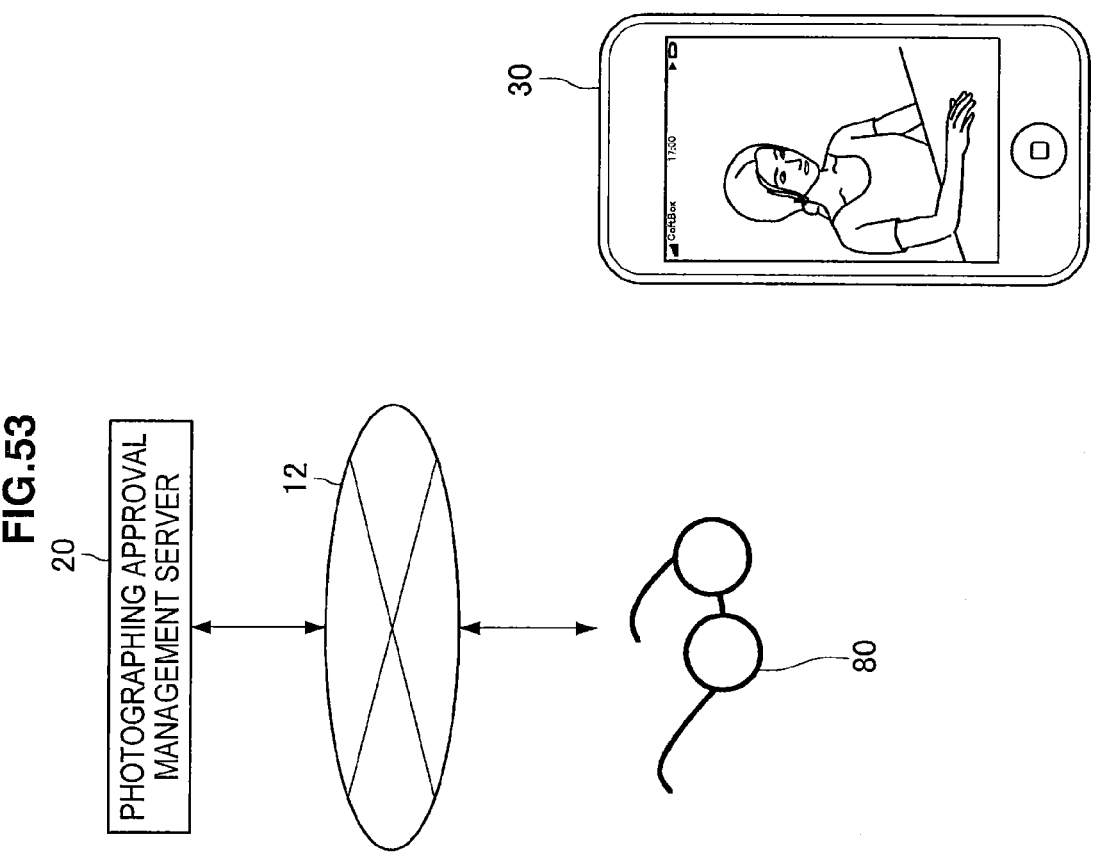
FIG. 53 is a diagram illustrating the configuration of an image processing system according to a first modification example of the present disclosure.

5-1-1. Basic Configuration of Image Processing System According to First Modification Example FIG. 53 is a diagram illustrating a basic configuration of an image processing system according to a first modification example. As illustrated in FIG. 53, the image processing system according to the first modification example includes a communication terminal 80, a photographing terminal 30, a communication network 12, and a photographing approval management server 20.

(Communication Terminal 80)

The communication terminal 80 is a communication terminal held by a photographic subject. The communication terminal 80 has a positioning function, a visible-light communication function, a wireless communication function, a screen display function, a photographing function, a watch function, and the like and includes an acceleration sensor, a gyroscope, a pressure sensor, and a geomagnetic sensor. The positioning function may be the same as the positioning function of the communication terminal 10. As a visible-light transmission device, for example, a light emitting diode (LED), an electro-luminescence (EL), or a laser may be used. As a visible-light reception device, for example, a photo diode or an image sensor may be used.

FIG. 53 illustrates a glasses-type computer as the communication terminal 80, but an embodiment of the present disclosure is not limited to this example. For example, the communication terminal 80 may be a mobile phone such as a smartphone, a tablet terminal, a PDA, a laptop PC, a digital still camera, a digital video camera, a game device, or the like.

(Photographing Terminal 30)

The photographing terminal 30 according to the first modification example is substantially the same as the photographing terminal 30 according to the first to eleventh embodiments. However, the photographing terminal 30 according to the first modification example differs from the first to eleventh embodiments in that the photographing terminal 30 inevitably has the visible-light communication function. As a visible-light transmission device, for example, an LED, an EL, or a laser may be used. As a visible-light reception device, for example, a photo diode or an image sensor may be used.

The communication network 12 and the photographing approval management server 20 are substantially the same as those of the first to eleventh embodiments. Accordingly, the description thereof will be omitted here.

5-1-3. Overview of First Modification Example

The basic configuration of the image processing system according to the first modification example has been described above. Next, an overview of the above-described image processing system according to the first modification example will be described.

Figure 54:
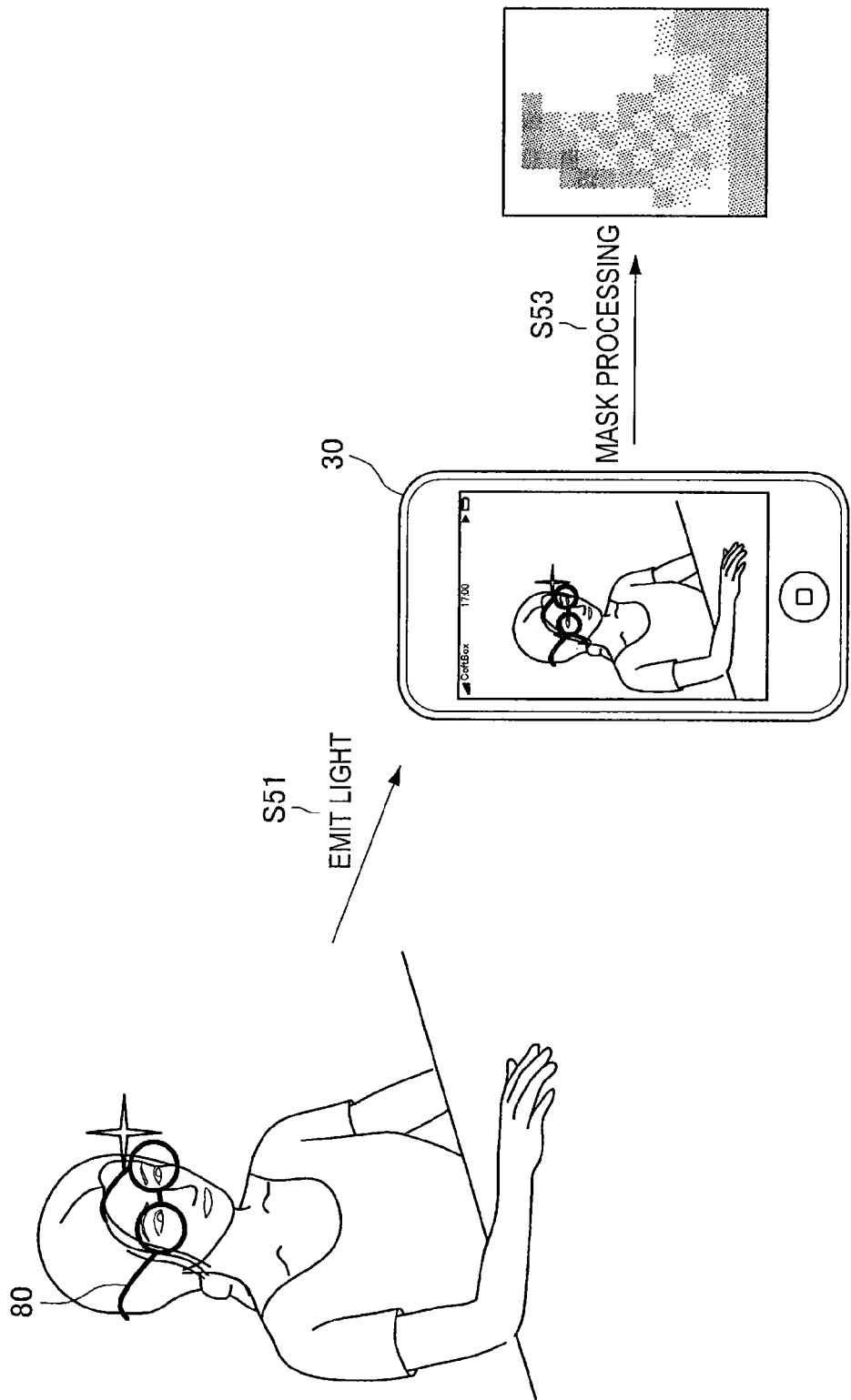
FIG. 54 is a diagram illustrating an overall process according to the first modification example.

FIG. 54 is a diagram illustrating an overall process according to the first modification example. As illustrated in FIG. 54, the communication terminal 80 first emits light peripherally based on a protection processing condition set by the possessor of the communication terminal 80 (S51). For example, when the condition matches a photographing disapproval condition set by the possessor of the communication terminal 80, the communication terminal 80 emits light in a blinking pattern indicating "photographing disapproval" set in advance.

Subsequently, the photographing terminal 30 receives the visible light emitted from the communication terminal 80 and deciphers information included in the visible light. Then, the photographing terminal 30 performs, for example, a protection process such as mask processing on a person image included in a photographic image based on the information deciphered from the visible light (S53).

In the first modification example, the above-described processes are realized, and thus the possessor of the communication terminal 80 can reflect a request for privacy protection in the photographic image by setting a protection processing condition according to the intention of the photographic subject.

5-1-3. Configuration According to First Modification Example 5-1-3-1. Communication Terminal 80

Figure 55:
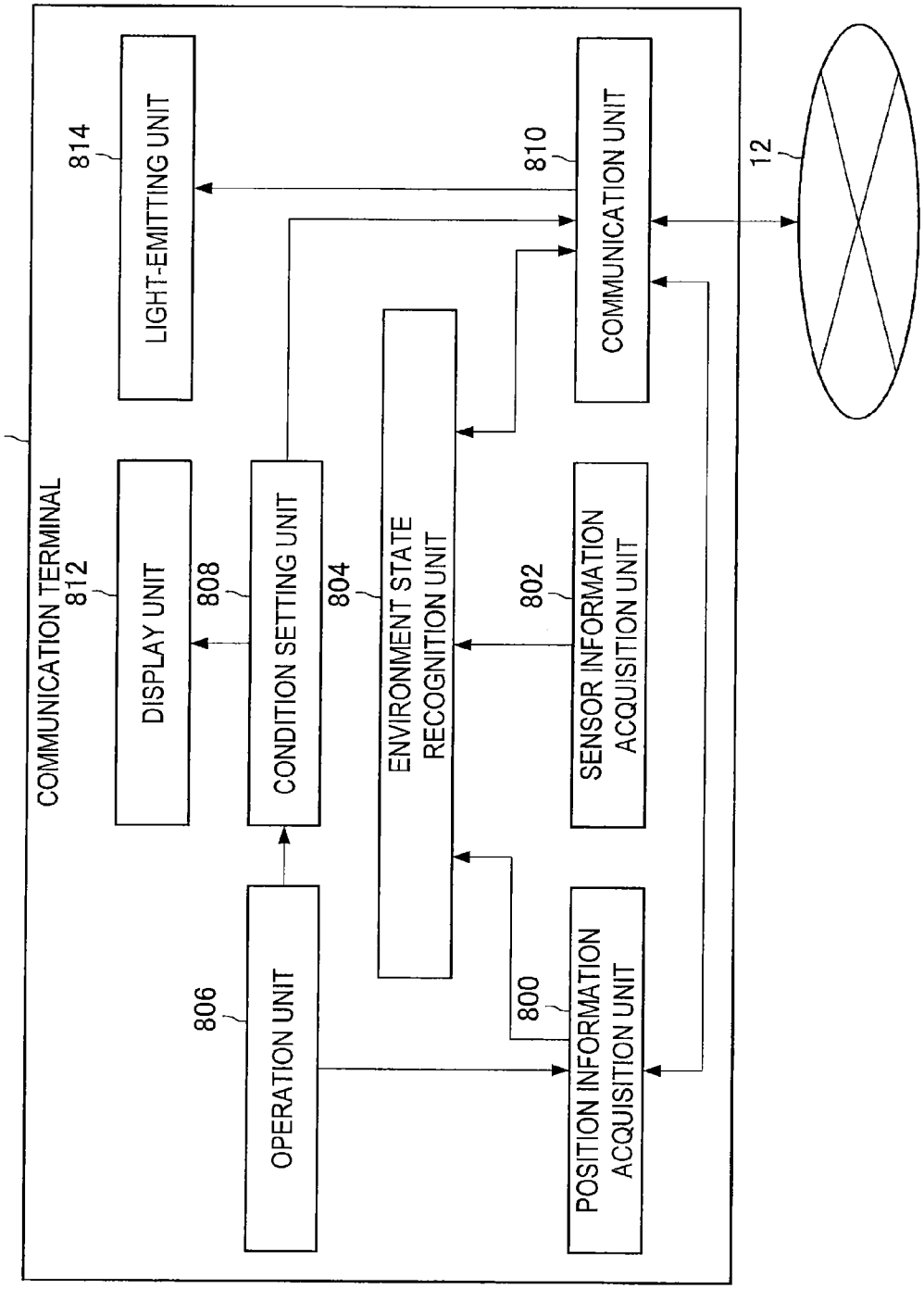
FIG. 55 is a functional block diagram illustrating the configuration of a communication terminal according to the first modification example.

Next, a configuration according to the first modification example will be described. FIG. 55 is a functional block diagram illustrating the configuration of the communication terminal 80 according to the first modification example. As illustrated in FIG. 55, the communication terminal 80 according to the first modification example includes a position information acquisition unit 800, a sensor information acquisition unit 802, an environment state recognition unit 804, an operation unit 806, a condition setting unit 808, a communication unit 810, a display unit 812, and a light-emitting unit 814.

The light-emitting unit 814 emits light based on information prescribing whether to perform a process of protecting a person image received from the photographing approval management server 20. For example, the light-emitting unit 814 may emit light by changing the blinking pattern according to the content of the information prescribing whether to perform the process of protecting the person image.

The functions of the position information acquisition unit 800, the sensor information acquisition unit 802, the environment state recognition unit 804, the operation unit 806, the condition setting unit 808, the communication unit 810, and the display unit 812 are the same as those of the position information acquisition unit 100, the sensor information acquisition unit 102, the environment state recognition unit 104, the operation unit 106, the condition setting unit 108, the communication unit 110, and the display unit 112 of the communication terminal 10 according to the first embodiment.

5-1-3-2. Photographing Approval Management Server 20

The configuration of the photographing approval management server 20 according to the first modification example is the same as that of the first embodiment. Accordingly, the description thereof will be omitted here.

5-1-3-3. Photographing Terminal 30

Figure 56:
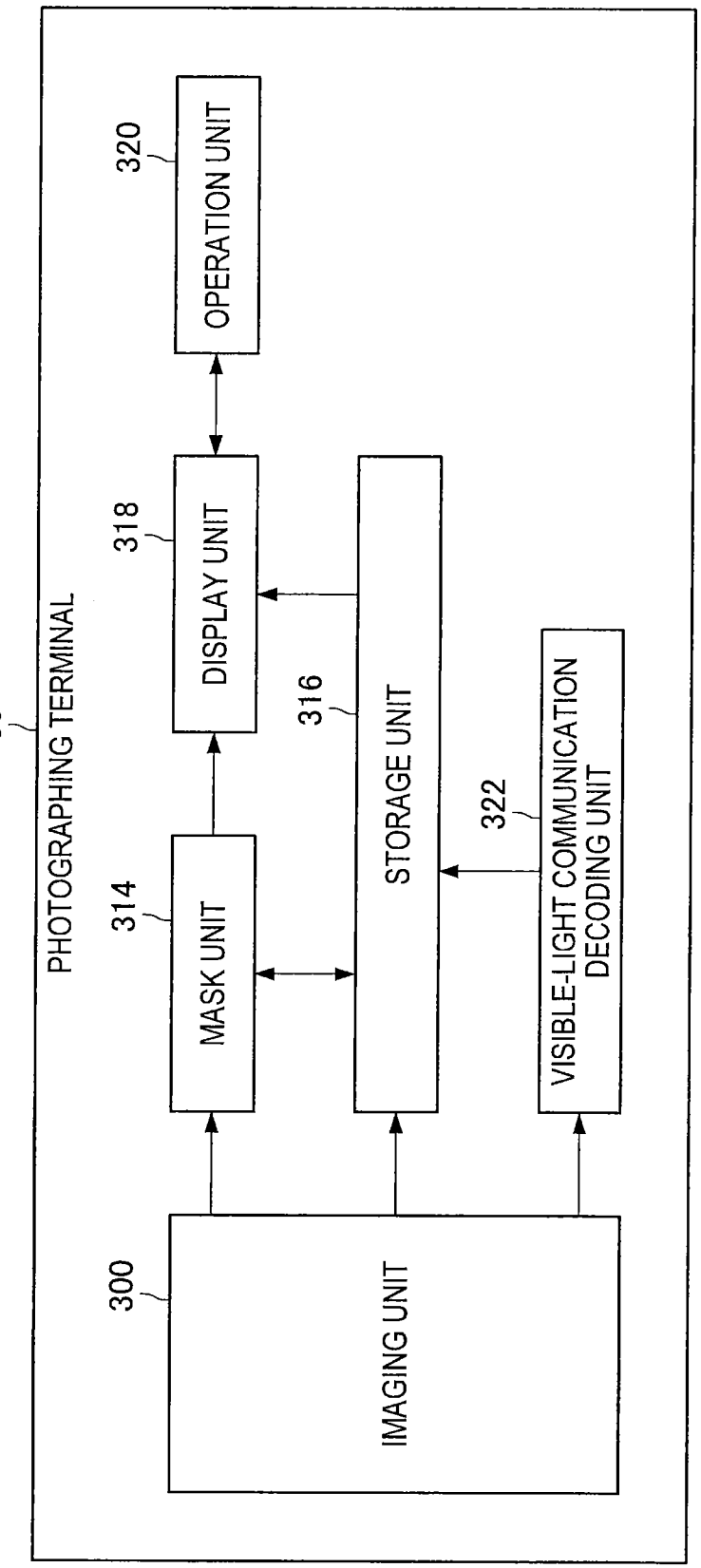
FIG. 56 is a functional block diagram illustrating the configuration of a photographing terminal according to the first modification example.

FIG. 56 is a functional block diagram illustrating the configuration of the photographing terminal 30 according to the first modification example. As illustrated in FIG. 55, the photographing terminal 30 according to the first modification example does not include the position information acquisition unit 302, the photographic subject position acquisition unit 304, the azimuth acquisition unit 306, the photographic subject distance acquisition unit 308, the communication unit 310, and the determination unit 312, and newly includes a visible-light communication decoding unit 322 instead.

The visible-light communication decoding unit 322 deciphers information included in visible light from the visible light received by the imaging unit 300. For example, the visible-light communication decoding unit 322 may decipher the information included in the visible light based on the blinking pattern of the visible light received by the imaging unit 300.

The functions of the remaining constituent elements are the same as those of the first embodiment.

5-1-4. Processes of First Modification Example

Figure 57:
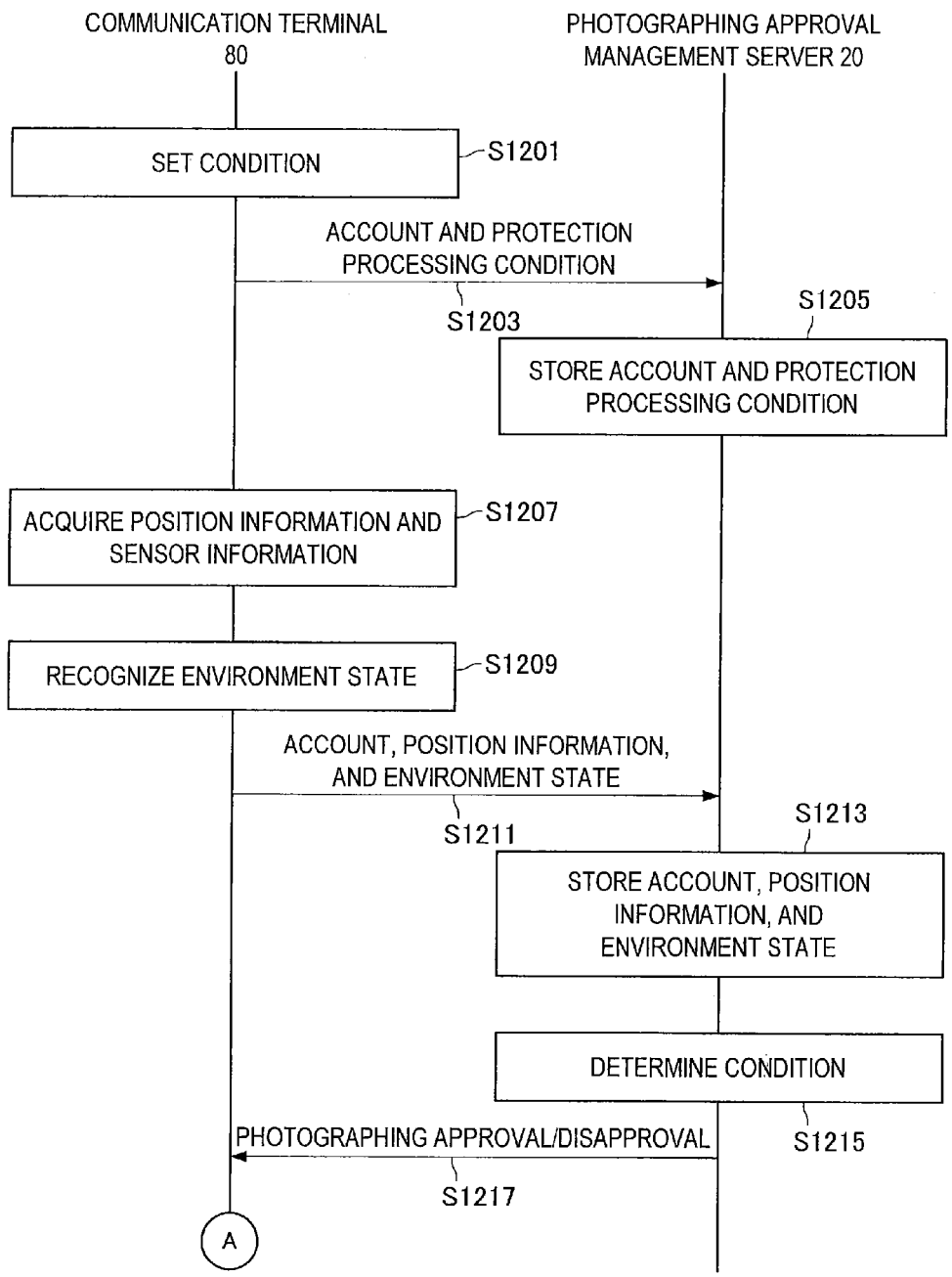
FIG. 57 is a diagram illustrating a sequence of processes before photographing according to the first modification example.

The configuration according to the first modification example has been described above. Next, processes according to the first modification example will be described. FIG. 57 is a diagram illustrating a first sequence of the processes according to the first modification example.

As illustrated in FIG. 57, processes of S1201 to S1213 are substantially the same as the processes of S101 to S113 according to the first embodiment, although there is a difference between the communication terminals 80 and 10.

Next, processes subsequent to S1213 will be described. After S1213, the condition determination unit 208 of the photographing approval management server 20 determines whether the environment state stored in the position and environment state storage unit 202 satisfies the protection processing condition stored in the photographing approval condition storage unit 206. The condition determination unit 208 determines whether the process of protecting the person image included in the photographic image is performed according to the result of the above-described determination (S1215). More specifically, the condition determination unit 208 determines photographing approval or disapproval of the possessor of the communication terminal 80 according to the result of the above-described determination.

Subsequently, the communication unit 200 transmits information prescribing whether to perform the process of protecting the person image to the communication terminal 80 (S1217).

Figure 58:
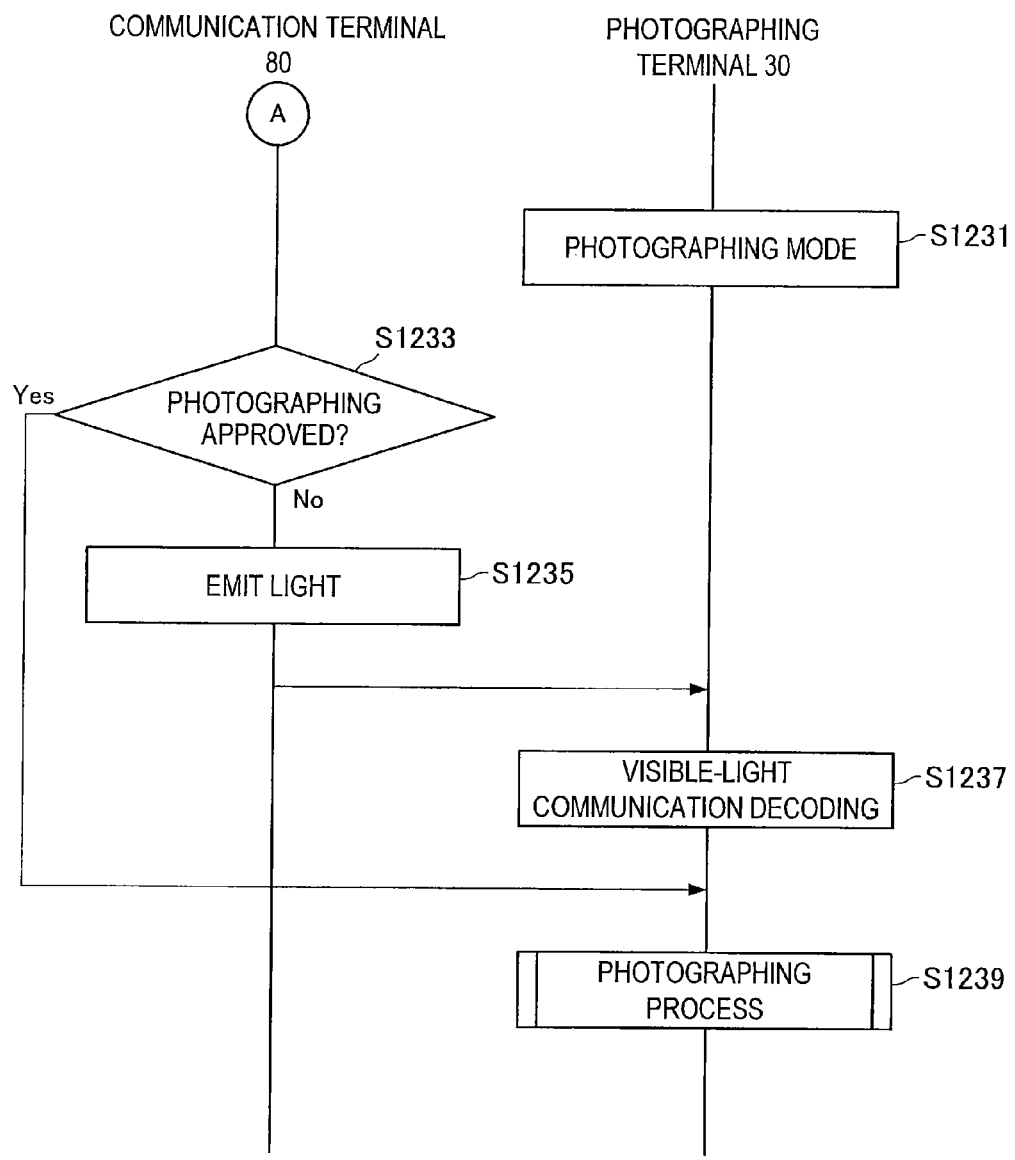
FIG. 58 is a diagram illustrating a sequence of processes at the time of photographing according to the first modification example.

Here, processes subsequent to S1217 will be described with reference to FIG. 58. FIG. 58 is a diagram illustrating a sequence of the processes subsequent to S1217 according to the first modification example.

Subsequently, a photographing mode is activated through a photographer's operation on the operation unit 320 of the photographing terminal 30, as in S123 (S1231).

After the process of S1217, the light-emitting unit 814 of the communication terminal 80 emits light based on the information received from the photographing approval management server 20 and indicating whether to perform the process of protecting the person image (S1233 to S1235). For example, when the information prescribing to perform the process of protecting the person image is received (No in S1233), the light-emitting unit 814 emits light (S1235).

After S1235, the imaging unit 300 of the photographing terminal 30 receives the visible light emitted by the communication terminal 80. The visible-light communication decoding unit 322 deciphers the information included in the visible light received by the imaging unit 300 (S1237).

After S1237 or when the visible light is not emitted from the communication terminal 80 (Yes in S1233), the photographing terminal 30 performs a photographing process, as in S139 (S1239). Conversely, when the visible light is emitted from the communication terminal 80, the photographing terminal 30 performs the photographing process based on the information deciphered in S1237.

5-1-5. Advantages According to First Modification Example

In the first modification example, as described above, the photographing terminal 30 receives the visible light emitted by the communication terminal 80, deciphers the information included in the visible light, and performs, for example, the protection process such as mask processing on the person image included in the photographic image based on the deciphered information. Therefore, the possessor of the communication terminal 80 can reflect the request of privacy protection in the photographic image.

The communication terminal 80 transmits a request for the protection process to the photographing terminal 30 through visible-light communication. Therefore, for example, even in an environment in which radio waves rarely arrive such as underground or in a situation in which the communication network 12 is congested, the possessor of the communication terminal 80 can transmit the request for the protection process without trouble.

5-2. Second Modification Example

The first modification example of the present disclosure has been described above. In the first modification example, as described above, the photographing approval management server 20 determines whether the environment state of the communication terminal 80 satisfies the protection processing condition. In a second modification example, as will be described below, whether the environment state of the communication terminal 80 satisfies the protection processing condition is determined by the communication terminal 80.

5-2-1. Basic Configuration of Image Processing System According to Second Modification Example An image processing system according to the second modification example differs from that of the first modification example in that the photographing approval management server 20 is not included.

5-2-2. Configuration According to Second Modification Example

Figure 59:
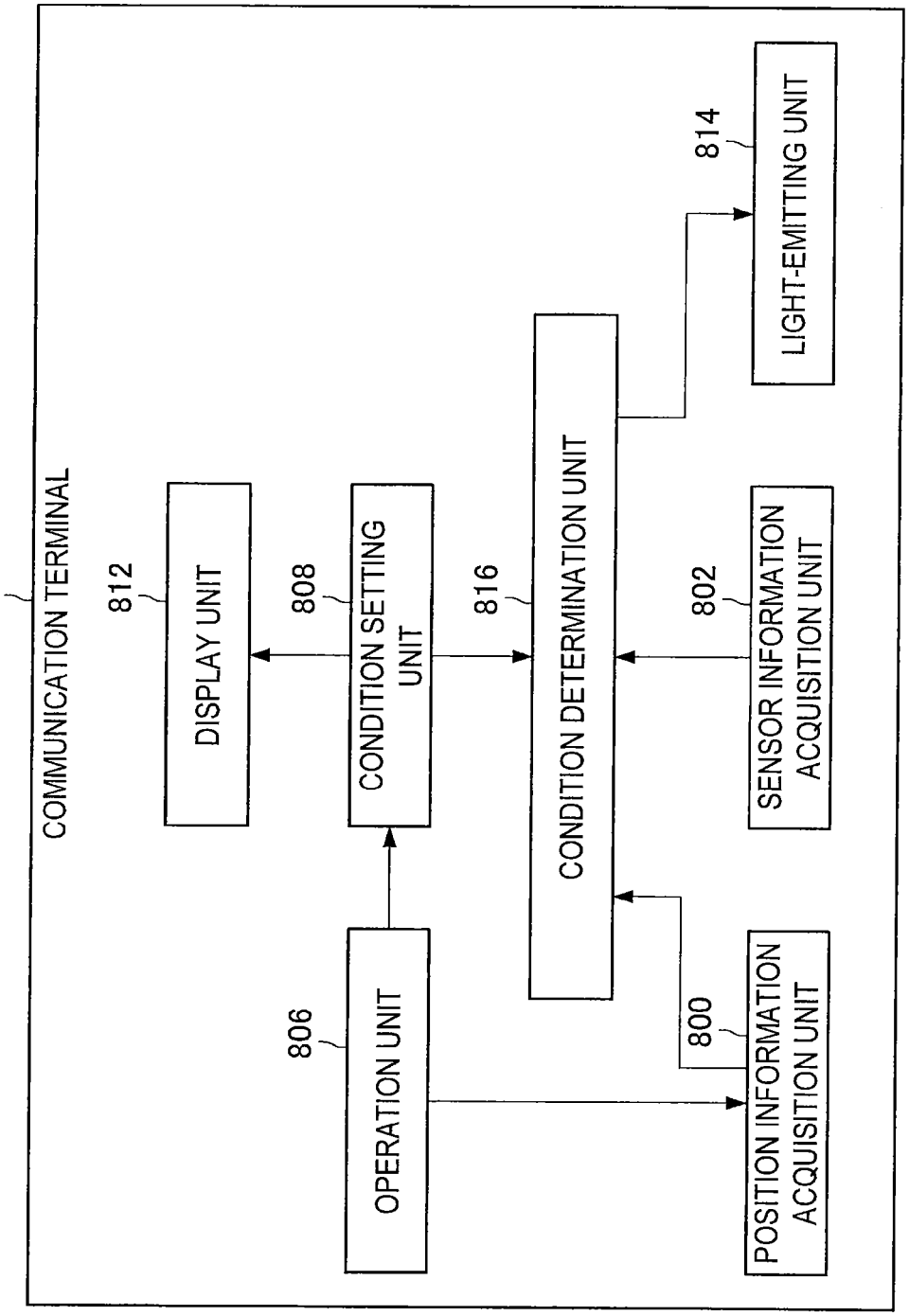
FIG. 59 is a functional block diagram illustrating the configuration of a communication terminal according to a second embodiment of the present disclosure.

Next, a configuration according to the second modification example will be described. FIG. 59 is a functional block diagram illustrating the configuration of the communication terminal 80 according to the second modification example. As illustrated in FIG. 59, the communication terminal 80 according to the second modification example does not include the environment state recognition unit 804 and the communication unit 810 and newly includes a condition determination unit 816 instead, compared to the first modification example. The functions of the remaining constituent elements are substantially the same as those of the first modification example.

The condition determination unit 816 determines a current environment state of the communication terminal 80 based on position information acquired by the position information acquisition unit 800 and sensor information acquired by the sensor information acquisition unit 802. The condition determination unit 816 determines whether the determined environment state satisfies the protection processing condition set by the condition setting unit 808, and then allows the light-emitting unit 814 to emit the light according to the result of the determination.

The light-emitting unit 814 according to the second modification example emits the light according to the result of the determination performed by the condition determination unit 816. The functions of the remaining constituent elements are substantially the same as those of the first modification example.

The configuration of the photographing terminal 30 is the same as that of the first modification example. Accordingly, the description thereof will be omitted here.

5-2-3. Processes of Second Modification Example

Figure 60:
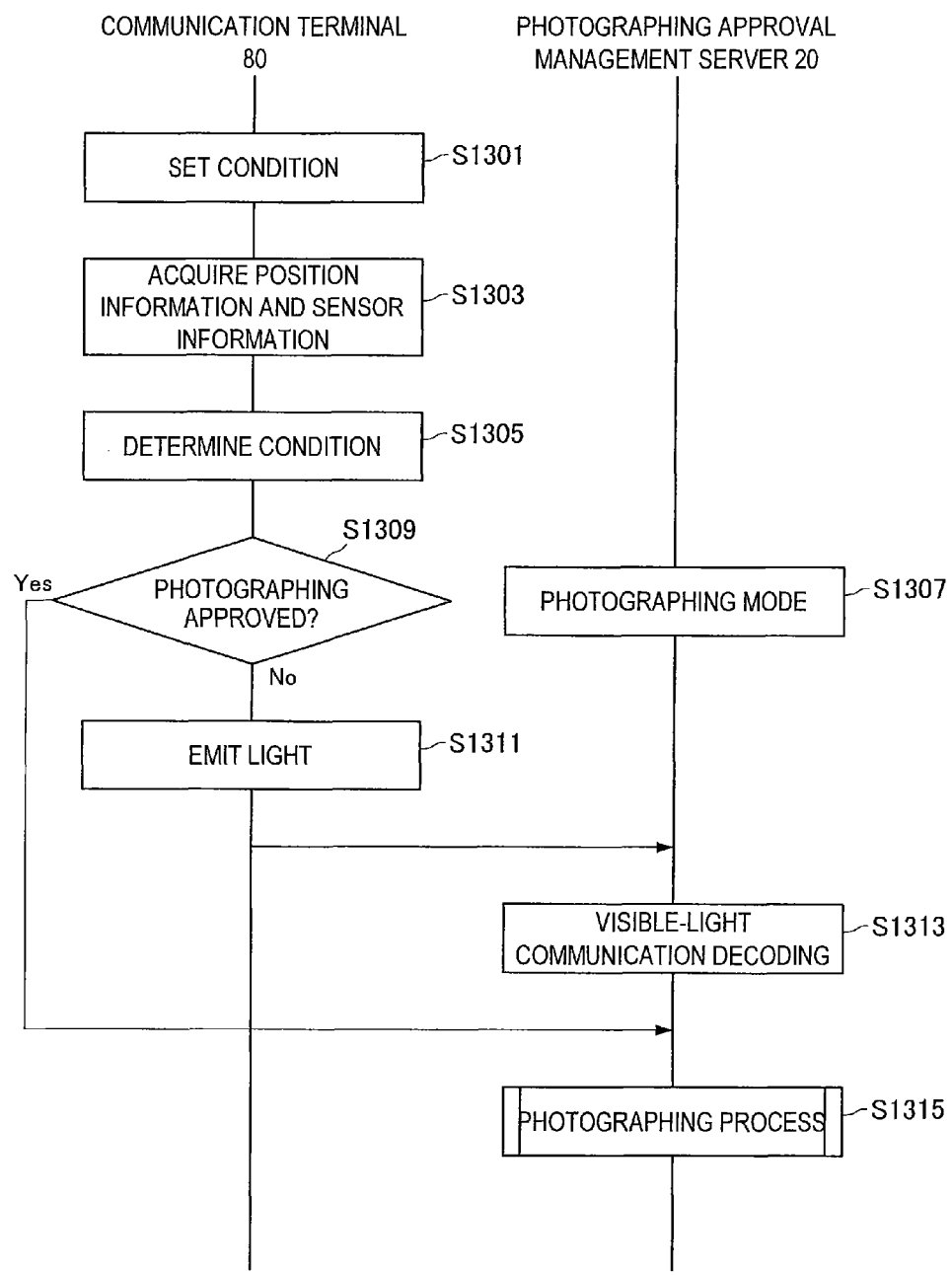
FIG. 60 is a diagram illustrating a sequence of processes at the time of photographing according to the second modification example.

The configuration according to the second modification example has been described above. Next, processes according to the second modification example will be described. FIG. 60 is a diagram illustrating a second sequence of the processes according to the second modification example. Processes of S1301 to S1305 are substantially the same as the processes of S201 to S205 according to the second embodiment, although there is a difference between the communication terminals 80 and 10. A process of S1307 is the same as the process of S1231 according to the first modification example.

Next, processes subsequent to S1307 will be described. After S1307, the light-emitting unit 814 of the communication terminal 80 emits the light based on the result of the determination obtained when the condition determination unit 816 determines whether to perform the process of protecting the person image (S1309 to S1311). For example, when the condition determination unit 816 determines that the process of protecting the person image is performed (No in S1309), the light-emitting unit 814 emits the light (S1311).

Processes (S1313 to S1315) subsequent to S1311 are substantially the same as the processes of S1237 to S1239 according to the first modification example. Accordingly, the description thereof will be omitted.

5-2-4. Advantages According to Second Modification Example

In the second modification example, as described above, the communication terminal 80 determines whether the environment state acquired by the communication terminal 80 satisfies the protection processing condition set in the communication terminal 80, and then emits the light based on the result of the determination. Therefore, in the second modification example, although the photographing approval management server 20 is not provided, it is possible to obtain the same advantages as those of the first modification example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:
a photographic subject position acquisition unit that acquires position information of a photographic subject corresponding to a person image included in a photographic image;
a transmission unit that transmits the position information of the photographic subject to an information processing device that compares the position information of the photographic subject with position information of a communication terminal transmitted from the communication terminal; and
a determination unit that determines whether a process of protecting the person image is performed based on information according to a result of the comparison received from the information processing device.

(2) The image processing device according to (1), wherein the communication terminal is a communication terminal held by the photographic subject.

(3) The image processing device according to (1) or (2),
wherein the information according to the result of the comparison includes information prescribing whether to perform the process of protecting the person image, and
wherein the determination unit determines that the process of protecting the person image is performed when the information prescribing to perform the process of protecting the person image is included.

(4) The image processing device according to any one of (1) to (3), further including:
a mask unit that performs mask processing on the person image as the process of protecting the person image.

(5) The image processing device according to any one of (1) to (4), wherein the photographic subject position acquisition unit acquires the position information of the photographic subject based on position information of the image processing device.

(6) The image processing device according to any one of (1) to (5), wherein the information processing device determines whether the process of protecting the person image is necessary based on a resolution of the person image.

(7) The image processing device according to any one of (1) to (6), wherein the photographic image is image information before photographing performed by the image processing device.

(8) The image processing device according to any one of (1) to (6), wherein the photographic image is image information after photographing performed by the image processing device.

(9) An information processing device including:
a storage unit that stores position information of a communication terminal received from the communication terminal;
a reception unit that receives position information of a photographic subject corresponding to a person image included in a photographic image from an image processing device;
a comparison unit that compares the position information of the communication terminal stored in the storage unit with the position information of the photographic subject; and
a transmission unit that transmits, to the image processing device, information prescribing whether to perform a process of protecting the person image according to a result of the comparison performed by the comparison unit.

(10) The information processing device according to (9), further including:
a condition determination unit that determines whether an environment state of the communication terminal satisfies a protection processing condition which is a condition regarding the process of protecting the person image,
wherein the transmission unit transmits, to the image processing device, information prescribing whether to perform the process of protecting the person image according to the result of the comparison performed by the comparison unit and a result of the determination performed by the condition determination unit.

(11) The information processing device according to (10), wherein the environment state is measured by the communication terminal or is acquired from an external device by the communication terminal.

(12) The information processing device according to (10) or (11), wherein the protection processing condition is a condition regarding a time at which the process of protecting the person image is performed.

(13) The information processing device according to (10) or (11), wherein the protection processing condition is a condition regarding registration content of a relationship between a user of the image processing device and a possessor of the communication terminal in a social networking service.

(14) The information processing device according to any one of (10) to (13), wherein the reception unit additionally receives the protection processing condition from the communication terminal.

(15) An image processing system including:
a communication terminal;
an information processing device; and
an image processing device, wherein the communication terminal includes
  a position information acquisition unit that acquires position information, and
  a transmission unit that transmits the position information acquired by the position information acquisition unit to the information processing device,
wherein the information processing device includes
  a storage unit that stores the position information of the communication terminal received from the communication terminal,
  a reception unit that receives position information of a photographic subject corresponding to a person image included in a photographic image from the image processing device,
  a comparison unit that compares the position information of the communication terminal stored in the storage unit with the position information of the photographic subject, and
  a transmission unit that transmits, to the image processing device, information prescribing whether to perform a process of protecting the person image according to a result of the comparison performed by the comparison unit, and
wherein the image processing device includes
  a photographic subject position acquisition unit that acquires the position information of the photographic subject,
  a transmission unit that transmits the position information of the photographic subject to the information processing device, and
  a determination unit that determines whether the process of protecting the person image is performed based on the information according to the result of the comparison received from the information processing device.

(16) An image processing method including:
  acquiring position information of a photographic subject corresponding to a person image included in a photographic image;
  transmitting the position information of the photographic subject to an information processing device that compares the position information of the photographic subject with position information of a communication terminal transmitted from the communication terminal; and
  determining whether a process of protecting the person image is performed based on information according to a result of the comparison received from the information processing device.

(17) An information processing method including:
  storing position information of a communication terminal received from the communication terminal;
  receiving position information of a photographic subject corresponding to a person image included in a photographic image from an image processing device;
  comparing the stored position information of the communication terminal with the position information of the photographic subject; and
  transmitting, to the image processing device, information prescribing whether to perform a process of protecting the person image according to a result of the comparison.

(18) A program causing a computer to function as:
  a photographic subject position acquisition unit that acquires position information of a photographic subject corresponding to a person image included in a photographic image;
  a transmission unit that transmits the position information of the photographic subject to an information processing device that compares the position information of the photographic subject with position information of a communication terminal transmitted from the communication terminal; and
  a determination unit that determines whether a process of protecting the person image is performed based on information according to a result of the comparison received from the information processing device.

(19) A program causing a computer to function as:
  a storage unit that stores position information of a communication terminal received from the communication terminal;
  a reception unit that receives position information of a photographic subject corresponding to a person image included in a photographic image from an image processing device;
  a comparison unit that compares the position information of the communication terminal stored in the storage unit with the position information of the photographic subject; and
  a transmission unit that transmits, to the image processing device, information prescribing whether to perform a process of protecting the person image according to a result of the comparison performed by the comparison unit.

The present disclosure contains subject matter related to that disclosed in Japanese Priority Patent Application JP 2012-226789 filed in the Japan Patent Office on Oct. 12, 2012, the entire content of which is hereby incorporated by reference.

What is claimed is:

1. An information processing device that includes a central processing unit (CPU) and a memory storing instructions for execution by the CPU, wherein the information processing device is communicably coupled to a first terminal and a second terminal via a network, wherein the CPU is configured to:
  acquire, from the first terminal, position information of a photographic subject corresponding to an image of a person included in a photographic image captured from the first terminal;
  acquire position information, of the second terminal, transmitted from the second terminal which is corresponding to the photographic subject;
  acquire an environment state, of the second terminal, transmitted from the second terminal, wherein the environment state is determined based on the position information of the second terminal; and
  determine whether a process of protecting the image of the person is performed based on a comparison of the position information of the photographic subject acquired from the first terminal, the position information of the second terminal acquired from the second terminal, and the acquired environment state of the second terminal.

2. The information processing device according to claim 1, wherein the second terminal is held by the photographic subject.

3. The information processing device according to claim 1,
  wherein the result of the comparison includes information prescribing whether to perform the process of protecting the image of the person, and
  wherein the CPU is configured to determine that the process of protecting the image of the person is performed in an event the information prescribing to perform the process of protecting the image of the person is included.

4. The information processing device according to claim 1, wherein the first terminal is configured to:
perform mask processing on the image of the person as the process of protecting the image of the person.

5. The information processing device according to claim 1, wherein the first terminal is configured to acquire the position information of the photographic subject based on position information of the first terminal.

6. The information processing device according to claim 1, wherein the CPU is configured to determine whether the process of protecting the image of the person is necessary based on a resolution of the image of the person.

7. The information processing device according to claim 1, wherein the photographic image is image information before photographing is performed by the first terminal.

8. The information processing device according to claim 1, wherein the photographic image is image information after photographing is performed by the first terminal.

9. An information processing device including a central processing unit (CPU) and a memory storing instructions for execution by the CPU, wherein the information processing device is communicably coupled to a first terminal and a second terminal via a network, wherein the CPU is configured to:
store, in the memory, position information of the second terminal received from the second terminal;
receive, from the first terminal, position information of a photographic subject corresponding to an image of a person included in a photographic image captured from the first terminal;
acquire an environment state, of the second terminal, transmitted from the second terminal, wherein the environment state is determined based on the position information of the second terminal;
compare the position information of the second terminal stored in the memory with the position information of the photographic subject received from the first terminal; and
transmit, to the first terminal, information prescribing whether to perform a process of protecting the image of the person according to a result of the performed comparison and the acquired environment state of the second terminal.

10. The information processing device according to claim 9, wherein the CPU is configured to:
determine whether the environment state of the second terminal satisfies a condition regarding the process of protecting the image of the person,
transmit, to the first terminal, the information prescribing whether to perform the process of protecting the image of the person according to the result of the performed comparison and a result of the determination.

11. The information processing device according to claim 10, wherein the environment state is measured by the second terminal or is acquired from an external device by the second terminal.

12. The information processing device according to claim 10, wherein the condition regarding the process of protecting the image of the person is a condition regarding a time at which the process of protecting the image of the person is performed.

13. The information processing device according to claim 10, wherein the condition regarding the process of protecting the image of the person is a condition regarding registration content of a relationship between a user of the information processing device and a possessor of the second terminal in a social networking service.

14. The information processing device according to claim 10, wherein the CPU is configured to receive the condition regarding the process of protecting the image of the person from the second terminal.

15. The information processing device according to claim 9, wherein the CPU is configured to:
store a unique identifier associated with each respective image of the person in each respective photographic image captured from the first terminal;
wherein the process of protecting each respective image of the person is associated with the respective unique identifier.

16. An image processing system comprising:
a first terminal;
a second terminal; and
a server communicably coupled to the first terminal and the second terminal via a network, wherein the server comprises a central processing unit (CPU) and a memory storing instructions for execution by the CPU,
wherein the second terminal is configured to:
acquire position information of the second terminal,
determine an environment state of the second terminal based on the acquired position information, and
transmit the acquired position information and the determined environment state to the server,
wherein the server is configured to:
store the position information and the environment state of the second terminal received from the second terminal in a memory,
receive, from the first terminal, position information of a photographic subject corresponding to an image of a person included in a photographic image captured from the first terminal,
compare the position information of the second terminal stored in the memory with the position information of the photographic subject received from the first terminal, and
transmit, to the first terminal, information prescribing whether to perform a process of protecting the image of the person according to a result of the performed comparison and the stored environment state of the second terminal, and
wherein the first terminal is configured to:
acquire the position information of the photographic subject,
transmit the position information of the photographic subject to the server, and
determine whether the process of protecting the image of the person is performed based on the information received from the server.

17. An image processing method comprising:
acquiring, from a first terminal, position information of a photographic subject corresponding to an image of a person included in a photographic image captured from the first terminal;
transmitting the position information of the photographic subject to an information processing device that is configured to compare the position information of the photographic subject acquired from the first terminal with position information of a second terminal transmitted from the second terminal, and receive an environment state of the second terminal transmitted from the second terminal,
wherein the environment state is determined based on the position information of the second terminal; and
determining whether a process of protecting the image of the person is performed based on information according to a result of the comparison and the environment state received from the information processing device.

18. An information processing method comprising:
    storing position information and an environment state of a terminal received from the terminal, wherein the environment state of the terminal is determined based on the position information of the terminal;
    receiving, from an image processing device, position information of a photographic subject corresponding to an image of a person included in a photographic image captured from the image processing device;
    comparing the stored position information of the terminal with the position information of the photographic subject received from the image processing device; and
    transmitting, to the image processing device, information prescribing whether to perform a process of protecting the image of the person according to a result of the comparison and the stored environment state of the terminal.

19. A non-transitory computer-readable storage medium, having stored thereon, a set of computer-executable instructions that causes a computer to perform the steps comprising:
    acquiring, from an image processing device, position information of a photographic subject corresponding to an image of a person included in a photographic image captured from the image processing device;
    transmitting the position information of the photographic subject to an information processing device that is configured to compare the position information of the photographic subject received from the image processing device with position information of a terminal transmitted from the terminal, and receive an environment state of the terminal transmitted from the terminal,
        wherein the environment state is determined based on the position information of the terminal; and
    determine whether a process of protecting the image of the person is performed based on information according to a result of the comparison and the environment state received from the information processing device.

20. A non-transitory computer-readable storage medium, having stored thereon, a set of computer-executable instructions that causes a computer to perform the steps comprising:
    store, in a memory, position information and an environment state of a terminal received from the terminal, wherein the environment state of the terminal is determined based on the position information of the terminal;
    receive, from an image processing device, position information of a photographic subject corresponding to an image of a person included in a photographic image captured from the image processing device;
    compare the position information of the terminal stored in the memory with the position information of the photographic subject received from the image processing device; and
    transmit, to the image processing device, information prescribing whether to perform a process of protecting the image of the person according to a result of the performed comparison and the stored environment state of the terminal.

* * * * *